(12) United States Patent
Ohtsubo et al.

(10) Patent No.: US 6,542,071 B1
(45) Date of Patent: Apr. 1, 2003

(54) OPENING-CLOSING MEMBER CONTROL APPARATUS FOR VEHICLE

(75) Inventors: Yoshinori Ohtsubo, Hiroshima-ken (JP); Kunihiko Matsumura, Hiroshima-ken (JP); Takuji Oka, Hiroshima-ken (JP); Kazuhiro Murashige, Hiroshima-ken (JP); Tsuneo Kudou, Hiroshima-ken (JP); Tsukasa Harada, Hiroshima-ken (JP); Takahiro Inada, Hiroshima-ken (JP); Norifumi Kanada, Hiroshima-ken (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 09/706,857

(22) Filed: Nov. 7, 2000

(30) Foreign Application Priority Data

Dec. 17, 1999 (JP) .......................... 11-358405
Nov. 9, 1999 (JP) .......................... 11-318846
Sep. 18, 2000 (JP) ...................... 2000-282292

(51) Int. Cl.$^7$ ................................................ B60R 25/10
(52) U.S. Cl. .................. 340/426; 340/505; 340/5.21; 340/5.2; 340/5.61; 340/10.1
(58) Field of Search ................................ 340/426, 505, 340/5.2, 5.1, 5.21, 5.61, 10.1

(56) References Cited

U.S. PATENT DOCUMENTS

| | | | | | |
|---|---|---|---|---|---|
| 4,363,588 | A | * | 12/1982 | Stickney | 414/408 |
| 4,761,645 | A | * | 8/1988 | Mochida | 340/5.62 |
| 4,785,907 | A | * | 11/1988 | Aoki | 180/274 |
| 4,829,435 | A | * | 5/1989 | Isono | 701/51 |
| 4,876,649 | A | * | 10/1989 | Kawai | 701/49 |
| 5,293,160 | A | * | 3/1994 | Kurozu | 340/5.3 |
| 5,532,521 | A | * | 7/1996 | Leininger | 307/10.2 |
| 5,710,548 | A | | 1/1998 | Lemense | 340/825.69 |
| 5,808,372 | A | * | 9/1998 | Schwegler | 340/5.64 |
| 5,835,022 | A | * | 11/1998 | Amano | 340/5.64 |
| 6,075,454 | A | * | 1/2000 | Yamasaki | 340/825.31 |
| 6,335,687 | B1 | * | 1/2002 | Terashima et al. | 340/573.1 |

FOREIGN PATENT DOCUMENTS

JP 8199882 8/1996
JP 8270285 10/1996

* cited by examiner

Primary Examiner—Daryl Pope

(57) ABSTRACT

When a "window automatic opening mode" is set in advance by a window automatic opening mode setting switch (14), and the user who carries a portable unit (1A) approaches an onboard unit, doors are automatically unlocked, and a window of a predetermined door is opened when the electric field strength of a radio signal from the portable unit (1A) becomes larger than a predetermined value. This function can be disabled by the window automatic opening mode setting switch (14).

21 Claims, 41 Drawing Sheets

OPENING-CLOSING MEMBER CONTROL APPARATUS FOR VEHICLE

FIELD OF THE INVENTION

The present invention relates to an opening-closing member control apparatus for a vehicle, which comprises one or both of a user recognition system for recognizing if an authentic user is present near the vehicle, in accordance with the reception result of an authentication signal automatically sent from a transmitter provided to a portable unit, and a keyless entry system in which an onboard unit of a vehicle controls to lock or unlock a door lock mechanism in accordance with the reception result of an unlock signal automatically sent from a transmitter provided to a portable unit.

BACKGROUND OF THE INVENTION

Conventionally, a so-called keyless entry system has prevailed in automobiles. In this system, when the driver or the like operates a predetermined switch on a portable terminal (to be referred to as a portable unit hereinafter), a control unit (to be referred to as an onboard unit hereinafter) equipped in the automobile locks/unlocks doors in response to a predetermined radio wave sent in response to the driver's operation without requiring the driver to lock/unlock by inserting a predetermined key into a key cylinder.

As an application of such keyless entry system, Japanese Laid-Open Patent No. 8-199882 proposes a system which unlocks doors in response to switch operation at the portable unit, and automatically opens a power window when the switch operation continues for a predetermined period of time.

Also, Japanese Laid-Open Patent No. 8-270285 proposes a system which comprises a portable unit which automatically sends an unlock signal to a vehicle, and onboard control means for unlocking vehicle doors upon receiving the unlock signal by a reception antenna, and which divides the reception range of the reception antenna, unlocks the vehicle doors when the unlock signal is received from the portable unit in a vehicle side area, and unlocks a trunk lid when the unlock signal is received from the portable unit in an area behind the vehicle.

Furthermore, Japanese Laid-Open Patent No. 8-312213 proposes a system which comprises a portable unit for automatically sending an unlock signal to a vehicle, onboard control means for unlocking doors upon receiving the unlock signal, and antennas respectively provided to, e.g., driver and passenger sides to be separated from each other, and which unlocks the vehicle doors when the unlock signal is received by the onboard antenna on the front side of the vehicle and an identification code matches, and unlocks a trunk lid when the unlock signal is received by the onboard antenna on the rear side of the vehicle and an identification code matches.

According to the conventional keyless entry systems, since a passenger can put baggage into a passenger room from a window before he or she gets into the passenger room, convenience when he or she is carrying baggage with both his or her hands can be improved. However, in order to open the window in the keyless entry system, since the passenger must continuously operate an operation switch of the portable unit, he or she may feel inconvenient when he or she is holding heavy baggage with both his or her hands.

In order to improve convenience by simplifying passenger's operations at the portable unit, in a so-called smart keyless entry system in which the portable unit has only an operation switch for turning on/off transmission of a predetermined radio signal, and the doors are locked/unlocked in accordance with the received electric field strength level of the radio signal by the onboard unit when the onboard unit receives the predetermined radio signal, as described in Japanese Laid-Open Patent No. 8-270285, a power window automatic opening function may be added to the automatic unlock function. However, when these two functions are simply combined, a window is inadvertently opened irrespective of the passenger's will, thus posing problems in terms of security, rain, and the like.

According to Japanese Laid-Open Patent No. 8-270285, since an area where the unlock signal is detected by the reception antenna having directivity must be determined, an expensive reception antenna (onboard antenna) is required.

Also, according to Japanese Laid-Open Patent No. 8-312213, two onboard antennas are required, and the cost of the reception device increases. In addition, since these antennas must be connected to the onboard unit, wiring must laid in in the front and rear portions of the vehicle, and the control itself is complicated.

SUMMARY OF THE INVENTION

The present invention has been made in consideration of the above problems, and has as its object to provide an opening-closing member control apparatus for a vehicle, which has an opening function of an opening-closing member with high security and convenience.

It is another object of the present invention to provide an opening-closing member control apparatus for a vehicle, which can automatically unlock an opening-closing member and can assure high convenience using neither an expensive onboard antenna nor a plurality of onboard antennas.

In order to achieve the above object, an opening-closing member control apparatus for a vehicle according to the first aspect of the present invention is an opening-closing member control apparatus for a vehicle, which comprises a user recognition system which recognizes if an authentic user is present near the vehicle, in accordance with a reception result of an authentication signal automatically sent from a transmitter provided to a portable unit, and comprises operation detection means for detecting user's predetermined operation for the vehicle, and opening operation means for opening a predetermined opening-closing member of the vehicle when the predetermined operation is detected while the presence of the authentic user is recognized near the vehicle upon receiving the authentication signal.

According to the first aspect, in the opening-closing member control apparatus for a vehicle, which comprises the user recognition system which recognizes if an authentic user is present near the vehicle, in accordance with the reception result of the authentication signal automatically output from the transmitter provided to the portable unit, when predetermined operation is detected while it is recognized upon receiving the authentication signal that the authentic user is present near the vehicle, the predetermined opening-closing member of the vehicle is opened. In this way, high security can be assured since the user recognition and the operation of the authentic user are used as triggers, and convenience can be improved since the opening-closing member can be opened by simple operation. Also, the opening-closing member can be automatically unlocked using neither an expensive onboard antenna nor a plurality of onboard antennas, thus assuring high convenience.

An opening-closing member control apparatus for a vehicle according to the second aspect of the present invention is an opening-closing member control apparatus for a vehicle, which comprises a keyless entry system in which an onboard unit of the vehicle controls to lock/unlock a door lock mechanism in accordance with a reception result of an unlock signal automatically sent from a transmitter provided to a portable unit, and comprises operation detection means for detecting user's predetermined operation for the vehicle, and opening operation means for opening a predetermined opening-closing member of the vehicle when the predetermined operation is detected while the door lock mechanism is unlocked upon receiving the unlock signal.

According to the second aspect, in the opening-closing member control apparatus for a vehicle, which comprises a keyless entry system in which the onboard unit of the vehicle controls to lock or unlock the door lock mechanism in accordance with the reception result of the unlock signal automatically sent from the transmitter provided to the portable unit, when predetermined operation is detected while the door lock mechanism is unlocked upon reception of the unlock signal, the predetermined opening-closing member of the vehicle is opened. In this fashion, high security can be assured since the door unlock operation and the operation of the authentic user are used as triggers, and convenience can be improved since the opening-closing member can be opened by simple operation. Also, the opening-closing member can be automatically unlocked using neither an expensive onboard antenna nor a plurality of onboard antennas, thus assuring high convenience.

An opening-closing member control apparatus for a vehicle according to the third aspect of the present invention is an opening-closing member control apparatus for a vehicle, which comprises a keyless entry system in which an onboard unit of the vehicle controls to lock/unlock a door lock mechanism in accordance with a reception result of an unlock signal automatically sent from a transmitter provided to a portable unit, and comprises entrance detection means for detecting if the user enters the vehicle, and opening operation means for opening a predetermined opening-closing member of the vehicle when a predetermined time has elapsed without detecting entrance of the user after the door lock mechanism was unlocked while the door mechanism is unlocked upon receiving the unlock signal.

According to the third aspect, in the opening-closing member control apparatus for a vehicle, which comprises a keyless entry system in which the onboard unit of the vehicle controls to lock or unlock the door lock mechanism in accordance with the reception result of the unlock signal automatically sent from the transmitter provided to the portable unit, when a time elapsed after the door lock mechanism was unlocked has exceeded a predetermined time without detecting entrance of the user while the door lock mechanism is unlocked upon reception of the unlock signal, the predetermined opening-closing member of the vehicle is opened. In this manner, even when user's hands are occupied by baggage, he or she can open the opening-closing member by only carrying the portable unit. In this way, high security can be assured since the unlocking operation of the door is used as a trigger, and convenience can be improved since the opening-closing member can be easily opened without touching anything. Also, the opening-closing member can be automatically unlocked using neither an expensive onboard antenna nor a plurality of onboard antennas, thus assuring high convenience.

An opening-closing member control apparatus for a vehicle according to the fourth aspect of the present invention is an opening-closing member control apparatus for a vehicle, which comprises a user recognition system which recognizes if an authentic user is present near the vehicle, in accordance with a reception result of an authentication signal automatically sent from a transmitter provided to a portable unit, and comprises entrance detection means for detecting if the user enters the vehicle, and opening operation means for opening a predetermined opening-closing member of the vehicle when a predetermined time has elapsed without detecting entrance of the user after the door lock mechanism was unlocked while the presence of the authentic user is recognized near the vehicle upon receiving the authentication signal.

According to the fourth aspect, in the opening-closing member control apparatus for a vehicle, which comprises the user recognition system which recognizes if an authentic user is present near the vehicle, in accordance with the reception result of the authentication signal automatically output from the transmitter provided to the portable unit, when a time elapsed from the beginning of recognition has exceeded a predetermined time without detecting entrance of the user while it is recognized upon receiving the authentication signal that the authentic user is present near the vehicle, the predetermined opening-closing member of the vehicle is opened. In this manner, the user can open the opening-closing member by only carrying the portable unit. Hence, high security is assured since recognition of the authentic user is used as a trigger, and convenience can be improved since the opening-closing member can be easily opened without touching anything. Also, the opening-closing member can be automatically unlocked using neither an expensive onboard antenna nor a plurality of onboard antennas, thus assuring high convenience.

An opening-closing member control apparatus for a vehicle according to the fifth aspect of the present invention is an opening-closing member control apparatus for a vehicle, which comprises a user recognition system which recognizes if an authentic user is present near the vehicle, in accordance with a reception result of an authentication signal automatically sent from a transmitter provided to a portable unit, the portable unit includes an operation mode setting switch which can turn on or off a function of automatically opening a predetermined opening-closing member of the vehicle, and the apparatus comprises opening operation means for opening the predetermined opening-closing member when an onboard unit receives the authentication signal while the function is turned on by the operation mode setting switch.

According to the fifth aspect, in the opening-closing member control apparatus for a vehicle, which comprises the user recognition system which recognizes if an authentic user is present near the vehicle, in accordance with the reception result of the authentication signal automatically output from the transmitter provided to the portable unit, the portable unit comprises the operation mode setting switch which can turn on or off a function of automatically opening the predetermined opening-closing member of the vehicle, and when the onboard unit receives the authentication signal while the function is turned on by the operation mode setting switch, the predetermined opening-closing member is opened. Hence, high security can be assured since recognition of the authentic user is used as a trigger as long as the operation mode setting switch is turned on in advance, and convenience can be improved since the opening-closing member can be easily opened without touching anything. Also, the opening-closing member can be automatically unlocked using neither an expensive onboard antenna nor a plurality of onboard antennas, thus assuring high convenience.

Preferably, in the first or second aspect, the predetermined opening-closing member is a window of a vehicle door, the operation detection means detects user's outer handle operation of the vehicle door, and the opening operation means opens the window of the vehicle when the operation detection means detects the outer handle operation. In this manner, convenience can be improved since the opening-closing member can be opened by only outer handle operation of a door by the authentic user.

Preferably, in the first or second aspect, the predetermined opening-closing member is a window of a vehicle door, the operation detection means detects user's operation of a switch provided to a side mirror of the vehicle, and the opening operation means opens the window of the vehicle when the operation detection means detects the switch operation. In this way, convenience can be improved since the opening-closing member can be opened by only operation of the switch provided to the side mirror by the authentic user.

Preferably, in the first or second aspect, the predetermined opening-closing member is a window of a vehicle door, the operation detection means detects if the user presses his or her body against an outer handle of a door of the vehicle, and the opening operation means opens the window of the vehicle when the operation detection means detects that the user has pressed his or her body against the outer handle of the door. In this manner, since the authentic user can easily open the opening-closing member by only pressing his or her body against the outer handle of the door, even when his or her hands are occupied by baggage, he or she can easily open the opening-closing member without touching anything, thus improving convenience.

Preferably, in the first or second aspect, the predetermined opening-closing member is a trunk of the vehicle, the operation detection means detects if the user puts his or her foot below a bumper of the vehicle, and the opening operation means opens the trunk of the vehicle when the operation detection means detects that the user has put his or her foot below the bumper. In this fashion, since the authentic user can open the opening-closing member by only inserting his or her foot under the bumper, even when his or her hands are occupied by baggage, he or she can easily open the opening-closing member without touching anything, thus improving convenience.

Preferably, in the first or second aspect, the operation detection means detects by image recognition if the user puts his or her hand or leg over the predetermined opening-closing member, and the opening operation means opens the predetermined opening-closing member when the operation detection means detects that the user puts his or her hand or leg over the predetermined opening-closing member. In this way, since the authentic user can open the opening-closing member by only putting his or her hand or leg over the opening-closing member, even when his or her hands are occupied by baggage, he or she can easily open the opening-closing member without touching anything, thus improving convenience.

Preferably, in the first or second aspect, the predetermined opening-closing member is a window of a vehicle door, the operation detection means detects if the user kicks a vehicle tire, and the opening operation means opens the window when the operation detection means detects that the vehicle tire is kicked. In this manner, since the authentic user can open the opening-closing member by only kicking the tire, even when his or her hands are occupied by baggage, he or she can easily open the opening-closing member without touching anything, thus improving convenience.

Preferably, in any one of the first to fifth aspects, the opening operation means detects a reception direction of the signal, and opens a predetermined opening-closing member corresponding to the detected reception direction. In this fashion, since the authentic user can open the opening-closing member by only approaching the opening-closing member he or she wants to open while carrying the portable unit, even when his or her hands are occupied by baggage, he or she can easily open the opening-closing member without touching anything, thus improving convenience.

Preferably, in the 11th aspect, the predetermined opening-closing member is a window of a vehicle door, the operation detection means detects if the user kicks a vehicle tire, and the opening operation means opens the window corresponding to the vehicle tire kicked by the user when the operation detection means detects that the vehicle tire is kicked. In this manner, since the authentic user can open the opening-closing member by only kicking the tire at a position corresponding to the window he or she wants to open, even when his or her hands are occupied by baggage, he or she can easily open the opening-closing member without touching anything, thus improving convenience.

Preferably, in the 10th aspect, the predetermined opening-closing member is a window of a vehicle door, the operation detection means detects by image recognition using cameras that sense images of right and left side portions of the vehicle if the user puts his or her hand or leg over the predetermined opening-closing member, and the opening operation means opens a window corresponding to a position where the user puts his or her hand or leg when the operation detection means detects that the user puts his or her hand or leg over the predetermined opening-closing member. In this way, since the authentic user can open the opening-closing member by only putting his or her hand or leg over the window he or she wants to open, even when his or her hands are occupied by baggage, he or she can easily open the opening-closing member without touching anything, thus improving convenience.

Preferably, in the sixth aspect, the vehicle door includes right and left front and rear doors, the apparatus further comprises door operation detection means for detecting user's predetermined operation for each of the front and rear doors, and the opening operation means opens a window of the rear door when the operation detection means detects an outer handle operation of that rear door, and inhibits the window of the rear door from being opened when a door handle operation of another door is detected before the door handle operation of the rear door is detected, thus inhibiting an inadvertent opening operation.

Preferably, in any one of the first to fifth aspects, the predetermined opening-closing member is a window of a vehicle door, the apparatus further comprises object detection means for detecting if an object is present on a vehicle seat, and the opening operation means inhibits the window of the vehicle corresponding to the vehicle seat where the object is present from being opened when the object detection means detects that the object is present on that vehicle seat, thereby preventing an inadvertent opening operation of the opening-closing member corresponding to a space where no more baggage can be placed.

Preferably, in the 15th or 16th aspect, the apparatus further comprises informing means for informing the position of the window which is inhibited from being opened, when the opening operation means inhibits the window from being opened, thus preventing the user from feeling troubled due to the window which remains closed.

Preferably, in any one of the first to fifth aspects, the apparatus further comprises rain detection means for detecting if it rains, and the opening operation means sets an opening operation speed of the predetermined opening-closing member when a rainfall is detected to be higher than an opening operation speed set when no rainfall is detected, thereby opening the opening-closing member while minimizing raindrops which enter the passenger room.

Preferably, in any one of the first to fifth aspects, the opening operation means opens the predetermined opening-closing member by switch means provided inside the vehicle, and sets an opening operation speed of the predetermined opening-closing member in response to the received signal to be higher than an opening operation speed of the predetermined opening-closing member by the switch means, thus opening the opening-closing member to meet the need of the user who wants to place baggage quickly.

Preferably, in any one of the first to fifth aspects, when the signal is not normally received, the predetermined opening-closing member opened by the opening operation means is closed, thus assuring high security by shortening the open time when the presence of the authentic user cannot be recognized at the position of the opening-closing member to be opened.

Preferably, in any one of the first to fifth aspects, the portable unit has a closing operation switch which can be operated by the user and outputs a closing operation signal that instructs to close the predetermined opening-closing member, and the predetermined opening-closing member opened by the opening operation means is closed upon receiving the closing operation signal, thus closing the opening-closing member to meet the need of the user who wants to close the opening-closing member.

Preferably, in any one of the first to fifth aspects or the 20th aspect, the apparatus further comprises onboard detection means for detecting if the user enters a passenger room, and when it is detected that the user has entered the passenger room, the predetermined opening-closing member opened by the opening operation means is closed, thereby inhibiting an unwanted opening operation.

Preferably, in the 22nd aspect, a closing operation speed by the closing operation means when the signal is not normally received is set to be higher than a closing operation speed by the closing operation means when the onboard detection means detects that the user has entered the passenger room, thus assuring high security by shortening the open time when the presence of the authentic user cannot be recognized at the position of the open opening-closing member.

Preferably, in any one of the 20th to 22nd aspects, the apparatus further comprises rain detection means for detecting if it rains, and in that the closing operation means sets a closing operation speed of the predetermined opening-closing member when a rainfall is detected to be higher than a closing operation speed set when no rainfall is detected, thus closing the opening-closing member while minimizing raindrops which enter the passenger room.

Preferably, in the third or fourth aspects, the entrance detection means detects user's outer handle operation of a vehicle door, and the opening operation means opens the predetermined opening-closing member when a predetermined time has elapsed without detecting entrance. In this manner, since the authentic user can easily open the opening-closing member without touching anything by only carrying the portable unit even when his or her hands are occupied by baggage, convenience can be improved.

Preferably, in the third or fourth aspects, the entrance detection means detects operation of an operation member to be operated by the user inside the vehicle, and the opening operation means opens the predetermined opening-closing member when a predetermined time has elapsed without detecting any operation. In this manner, since the authentic user can easily open the opening-closing member without touching anything by only carrying the portable unit even when his or her hands are occupied by baggage, convenience can be improved.

Preferably, in the fifth aspect, according to the invention of claim 27, the operation mode setting switch is provided to the portable unit. In this way, since the passenger can select whether to use the automatic opening function of the opening-closing member or not, the window can be inhibited from being automatically opened when a heavy rain falls, i.e., the passenger does not want to open the window, thus avoiding entrance of raindrops into the passenger room.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

DETAILED DESCRIPTION OF THE PREFERRED EMBODIMENTS

Preferred embodiments in which a keyless entry system according to the present invention is applied to an automobile as a typical vehicle will be described in detail hereinafter with reference to the accompanying drawings.

Note that the embodiments to be described hereinafter are examples of implementation means of the present invention, and the present invention can be applied to changes or modifications of the embodiments without departing from the scope of the invention.

First Embodiment

The hardware arrangement of a keyless entry system according to this embodiment will be described first.

Figure 1:
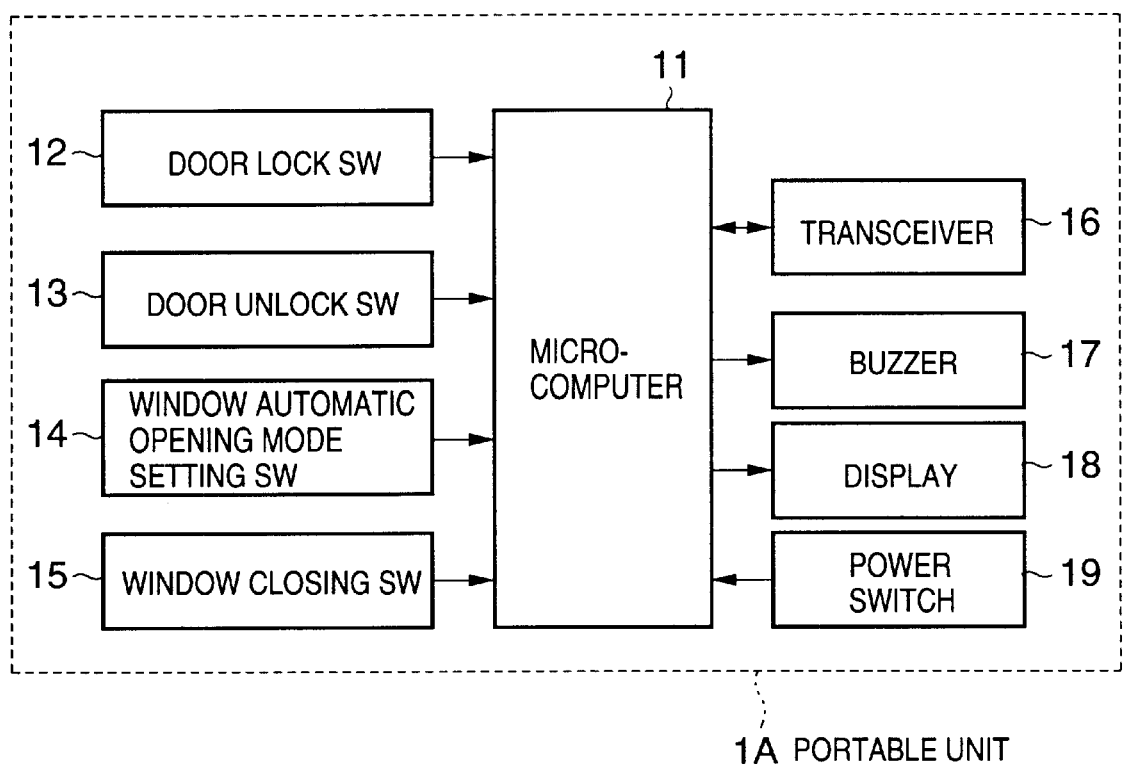
FIG. 1 is a block diagram showing the device arrangement of a portable unit in the first embodiment.

FIG. 1 is a block diagram showing the device arrangement of a portable unit in the first embodiment.

In a portable unit 1A shown in FIG. 1, reference numeral 12 denotes a door lock switch which can lock doors of an automobile. Reference numeral 13 denotes a door unlock switch which can unlock the doors. Reference numeral 14 denotes a window automatic opening mode setting switch which can turn on/off a "window automatic opening mode" which automatically opens the window when the user who carries the portable unit 1A approaches the automobile. Reference numeral 15 denotes a window closing switch which can close the window of the automobile. Reference numeral 16 denotes a general transceiver which sends a predetermined radio signal corresponding to the operations of these operation switches, and can demodulate of externally received radio signals only a radio signal from an onboard unit (an onboard unit 2A to be described later) which is mounted on the automobile. Reference numeral 17 denotes a buzzer. Reference numeral 18 denotes a display that users a compact liquid crystal display or the like. Reference numeral 19 denotes a power switch for turning on/off the power supply of the portable unit 1A. Reference numeral 11 denotes a microcomputer which comprises a CPU, ROM, RAM, interface circuit, and the like, and controls the operations of these blocks by executing a pre-stored control program.

Figure 2:
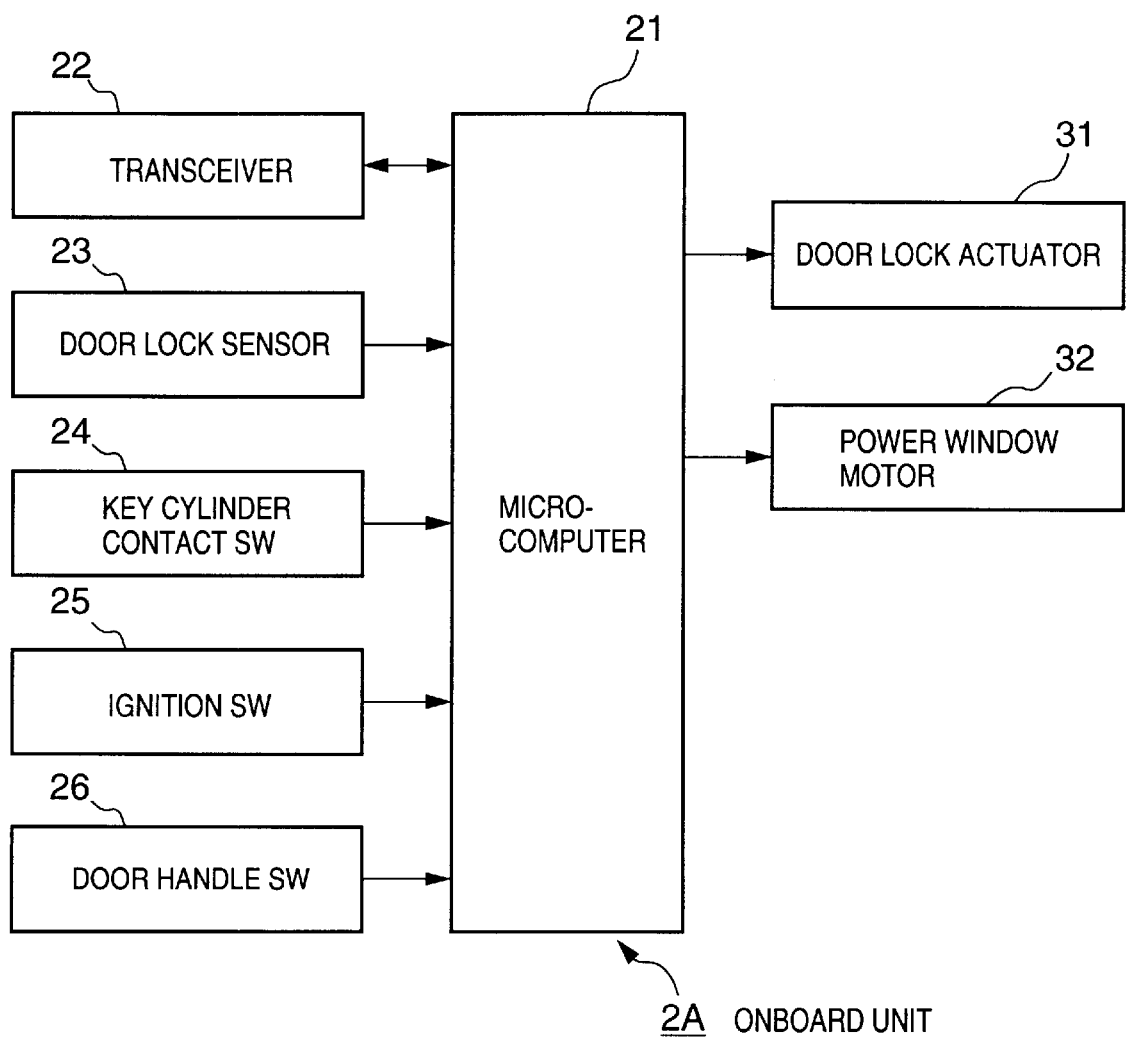
FIG. 2 is a block diagram showing the device arrangement of an onboard unit in the first embodiment.

FIG. 2 is a block diagram showing the device arrangement of an onboard unit in the first embodiment.

In an onboard unit 2A shown in FIG. 2, reference numeral 22 denotes a general transceiver which outputs a predetermined radio signal, and can demodulate only a radio signal from the predetermined portable unit 1A, which is registered in advance, of externally received radio signals. Reference numeral 23 denotes a door lock sensor for detecting the lock/unlock state of the door lock of the automobile. Reference numeral 24 denotes a key cylinder contact switch for detecting the operation state of a key cylinder provided to a door of the automobile. Reference numeral 25 denotes an ignition switch. Reference numeral 26 denotes a door handle switch for detecting the operation state of a door handle provided to an outer panel of the door of the automobile (note that this switch is used in the second embodiment). Reference numeral 31 denotes a door lock actuator for actuating a door lock of the automobile. Reference numeral 32 denotes a power window motor for opening/closing a power window provided to the door of the automobile. Reference numeral 21 denotes a microcomputer which comprises a CPU, ROM, RAM, interface circuit, and the like, and controls operations of these blocks by executing a pre-stored control program.

In the keyless entry system constructed by the aforementioned portable unit 1A and onboard unit 2A, fields that form each radio signal exchanged between the transceivers 16 and 22 include header information and footer information with a general format, error correction information, and a predetermined identification number (ID) with which each other's components can be discriminated.

Various signals exchanged between the portable unit 1A and onboard unit 2A will be explained below.

Figure 3:
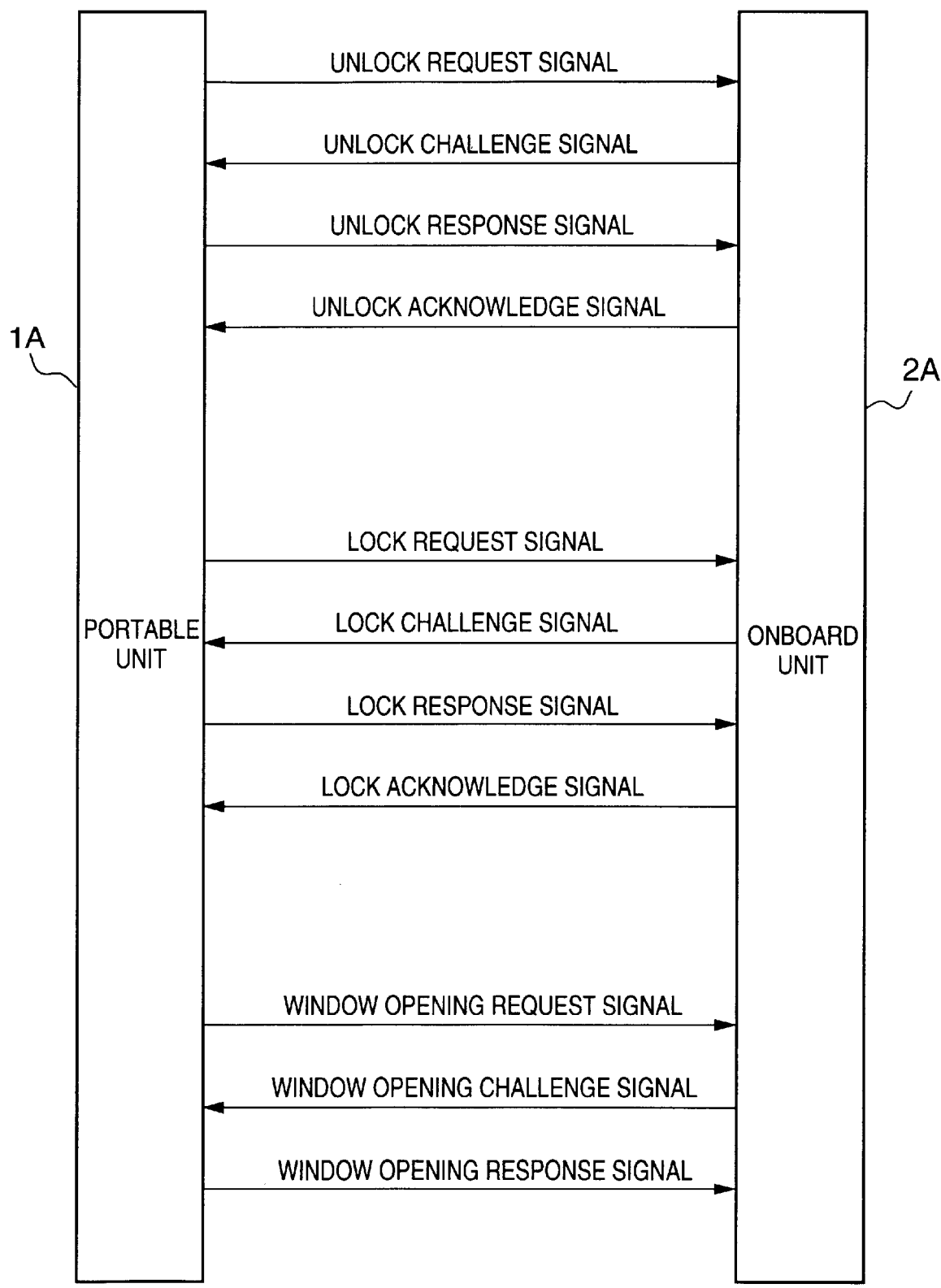
FIG. 3 is a view showing transmission/reception signals in a keyless entry system according to the first embodiment.

FIG. 3 shows transmission/reception signals in the keyless entry system according to the first embodiment, and roughly includes a communication sequence for making the door lock actuator 31 unlock the doors, a communication sequence for making the door lock actuator 31 lock the doors, and a communication sequence for making the power window motor 32 open the window.

The basic format of signals which form these communication sequences will be explained below. When the portable unit 1A sends a request signal of a given operation, the onboard unit 2A sends a challenge signal in response to that request signal, and the portable unit 1A sends a response signal in response to the challenge signal. Upon receiving the response signal, the onboard unit 2A executes an operation the portable unit 1A requested, and sends an acknowledge signal that reports completion of the requested operation.

Note that the challenge and response signals are exchanged to assure a security function. Upon receiving a request signal corresponding to a given switch operation, the onboard unit 2A outputs a challenge signal including a random number which varies every transmission. Upon receiving the challenge signal, the portable unit 1A generates a cipher code by making a predetermined arithmetic operation using the random number included in the received signal, and sends a response signal including the generated cipher code to the onboard unit 2A. The onboard unit 2A generates a cipher code by making a predetermined arithmetic operation similar to that in the portable unit 1A, using the random number sent in the challenge signal, and compares the generated cipher code with that included in the received response signal. Only when the two codes match, the onboard unit 2A determines that the currently received request signal is a radio signal from the authentic portable unit 1A (paired therewith), and executes an operation according to the request signal.

In this embodiment, since the user can easily visually confirm that the window is open, no acknowledge signal is sent after the window is opened by the onboard unit 2A. However, a communication sequence that sends such acknowledge signal may be used.

The control processes done by the microcomputers 11 and 21 of the portable unit 1A and onboard unit 2A will be explained below.

<Portable Unit 1A>

Figure 4:
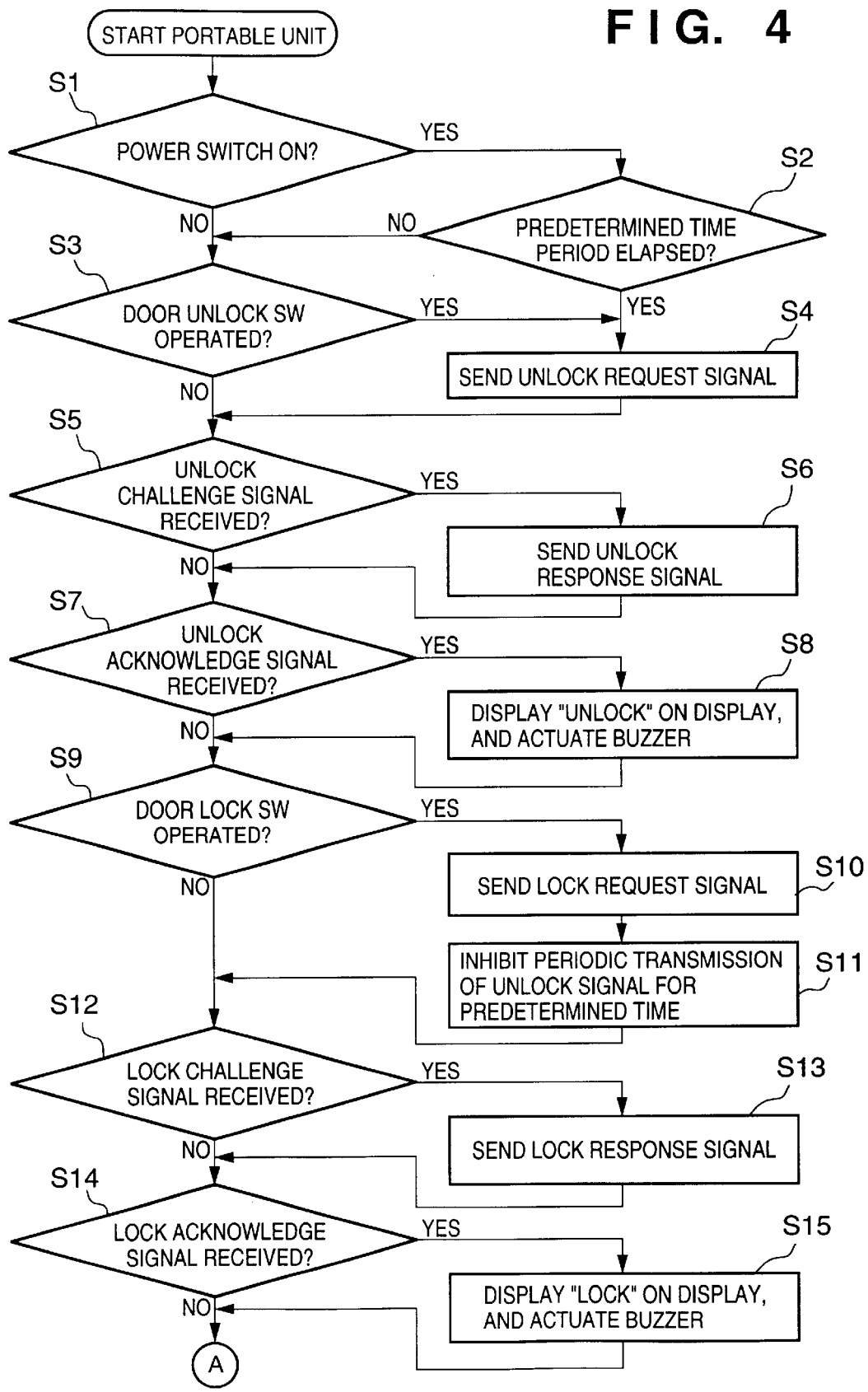
FIG. 4 is a flow chart showing the control process of a portable unit 1A in the first embodiment.
Figure 5:
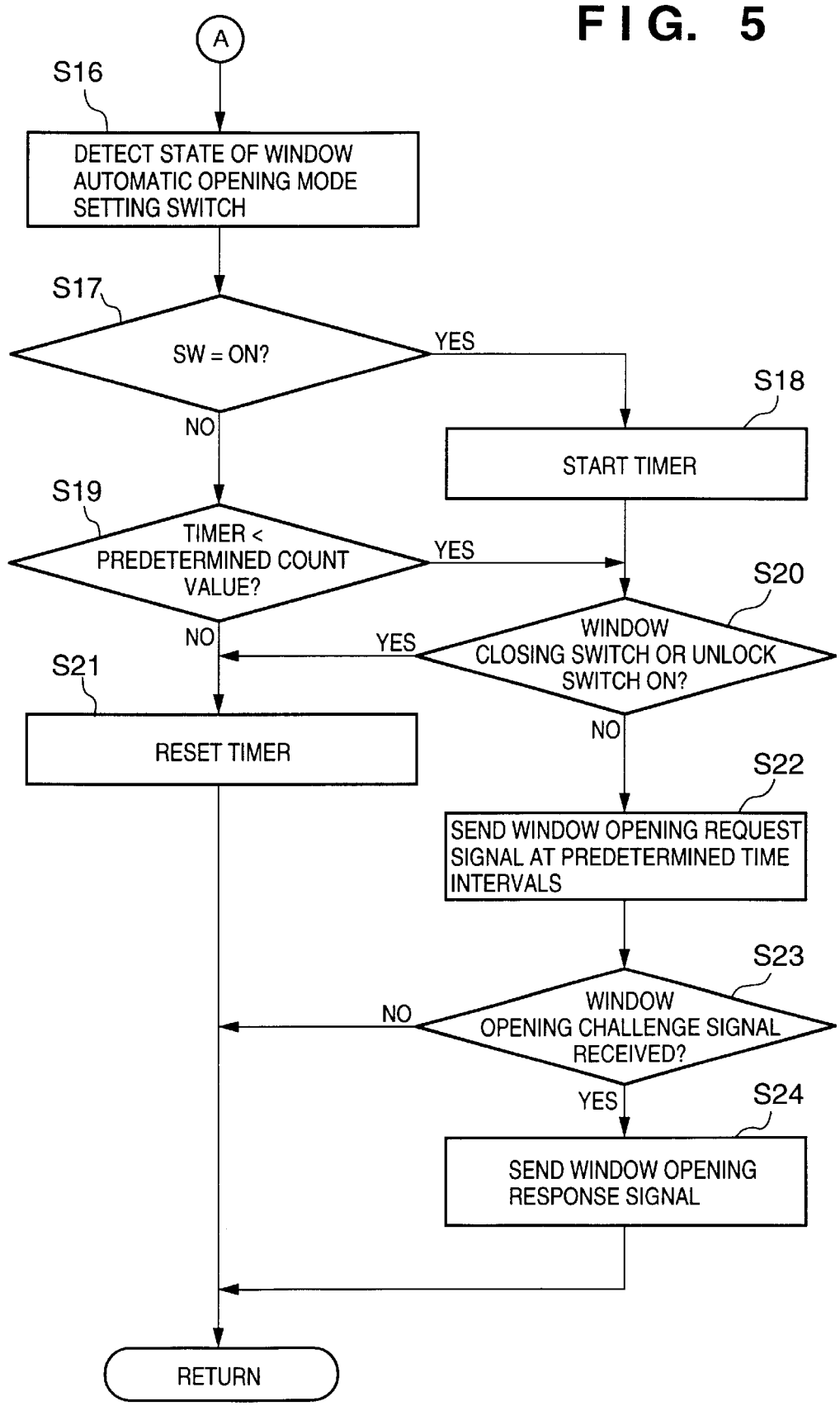
FIG. 5 is a flow chart showing the control process of the portable unit 1A in the first embodiment.

FIGS. 4 and 5 are flow charts showing the control process of the portable unit 1A of the first embodiment.

Steps S1 to S3 in FIG. 4: It is checked if the power switch 19 of the portable unit 1A is ON (step S1). If NO in step S1 (the power switch 19 is OFF), it is checked if the door unlock switch 13 has been operated (step S3); if YES in step S1 (the power switch 19 is ON), it is checked if a predetermined time (e.g., around 1 sec) has elapsed from the output timing of a previous unlock signal (step S2).

Step S4: If it is determined in step S2 that the predetermined time has elapsed or if the operation of the door unlock switch 13 is detected in step S3, the aforementioned unlock request signal is sent. Therefore, in this embodiment, the unlock request signal is automatically sent at predetermined time intervals, and is also sent upon operation of the door unlock switch 13.

Steps S5 and S6: It is checked if the aforementioned unlock challenge signal is received (step S5). If NO in step S5 (no challenge signal is received), the flow advances to step S7; if YES in step S5 (the challenge signal is received), an unlock response signal corresponding to the challenge signal is sent (step S6).

Steps S7 and S8: It is checked if the aforementioned unlock acknowledge signal is received (step S7). If NO in step S7 (no acknowledge signal is received), the flow advances to step S9; if YES in step S7 (the acknowledge signal is received), a predetermined guidance is displayed on the display 18 to inform the user who carries the portable unit 1A that the unlock operation is done by the onboard unit 2A, and the buzzer 17 is actuated (step S8).

Steps S9 to S11: It is checked if the door lock switch 12 has been operated (step S9). If NO in step S9 (the switch 12 has not been operated), the flow advances to step S12; if YES in step S9 (the switch 12 has been operated), the aforementioned lock request signal is sent (step S10), and the unlock request signal which is sent periodically is inhibited from being sent for a predetermined period of time (e.g., about 5 sec) (step S11).

Steps S12 and S13: It is checked if the aforementioned lock challenge signal is received (step S12). If NO in step S12 (no challenge signal is received), the flow advances to step S14; if YES in step S12 (the challenge signal is received), a lock response signal corresponding to that challenge signal is sent (step S13).

Steps S14 and S15: It is checked if the aforementioned lock acknowledge signal is received (step S14). If NO in step S14 (no acknowledge signal is received), the flow advances to step S16; if YES in step S14 (the acknowledge signal is received), a predetermined guidance is displayed on the display 18 to inform the user who carries the portable unit 1A that the lock operation is done by the onboard unit 2A, and the buzzer 17 is actuated (step S15).

Steps S16 to S19: The operation state of the window automatic opening mode setting switch 14 is detected (step S16), and it is then checked if the detected operation state is ON (i.e., the "window automatic opening mode" is selected) (step S17). If YES in step S17 (the switch is ON), time measurement using a timer is started (step S18); if NO in step S17 (the switch is OFF), it is checked if the count value of the timer is smaller than a predetermined value (step S19).

Steps S20 to S22: It is checked if the window closing switch 15 or door unlock switch 13 has been operated (step S20). If NO in step S20 (neither the switch 13 nor the switch 15 are operated), a window opening signal is sent at predetermined time intervals (e.g., around 1 sec) (step S22); if YES in step S20 (the switch 13 or 15 has been operated), the timer is reset (step S21), and the flow returns.

Steps S23 and S24: It is checked if the aforementioned window opening challenge signal is received (step S23). If NO in step S23 (no challenge signal is received), the flow returns; if YES in step S23 (the challenge signal is received), a window opening response signal corresponding to the challenge signal is sent (step S24), and the flow returns.

<Onboard Unit 2A>

Figure 6:
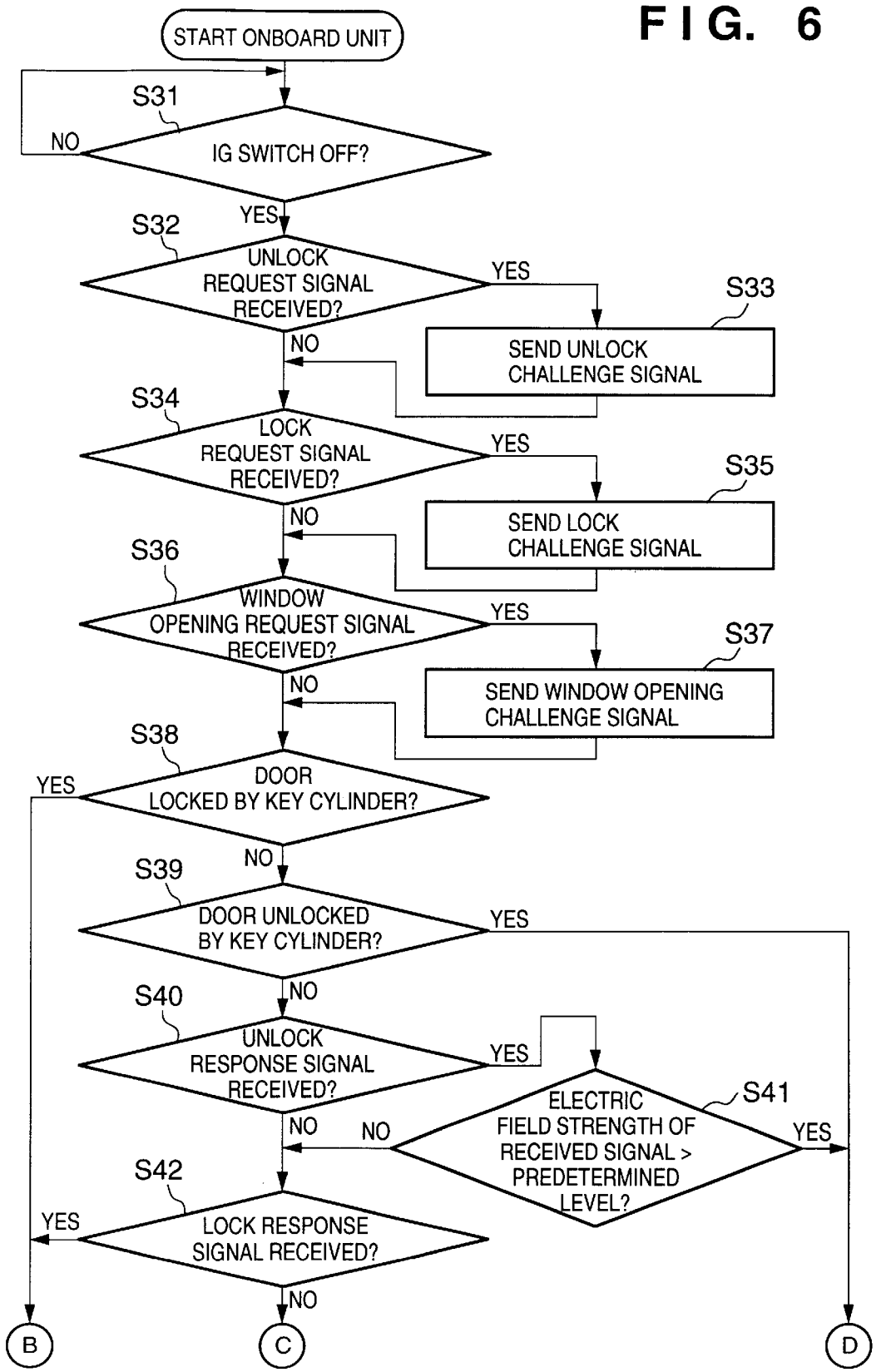
FIG. 6 is a flow chart showing the control process of an onboard unit 2A in the first embodiment.
Figure 7:
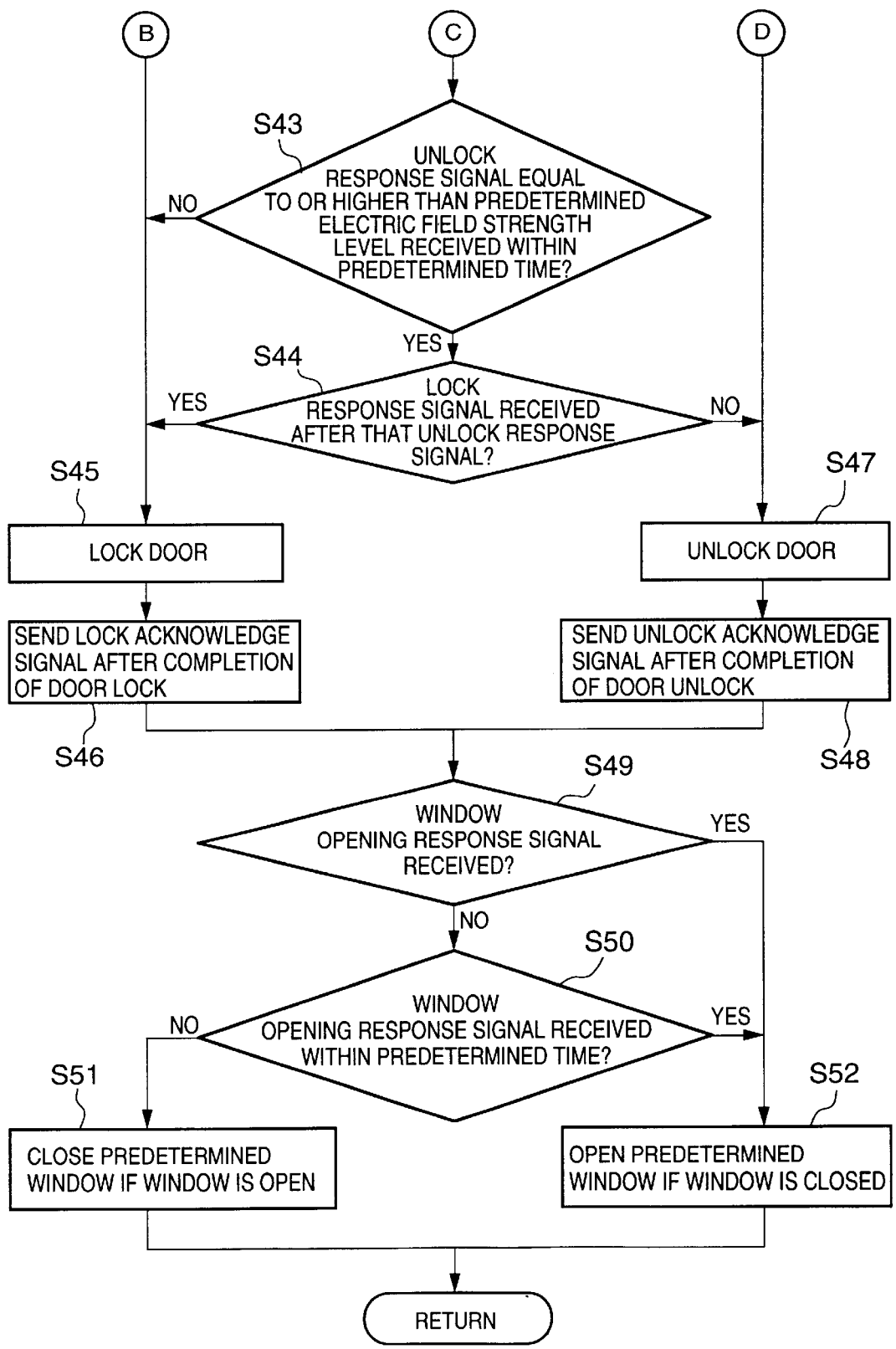
FIG. 7 is a flow chart showing the control process of the onboard unit 2A in the first embodiment.

FIGS. 6 and 7 are flow charts showing the control process of the onboard unit 2A in the first embodiment.

Step S31 in FIG. 6: The state of the ignition switch 25 is detected. If the detected state is OFF, the flow advances to step S32.

Steps S32 and S33: It is checked if the aforementioned unlock request signal is received (step S32). If NO in step S32 (no request signal is received), the flow advances to step S34; if YES in step S32 (the request signal is received), an unlock challenge signal corresponding to that request signal is sent (step S33).

Steps S34 and S35: It is checked if the aforementioned lock request signal is received (step S34). If NO in step S34 (no request signal is received), the flow advances to step S36; if YES in step S34 (the request signal is received), a lock challenge signal corresponding to that request signal is sent (step S35).

Steps S36 and S37: It is checked if the aforementioned window opening request signal is received (step S36). If NO in step S36 (no request signal is received), the flow advances to step S38; if YES in step S36 (the request signal is received), a window opening challenge signal corresponding to that request signal is sent (step S37).

Steps S38 and S39: It is checked by detecting the state of the key cylinder contact switch 24 if the user has locked or unlocked the doors by key operation. If the lock operation is detected, the flow jumps to step S45; if the unlock operation is detected, the flow jumps to step S47. If neither of these operations are detected, the flow advances to step S40.

Steps S40 and S41: It is checked if the aforementioned unlock response signal is received (step S40). If NO in step S40 (no response signal is received), the flow advances to step S42; if YES in step S40 (the response signal is received), it is checked if the electric field strength of the response signal is higher than a predetermined level (step S41). If YES in step S41 (the electric field strength of the response signal is higher than the predetermined level), the flow jumps to step S47 to unlock the doors; if NO in step S41 (the electric field strength of the response signal is lower than the predetermined level), the flow advances to step S42.

Step S42: It is checked if the aforementioned lock response signal is received. If NO In step S42 (no response signal is received), the flow advances to step S43; if YES in step S42 (the response signal is received), the flow jumps to step S45.

Steps S43 and S44: It is checked if the unlock response signal, the electric field strength of which is equal to or higher than the predetermined level, is received again within a predetermined period of time (step S43). If NO in step S43 (no response signal is received), the flow jumps to step S45; if YES in step S43 (the response signal is received), it is checked if a lock response signal is received after that unlock response signal (step S44). If YES in step S44 (the lock response signal is received after that unlock response signal), the flow advances to step S45 to lock the doors; if NO in step S44 (no lock response signal is received after that unlock response signal), the flow advances to step S47.

Steps S45 and S46: The door lock actuator 31 is controlled to lock the doors (step S45). In addition, if completion of the door lock operation is detected by detecting the state of the door lock sensor 23, the aforementioned lock acknowledge signal is sent (step S46), and the flow advances to step S49.

Steps S47 and S48: The door lock actuator 31 is controlled to unlock the doors (step S47). In addition, if completion of the door unlock operation is detected by detecting the state of the door lock sensor 23, the aforementioned unlock acknowledge signal is sent (step S48), and the flow advances to step S49.

Steps S49 and S50: It is checked if the aforementioned window opening response signal is received (step S49). If YES in step S49, it is checked if the window opening response signal is received again within a predetermined period of time (step S50).

Step S51: If NO in step S50 (the window opening response signal is received, but that signal is not detected after an elapse of the predetermined period of time), it means that the portable unit 1A has moved away from the onboard unit 2A. Hence, if the window is open at that time, the power window motor 32 is actuated to close that window, and the flow returns.

Step S52: If YES in step S50 (the window opening response signal is received, and that signal is detected again before an elapse of the predetermined period of time), it means that the portable unit 1A is located near the onboard unit 2A. Hence, if the window is closed at that time, the power window motor 32 is actuated to open that window, and the flow returns.

According to the aforementioned embodiment, when the "window automatic opening mode" is set in advance by the window automatic opening mode setting switch 14, the portable unit 1A outputs a window opening response signal for a predetermined period of time. Hence, when the user who carries the portable unit 1A approaches the onboard unit 2A, the doors are automatically unlocked, and the window of a predetermined door is opened. In this way, when, for example, the user carries baggage with both his or her hands, he or she can put baggage into the passenger room prior to opening the door, and convenience upon getting into the automobile together with baggage in a narrow parking space can be improved. Also, since this function can be disabled by the window automatic opening mode setting switch 14, an appropriate operation can be selected even when it is not preferable to automatically open the window as in a heavy rain or the like.

In the aforementioned embodiment, the window opening response signal is output from the portable unit 1A for a predetermined period of time, but may be periodically sent like the unlock request signal as long as transmission of that signal can be manually stopped.

This embodiment does not specify any window to be opened, and can be applied to a window of any door of the automobile (including a hatch type back door including a power window) or may adopt a system arrangement that allows arbitrary setups. In this case, in consideration of the convenience for a driver who is highly likely to carry the portable unit 1A, it is most convenient to open the window provided to a door on the rear side of the door of the driver's seat.

In this embodiment, when the user who carries the portable unit 1A moves away from the onboard unit 2A (automobile), since the window can be automatically closed in the process in steps S49 to S51 in FIG. 7, the portable unit 1A need not comprise the window closing switch 15.

Second Embodiment

The second embodiment which is based on the keyless entry system according to the first embodiment mentioned above will be explained below. In this embodiment, a repetitive description of the arrangement which is similar to that in the first embodiment will be omitted, and characteristic features of this embodiment will be mainly explained below.

In the first embodiment described above, as basic operations, the doors are automatically locked/unlocked in accordance with the electric field strength of a radio signal sent from the portable unit 1A at predetermined time intervals, and when the window automatic opening mode setting switch 14 is ON, the portable unit 1A outputs a window opening response signal for a predetermined period of time, thus automatically opening/closing the window. Alternatively, since the doors are locked/unlocked and the window is opened/closed in response to user's switch operations in this embodiment, no process for outputting the same kind of signal several times at given time intervals is included.

Hence, the hardware arrangements in this embodiment are substantially the same as those in FIGS. 1 and 2 in the first embodiment, except that reference numeral 14 in the portable unit 1A denotes a window opening switch which can open the window of the automobile. Also, in this embodiment, a door handle switch 26 is used in the onboard unit 2A.

Figure 8:
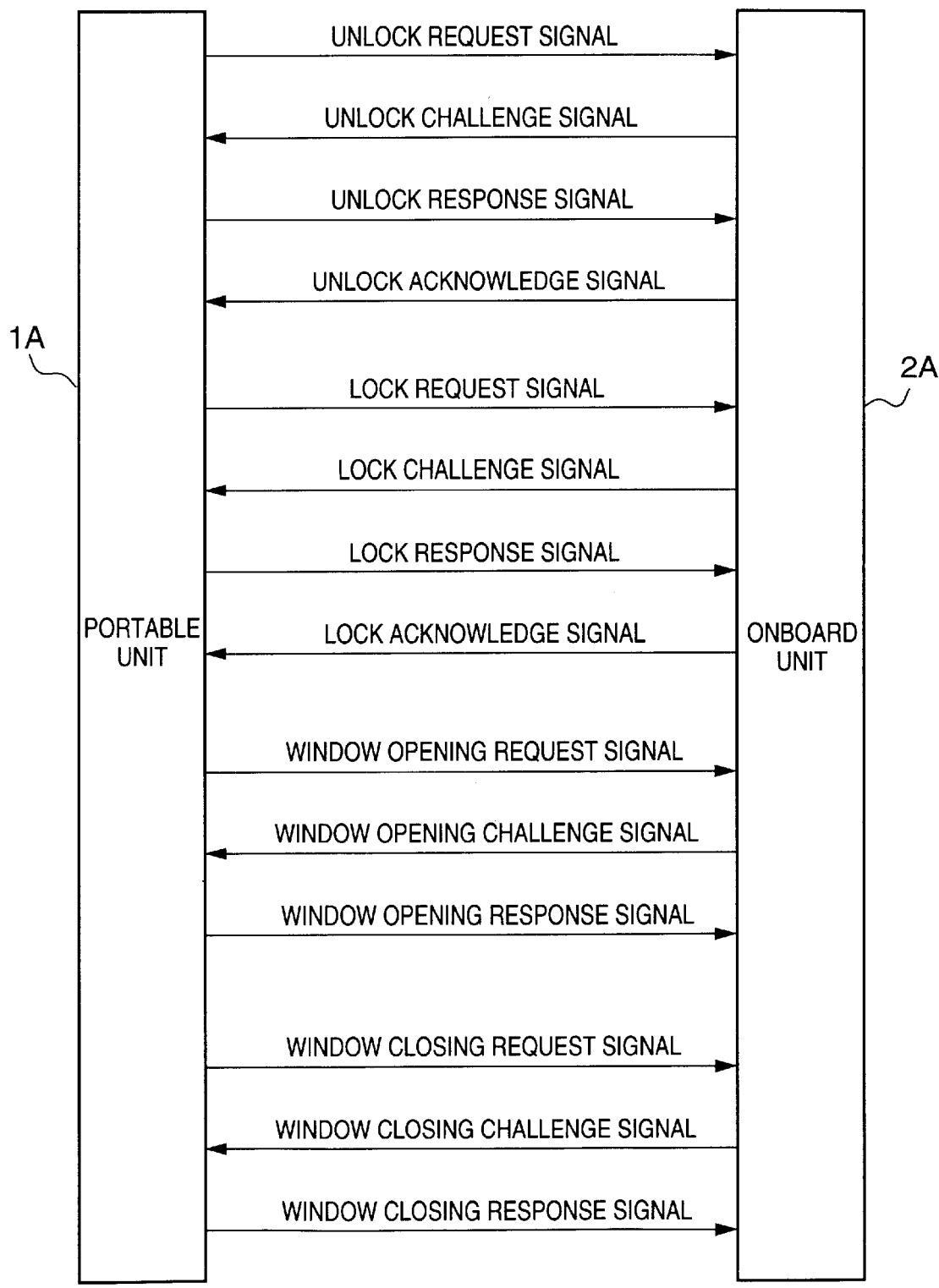
FIG. 8 is a view showing transmission/reception signals in a keyless entry system according to the second embodiment.

FIG. 8 shows transmission/reception signals in the keyless entry system in the second embodiment. Unlike in FIG. 3 of the first embodiment, a communication sequence for closing the window by the power window motor 32 is added. This sequence includes exchange of challenge and response signals in terms of security, but no acknowledge signal is output as in the communication sequence upon opening the window.

The control processes done by the microcomputers 11 and 21 of the portable unit 1A and onboard unit 2A will be explained below.

<Portable Unit 1A>

Figure 9:
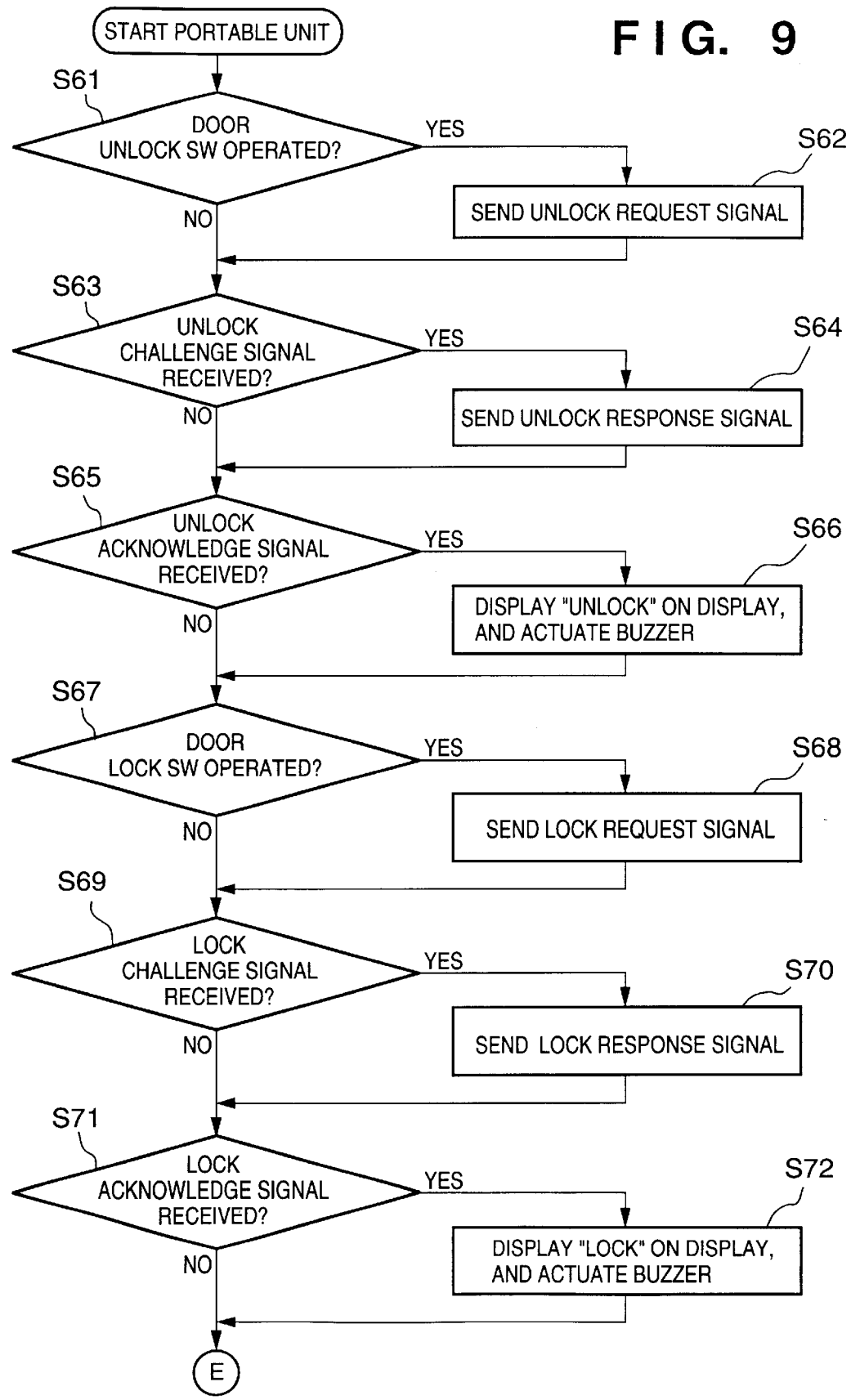
FIG. 9 is a flow chart showing the control process of the portable unit 1A in the second embodiment.
Figure 10:
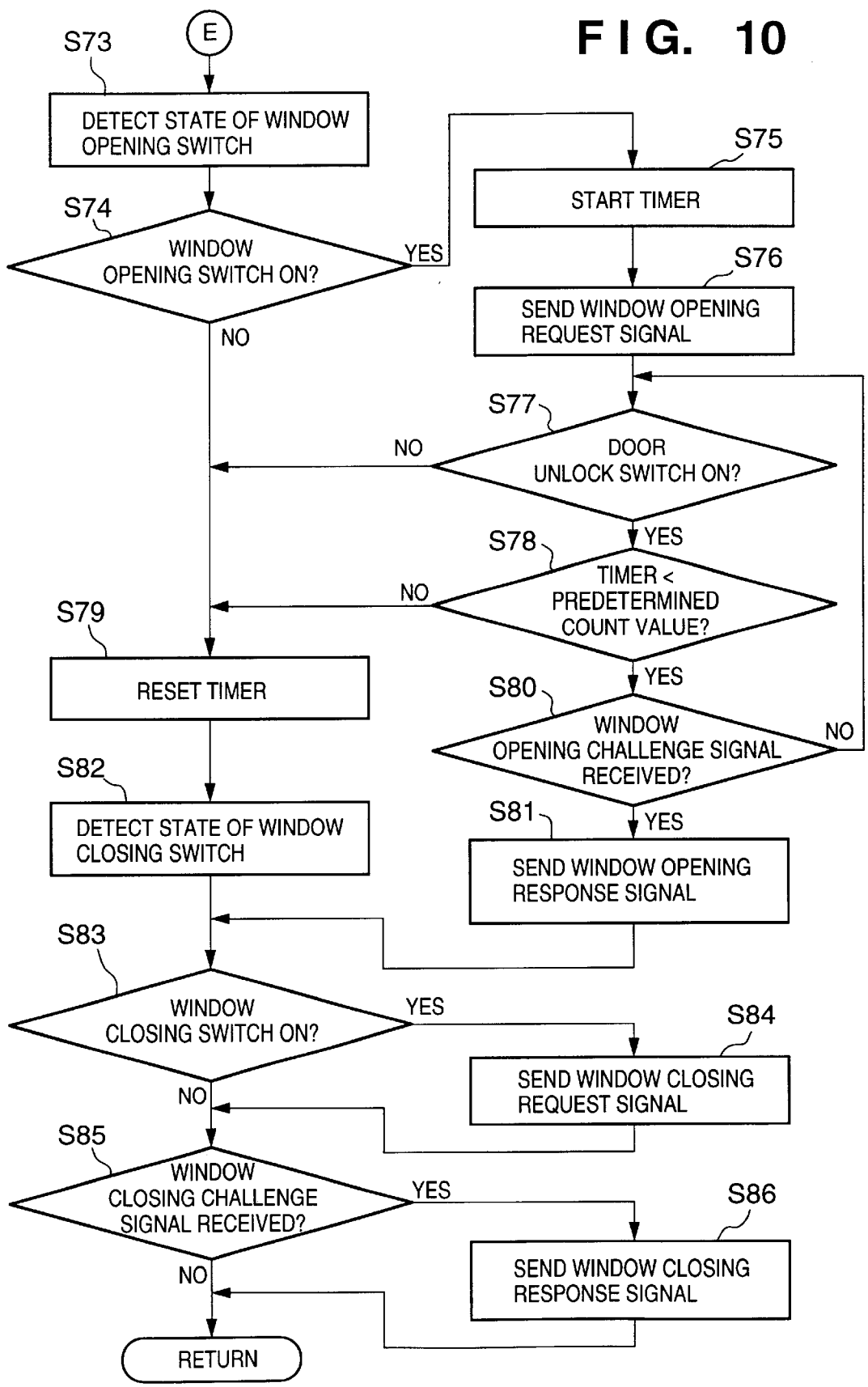
FIG. 10 is a flow chart showing the control process of the portable unit 1A in the second embodiment.

FIGS. 9 and 10 are flow charts showing the control process of the portable unit 1A in the second embodiment.

Steps S61 to S72 in FIG. 9: The same processes as those in steps S3 to S15 in the first embodiment are done. In this embodiment, since an unlock request signal is sent only upon operation of the door lock switch 12, no processes corresponding to steps S1 and S2 are included, and no process corresponding to step S11 is included accordingly.

Steps S73 and S74: The operation state of the window opening switch 14 is detected (step S73), and it is checked if the detected operation state is ON (step S74). If YES in step S74 (the operation state of that switch is ON), the flow advances to step S75; if NO in step S74 (the operation state of that switch is OFF), the flow advances to step S79.

Steps S75 and S76: Time measurement of the timer is started (step S75), a window opening request signal is sent (step S76), and the flow advances to step S77.

Steps S77 to S79: The operation state of the door unlock switch 13 is checked. If the switch is ON, the timer is reset (step S79); if the switch is OFF, it is checked if the count value of the timer is smaller than a predetermined count value (step S78).

Steps S80 and S81: It is checked if a window opening challenge signal is received (step S80). If NO in step S80 (no challenge signal is received), the flow returns to step S77; if YES in step S80 (the challenge signal is received), a window opening response signal corresponding to that challenge signal is sent (step S81).

Steps S82 to S84: The operation state of the window opening switch 15 is detected (step S82), and it is checked if the detected operation state is ON (step S83). If NO in step S83 (the operation state of that switch is OFF), the flow advances to step S85; if YES in step S83 (the operation state of that switch is ON), a window closing request signal is sent (step S84).

Steps S85 and S86: It is checked if a window closing challenge signal is received (step S85). If NO in step S85 (no challenge signal is received), the flow returns; if YES in step S85 (the challenge signal is received), a window closing response signal corresponding to that challenge signal is sent (step S86).

<Onboard Unit 2A>

Figure 11:
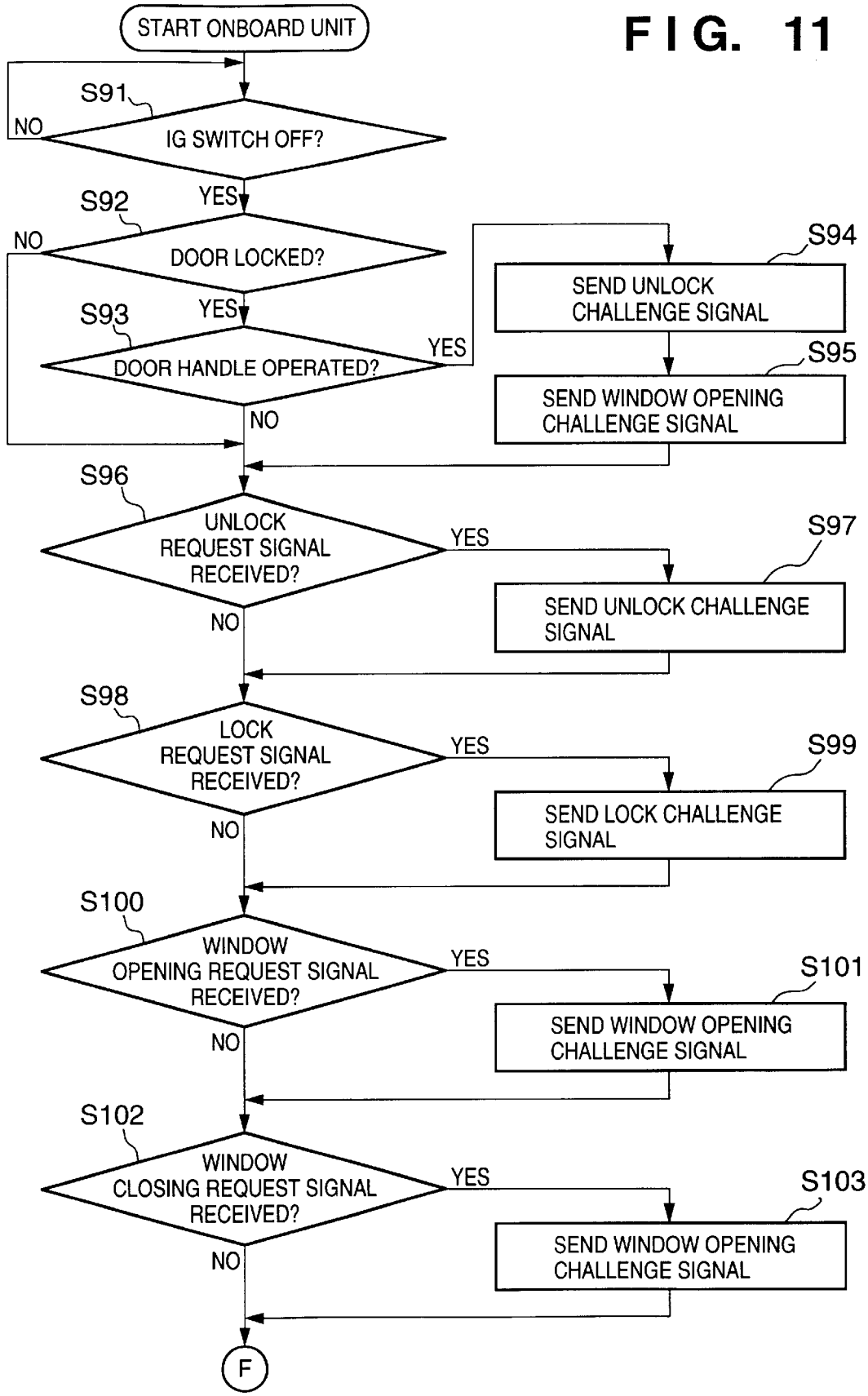
FIG. 11 is a flow chart showing the control process of the onboard unit 2A in the second embodiment.
Figure 12:
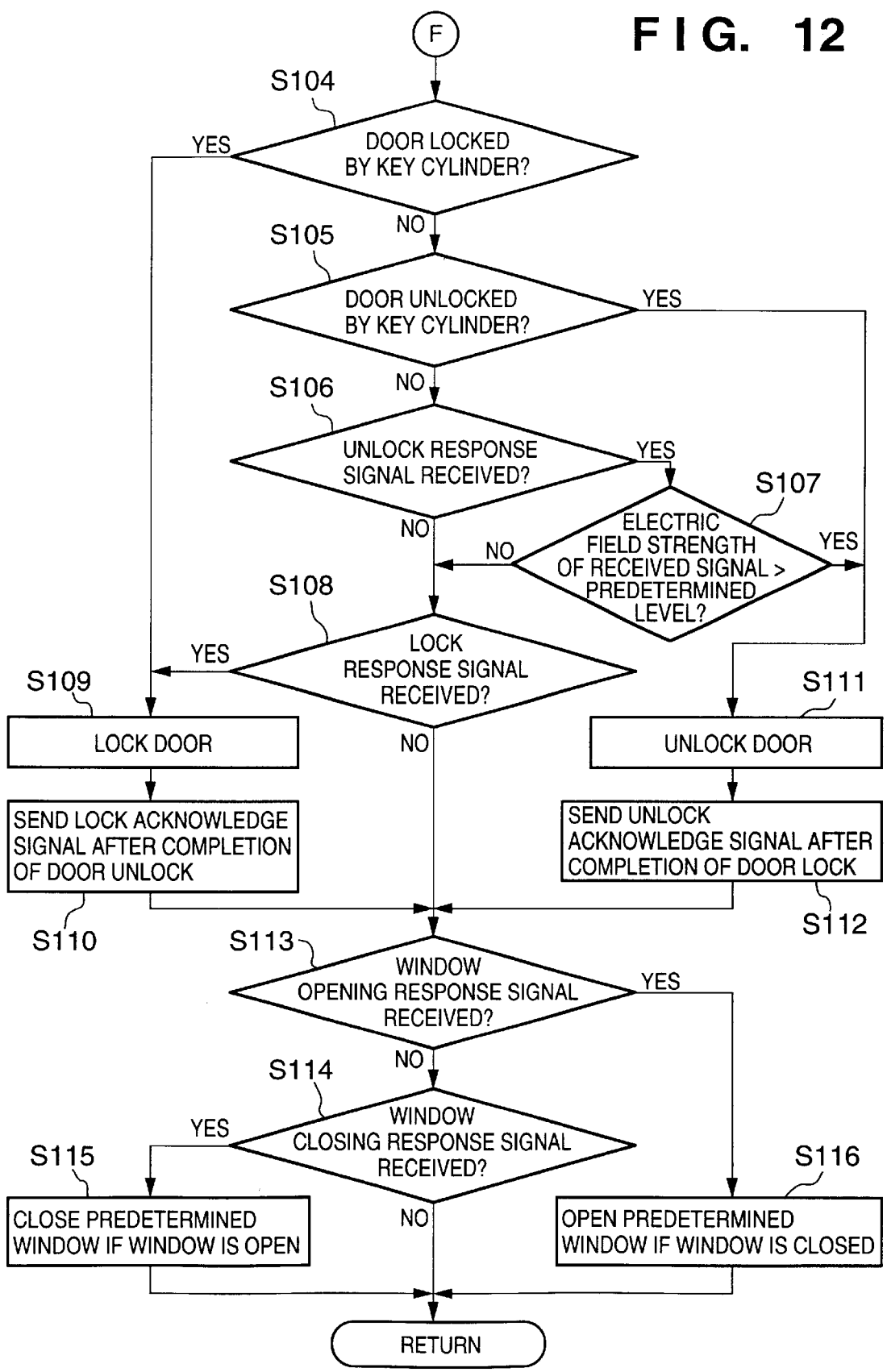
FIG. 12 is a flow chart showing the control process of the onboard unit 2A in the second embodiment.

FIGS. 11 and 12 are flow charts showing the control process of the onboard unit 2A in the second embodiment.

Step S91 in FIG. 11: The state of the ignition switch 25 is detected, and if the detected state is OFF, the flow advances to step S91.

Steps S92 to S95: It is checked based on the detection state of the door lock sensor 23 if the state of the door lock actuator 31 is the door lock state (step S92). If NO in step S92 (unlock state), the flow jumps to step S96; if YES in step S92 (lock state), it is checked based on the door handle switch 26 if the door handle has been operated (step S93). If NO in step S93 (the door handle has not been operated), the flow advances to step S96; if YES in step S93, an unlock challenge signal is sent (step S94), and a window opening challenge signal is sent (step S95).

Steps S96 to S103: As in steps S32 to S37 in FIG. 6 in the first embodiment, it is checked if unlock, lock, and window opening request signals are received. If each request signal is received, the corresponding challenge signal is sent. Furthermore, if reception of a window closing request signal is detected in step S102, a window closing challenge signal is sent (step S103).

Steps S104 to S108: As in steps S38 to S42 in FIG. 6 in the first embodiment, it is checked if the user locks or unlocks the doors by key operation, and it is also checked if unlock and lock response signals are received.

Steps S109 to S113: As in steps S45 to S49 in FIG. 7 in the first embodiment, the doors are locked, and its acknowledge signal is sent, or the doors are unlocked and its acknowledge signal is sent. In addition, it is checked if a window opening response signal is received. If it is determined that the response signal is received, the flow advances to step S116; otherwise, the flow advances to step S114.

Step S114: It is checked if a window closing response signal is received. If it is determined that the response signal is received, the flow advances to step S115; otherwise, the flow returns.

Steps S115 and S116: As in steps S51 and S52 in FIG. 7 in the first embodiment, the window is opened/closed, and the flow returns.

According to this embodiment mentioned above, since the doors are locked/unlocked and the window is opened/closed in response to user's switch operation at the portable unit 1A, convenience can be improved.

Third Embodiment

The third embodiment based on the keyless entry system according to the first embodiment mentioned above will be explained below. In this embodiment, a repetitive description of the arrangement which is similar to that in the first embodiment will be omitted, and characteristic features of this embodiment will be mainly explained below.

In this embodiment, the doors are automatically locked/unlocked in accordance with the electric field strength of a radio signal output from the portable unit 1A at predetermined time intervals as in the first embodiment. However, since the window is opened in response to user's operation at a door handle, the portable unit (a portable unit 1B in this embodiment) has no window automatic opening mode setting switch 14. Since the operation is made depending on whether the user has operated a front or rear door handle, door handles, door lock actuators, and the like at a plurality of positions are controlled, as will be described later.

Figure 13:
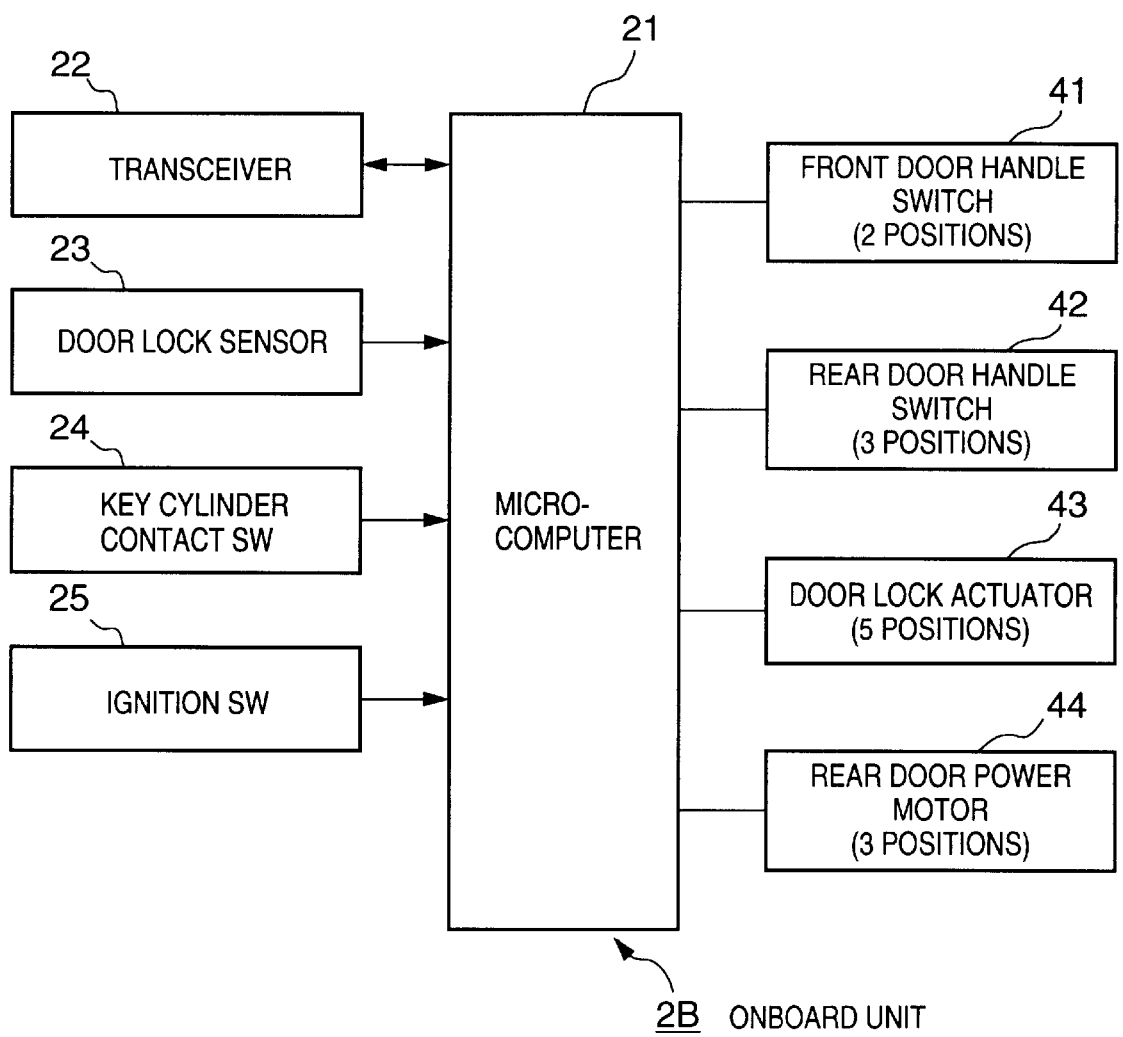
FIG. 13 is a block diagram showing the device arrangement of an onboard unit in the third embodiment.

FIG. 13 is a block diagram showing the device arrangement of an onboard unit in the third embodiment.

Since an onboard unit 2B shown in FIG. 13 controls, for example, five doors of the automobile, front door handle switches 41 at two positions, rear door handle switches 42 at three positions, door lock actuators 43 at these five positions, and rear door power window motors 44 at three positions are connected to the microcomputer 21. Other blocks are the same as those in FIG. 2 in the first embodiment.

Figure 14:
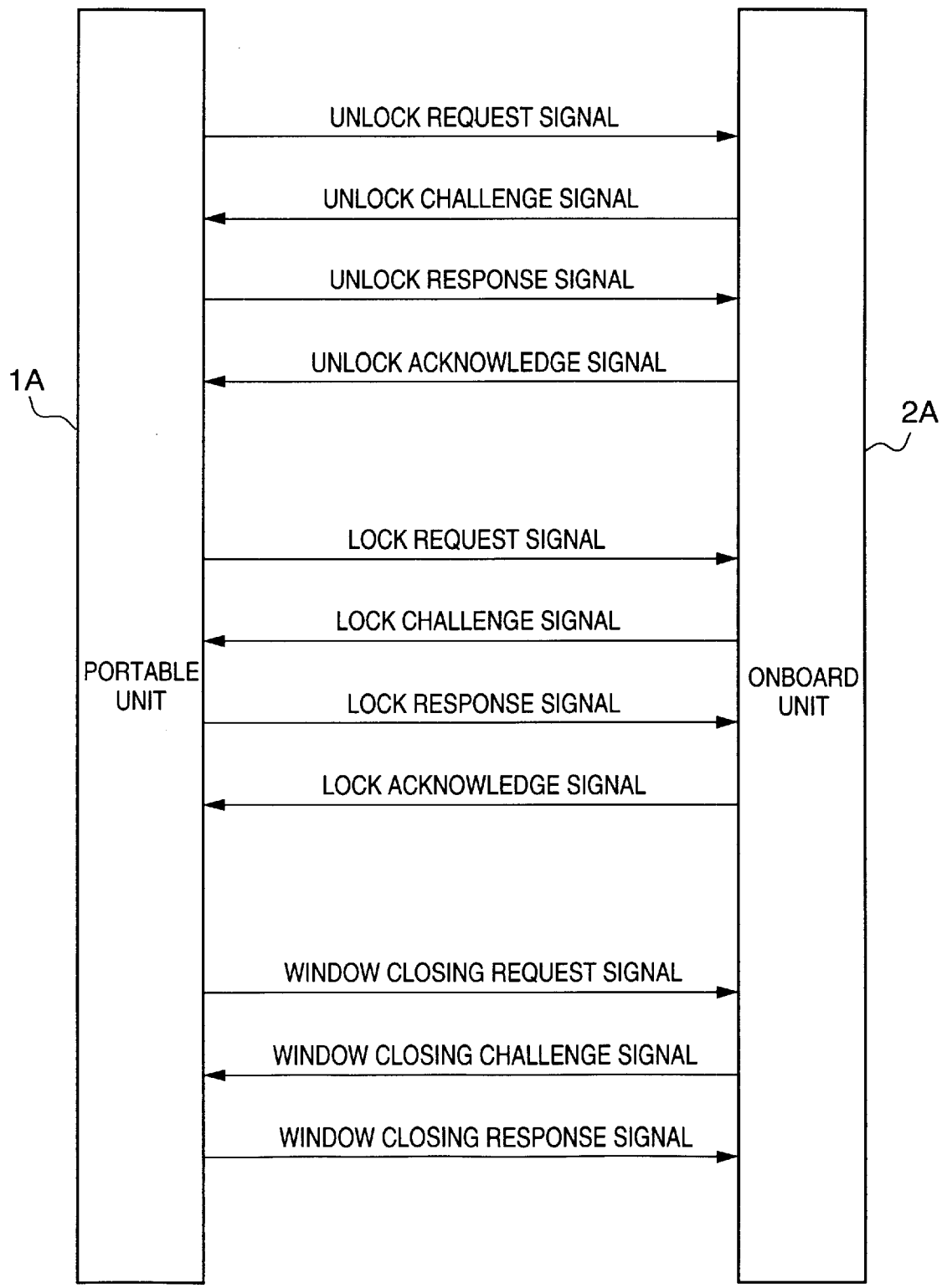
FIG. 14 is a view showing transmission/reception signals in a keyless entry system according to the third embodiment.

FIG. 14 shows transmission/reception signals in the keyless entry system according to the third embodiment. Unlike in FIG. 3 in the first embodiment, the communication sequences shown in FIG. 14 includes a communication sequence for closing the window in place of that for opening the window.

The control processes done by the microcomputers 11 and 21 of the portable unit 1B and onboard unit 2B will be explained below.

<Onboard Unit 1B>

Figure 15:
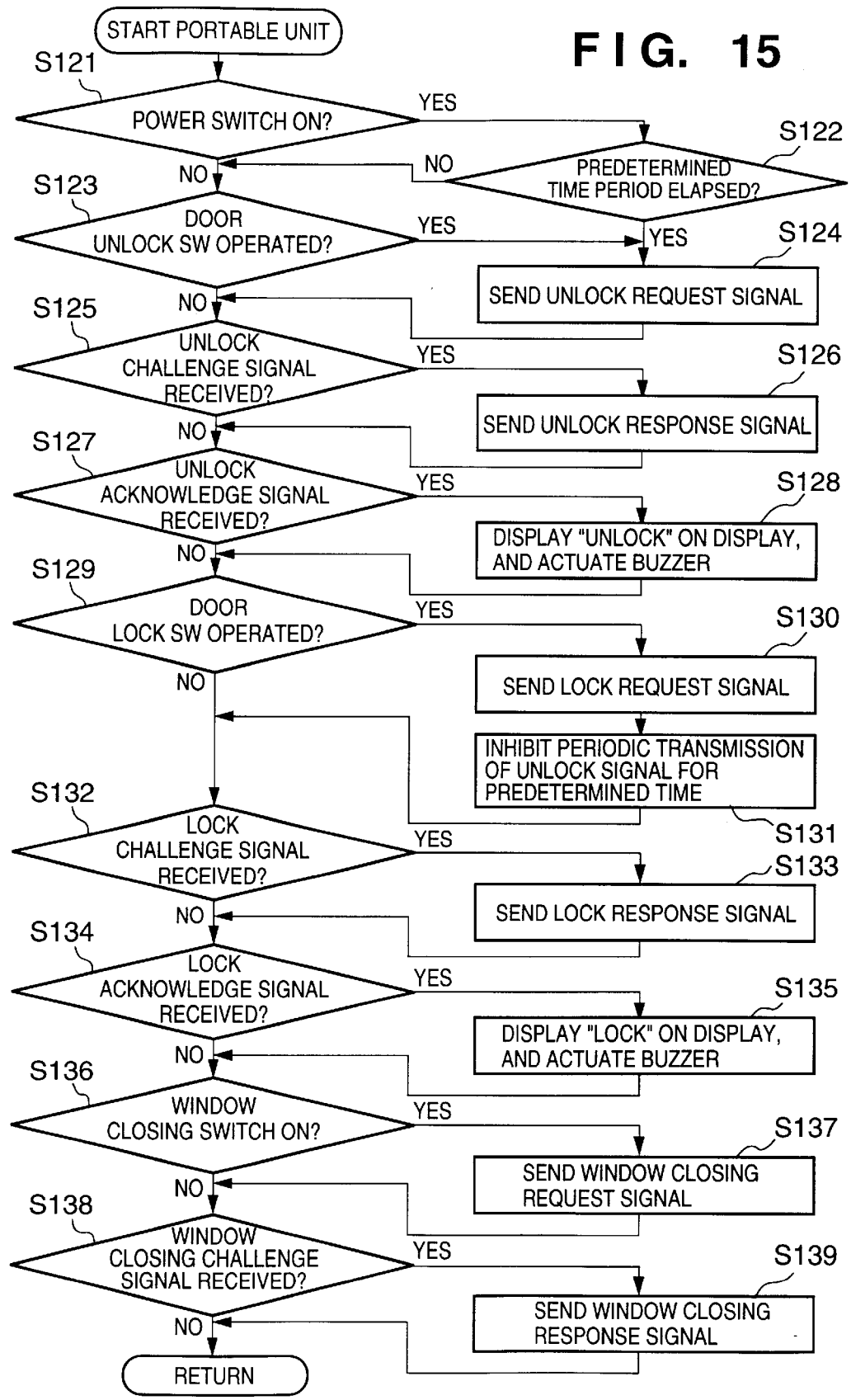
FIG. 15 is a flow chart showing the control process of a portable unit 1B in the third embodiment.

FIG. 15 is a flow chart showing the control process of the portable unit 1B in the third embodiment.

Steps S121 to S135 in FIG. 15: The same processes as in steps S1 to S15 in FIG. 4 in the first embodiment are done.

Steps S136 to S139: If the window closing switch 15 has been operated, a window closing request signal is sent (steps S136 and S137). Also, upon receiving a window closing challenge signal, a window closing response signal corresponding to that challenge signal is sent (steps S138 and S139).

<Onboard Unit 2B>

Figure 16:
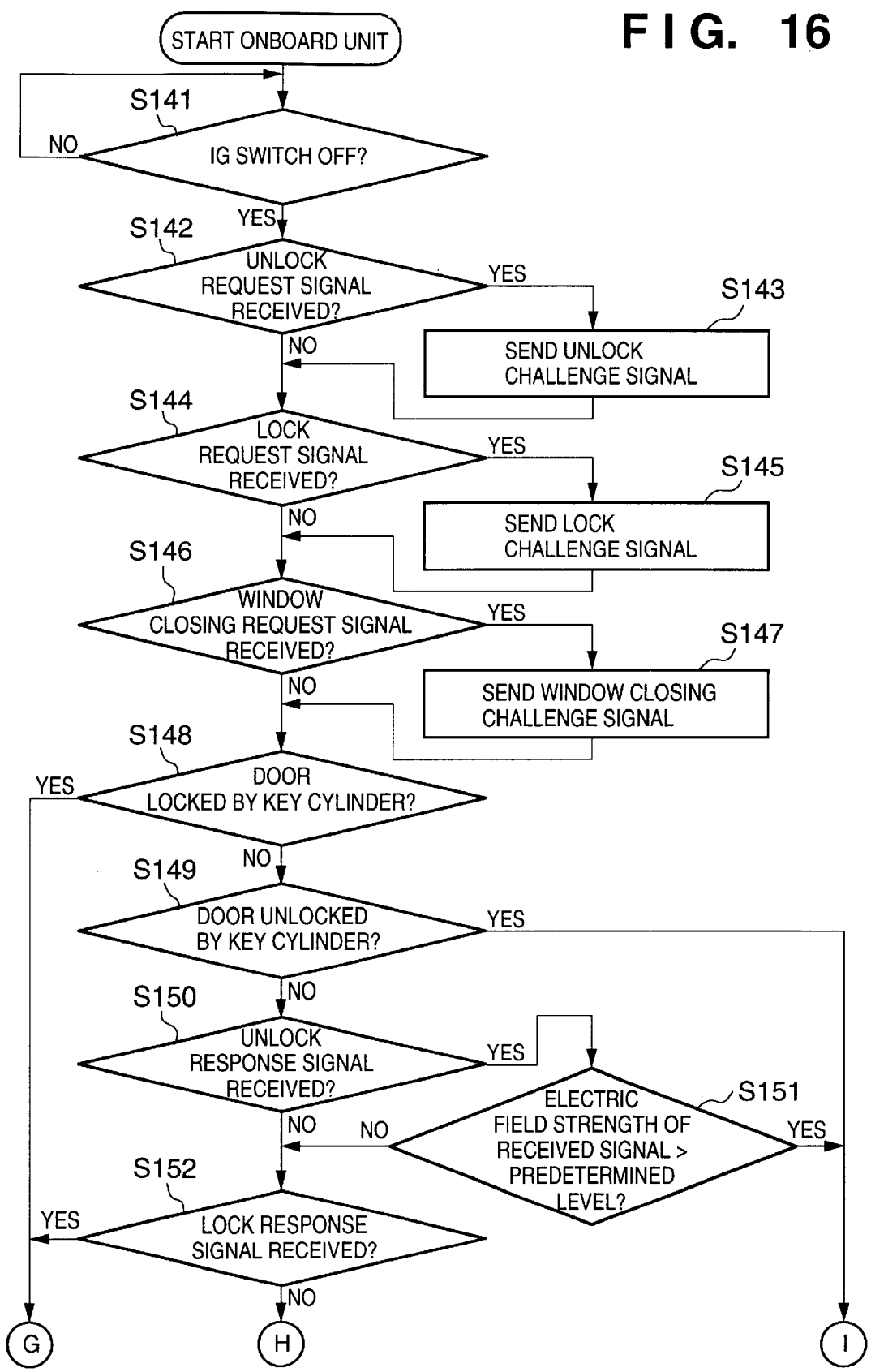
FIG. 16 is a flow chart showing the control process of an onboard unit 2B in the third embodiment.
Figure 17:
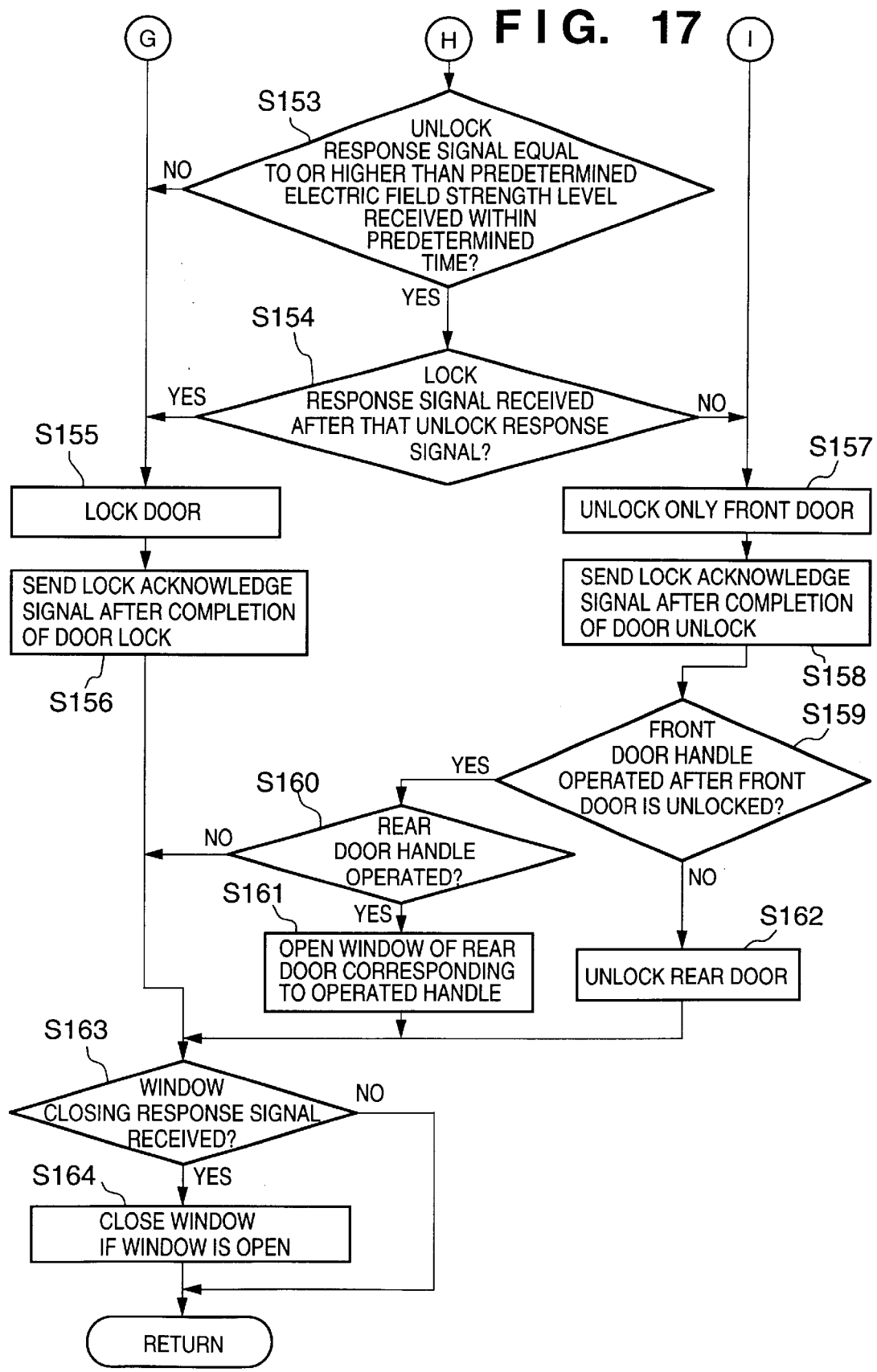
FIG. 17 is a flow chart showing the control process of the onboard unit 2B in the third embodiment.

FIGS. 16 and 17 are flow charts showing the control process of the onboard unit 2B in the third embodiment.

Steps S141 to S152 in FIG. 16: Substantially the same processes as in steps S31 to S42 in FIG. 6 in the first embodiment are executed, except that it is checked in step S146 if a window closing request signal is received, and a window closing challenge signal is sent in step S147.

Steps S153 to S156: The same processes as in steps S43 to S46 in FIG. 7 in the first embodiment are done.

Steps S157 and S158: The door lock actuators 43 for two front doors are actuated to unlock the doors (step S157), and an unlock acknowledge signal is sent (step S158) as in step S48 in FIG. 7 in the first embodiment.

Steps S159 to S162: It is checked by detecting the state of the front door handle switches 41 if the front door has been operated after the unlocked timing of the front doors in step S157 (step S159). If YES in step S159 (the corresponding handle operation is detected), since it is determined that the window of the rear door need not be automatically opened, the door lock actuators 43 of the three rear doors are actuated to unlock doors (step S162); if NO in step S159 (no handle operation is detected), it is checked by detecting the states of the rear door handle switches 42 if one rear door handle has been operated (step S160). If it is determined in step S160 that one rear door handle has been operated, the rear door power window motor 44 is actuated to open the window of the corresponding rear door (step S161); otherwise, the flow advances to step S163.

Steps S163 and S164: It is checked if a window closing response signal is received (step S163). If YES in step S163 (the response signal is received), the open window of the rear door is closed by actuating the rear door power window motor 44 (step S164); if NO in step S163 (no response signal is received), the flow returns.

According to the above embodiment, when the user who carries the portable unit 1B approaches the onboard unit 2B, the doors are automatically unlocked. In addition, when the user operates the door handle of the rear door before he or she gets into the automobile by operating the door handle of the front door, the window of the corresponding rear door is automatically opened. Hence, when, for example, the user holds baggage with both his or her hands, he or she can put baggage in the passenger room before he or she opens the door, thus improving convenience when the user gets into the automobile together with baggage in a narrow parking space. Since this function is disabled when the door handle of the front door is operated before that of the rear door is operated, appropriate operations according to the user's will can be realized.

In the above embodiment, the window is opened when the rear door handle is operated. However, the present invention is not limited to such specific arrangement. For example, operation of a switch provided to an inconspicuous position on, e.g., a side mirror, pressing of the user's body against, e.g., the rear door handle, or the like may be detected, and may be used as a trigger for opening the window.

Fourth Embodiment

The fourth embodiment based on the keyless entry systems according to the second and third embodiments mentioned above will be explained below. In this embodiment, a repetitive description of the arrangement which is similar to that in the above embodiments will be omitted, and characteristic features of this embodiment will be mainly explained below.

In this embodiment, a plurality of door handles, door lock actuators, and the like are to be controlled using the same hardware arrangement as that in the third embodiment described above, and the portable unit sends an unlock request signal only when the door unlock switch 13 is operated as in the second embodiment. Hence, in this embodiment, the types of signals exchanged between the portable unit 1B and onboard unit 2B are the same as those in FIG. 14 in the third embodiment.

The control processes done by the microcomputers 11 and 21 of the portable unit 1B and onboard unit 2B will be explained below.

<Portable Unit 1B>

Figure 18:
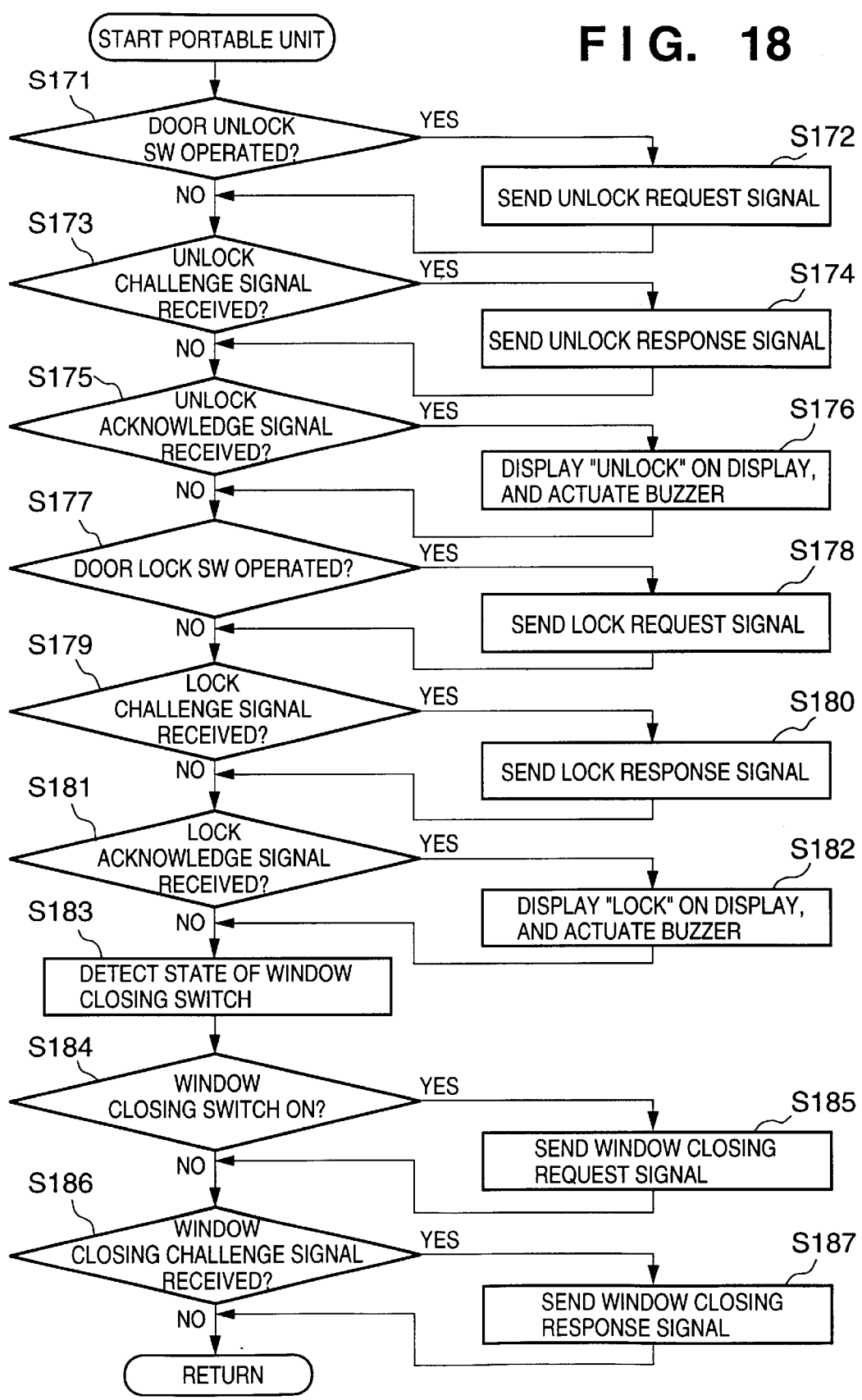
FIG. 18 is a flow chart showing the control process of the portable unit 1B in the fourth embodiment.

FIG. 18 is a flow chart showing the control process of the portable unit 1B in the fourth embodiment.

Steps S171 to S182 in FIG. 18: The same processes as in steps S62 to S72 in FIG. 9 in the second embodiment are done.

Steps S183 to S187: The same processes as in steps S82 to S86 in FIG. 10 in the second embodiment are done.

<Onboard Unit 2B>

Figure 19:
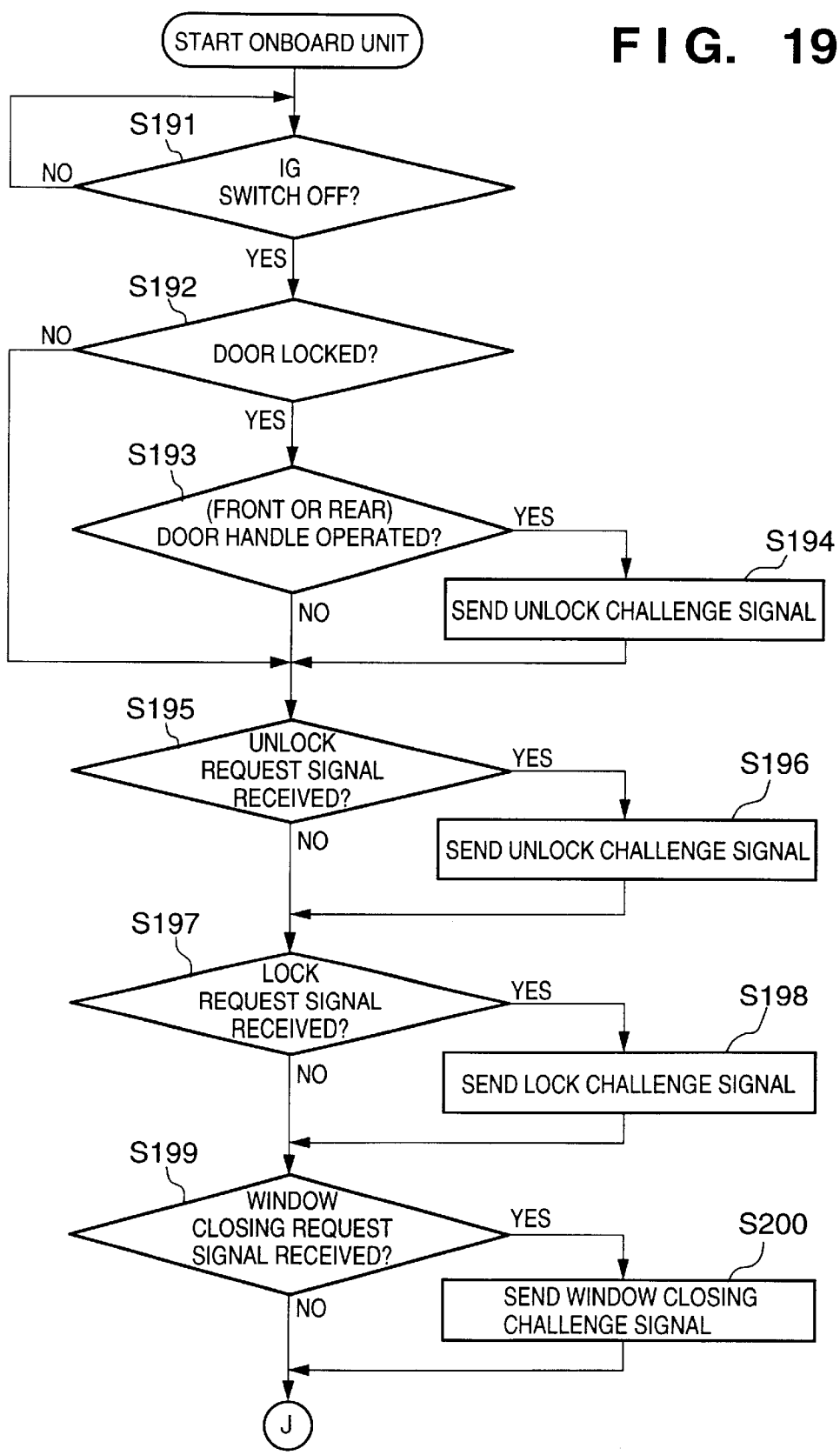
FIG. 19 is a flow chart showing the control process of the onboard unit 2B in the fourth embodiment.
Figure 20:
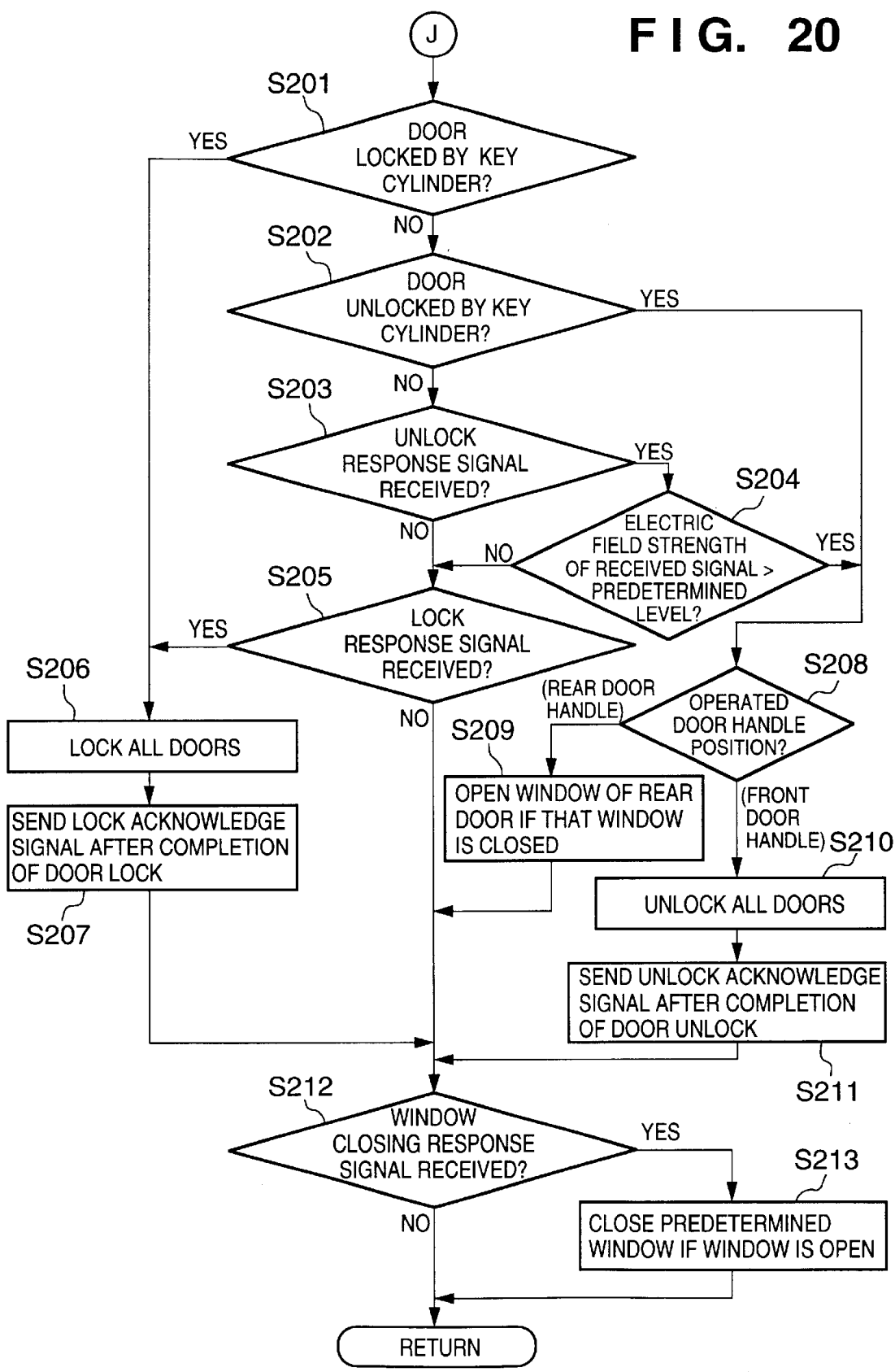
FIG. 20 is a flow chart showing the control process of the onboard unit 2B in the fourth embodiment.

FIGS. 19 and 20 are flow charts showing the control process of the onboard unit 2B in the fourth embodiment.

Steps S191 to S200 in FIG. 19: Substantially the same processes as in steps S91 to S103 in FIG. 11 in the second embodiment are executed. However, since the portable unit 1B of this embodiment has no window opening switch 14, processes corresponding to steps S95, S102, and S103 as processes for opening the window in response to switch operation are not included in this embodiment.

Steps S201 to S207: The same processes as in steps S104 to S110 in FIG. 12 in the second embodiment are done.

Step S208: The position of the operated door handle is determined by the door handle switches 41 and 42. If it is detected that the rear door handle has been operated, the flow advances to step S209; if it is detected that the front door handle has been operated, the flow advances to step S210.

Step S209: If the window of the rear door is closed, the rear door power window motor 44 is actuated to open that window.

Steps S210 and S211: The door lock actuators 43 at five positions are actuated to unlock all the doors (step S210), and upon completion of the unlock operation, an unlock acknowledge signal is sent (step S211).

Steps S212 and S213: It is checked if a window closing response signal is received (step S212). If YES in step S212 (the response signal is received), the open window of the rear door is closed by actuating the corresponding rear door power window motor 44 (step S213); if NO in step S212 (no response signal is received), the flow returns.

According to this embodiment mentioned above, the doors are unlocked in response to user's switch operation as in the second embodiment, and the window of the corresponding rear door is automatically opened when the user operates the door handle of the rear door before he or she gets into the automobile by operating the door handle of the front door as in the third embodiment. Hence, when, for example, the user holds baggage with both his or her hands, he or she can put baggage in the passenger room before he or she opens the door, thus improving convenience when the user gets into the automobile together with baggage in a narrow parking space. Since this function is disabled when the door handle of the front door is operated before that of the rear door is operated, appropriate operations according to the user's will can be implemented.

In this embodiment as well, the window is opened when the rear door handle is operated. However, the present invention is not limited to such specific arrangement. For example, operation of a switch provided to an inconspicuous position on, e.g., a side mirror, pressing of the user's body against, e.g., the rear door handle, or the like may be detected, and may be used as a trigger for opening the window.

Fifth Embodiment

The fifth embodiment based on the keyless entry system according to the third embodiment mentioned above will be explained below. In this embodiment, a repetitive description of the arrangement which is similar to that in the above embodiments will be omitted, and characteristic features of this embodiment will be mainly explained below.

This embodiment adopts the portable unit and its control process in the third embodiment, and the onboard unit executes processes for detecting the direction of a radio signal sent from that portable unit or detecting the user position outside the automobile, and automatically opening the window of the door corresponding to the detected direction. For this purpose, this embodiment adopts the portable unit 1B that has been explained with reference to the flow chart in FIG. 15 in the third embodiment, and an onboard unit that implements the aforementioned function will be explained below.

<Onboard Unit 2C>

Figure 21:
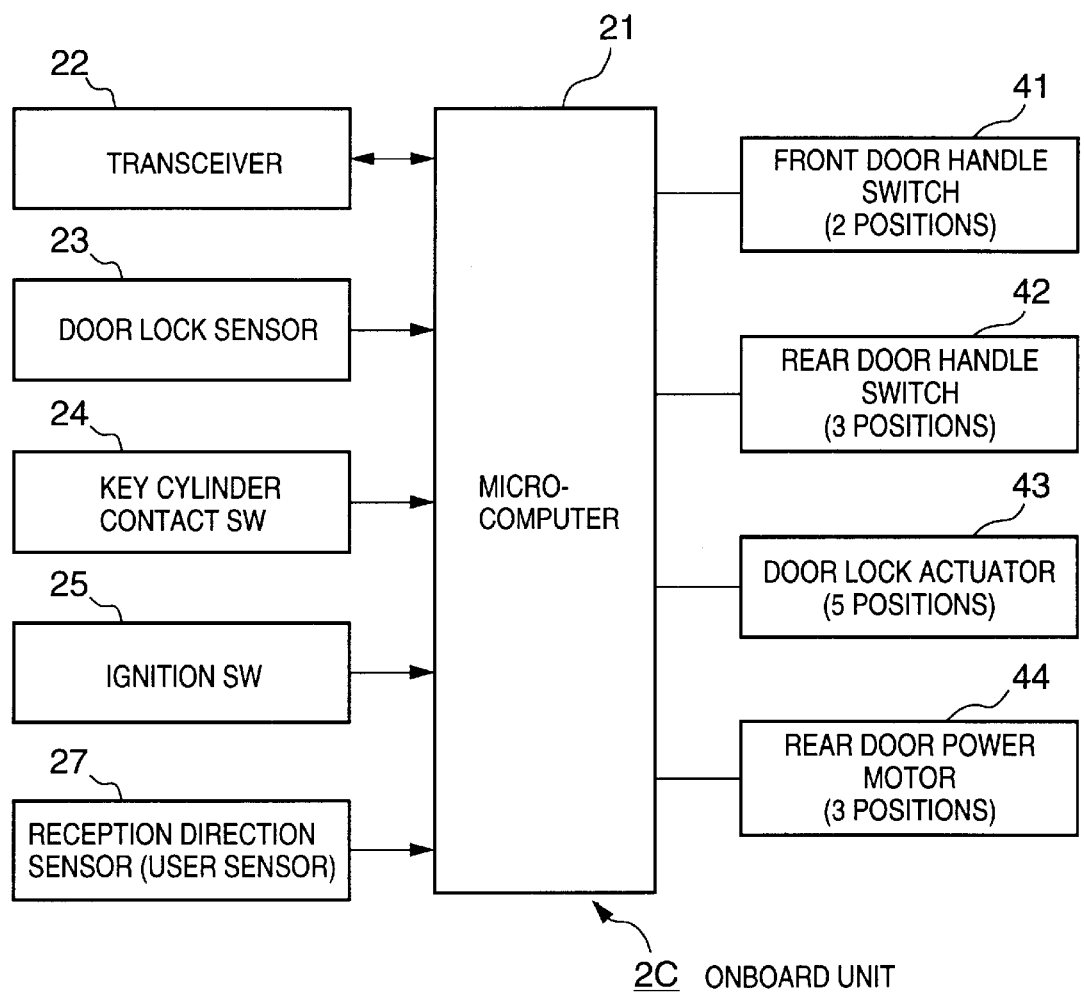
FIG. 21 is a block diagram showing the device arrangement of an onboard unit in the fifth embodiment.

FIG. 21 is a block diagram showing the device arrangement of an onboard unit in the fifth embodiment.

An onboard unit 2C shown in FIG. 21 comprises a reception direction sensor (or a user sensor for detecting the user position outside the automobile) 27 for detecting the direction of a radio signal sent from the portable unit 1B in addition to the device arrangement of the onboard unit 2B in the third embodiment. As an example of the detection method of such sensor 27, when the reception direction of a radio signal is to be detected, a plurality of reception antennas having directivity are set at a given position (e.g., a center console) in the passenger room to point to respective door directions (in this embodiment, three rear doors are to be detected), their receiving zones are partitioned by shielding plates, and one of these antennas that detected the radio signal is determined. On the other hand, when the user position outside the automobile is to be detected, ultrasonic wave sensors or infrared sensors are embedded in respective doors of the automobile to detect the user.

Figure 22:
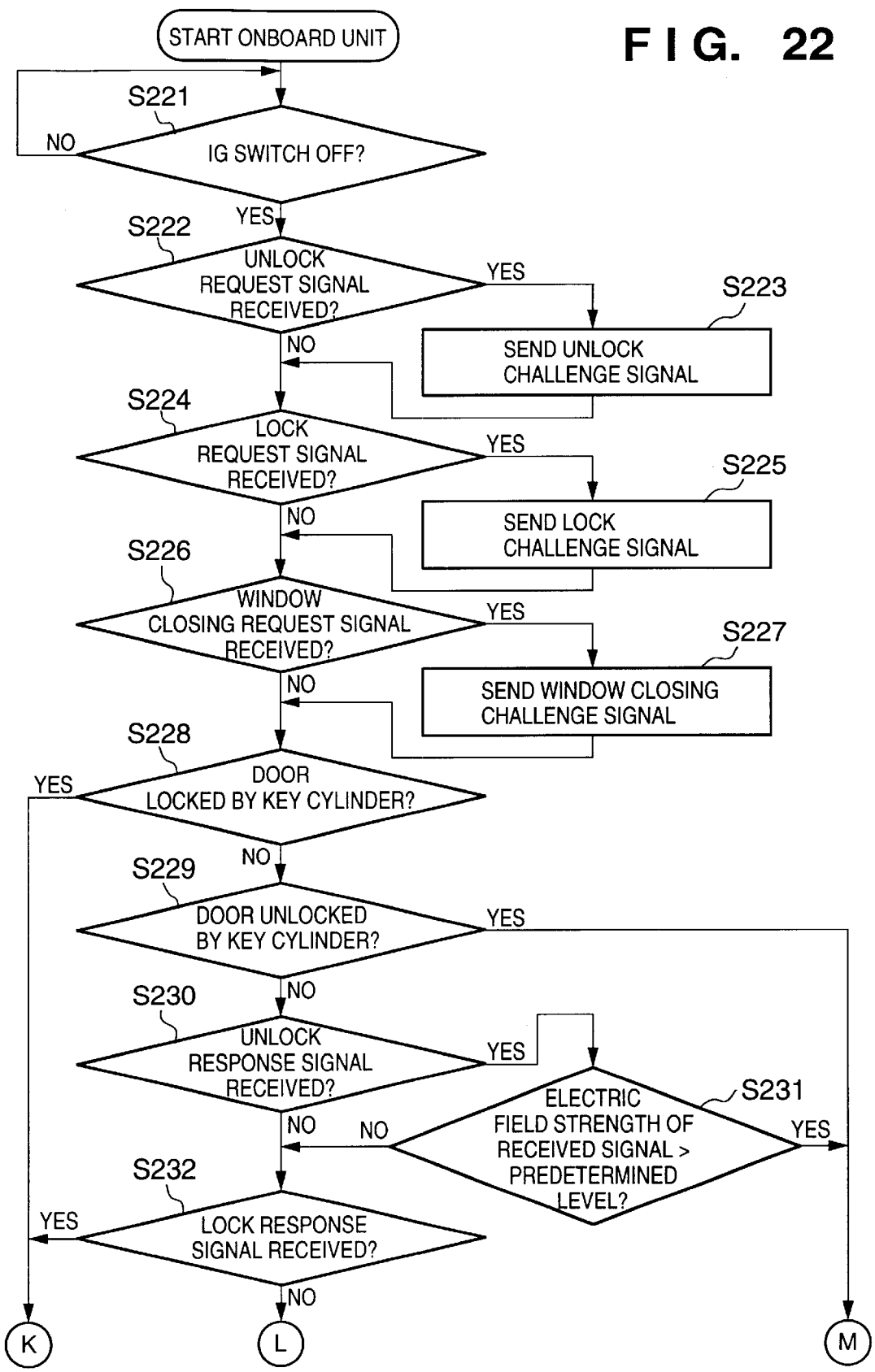
FIG. 22 is a flow chart showing the control process of an onboard unit 2C in the fifth embodiment.
Figure 23:
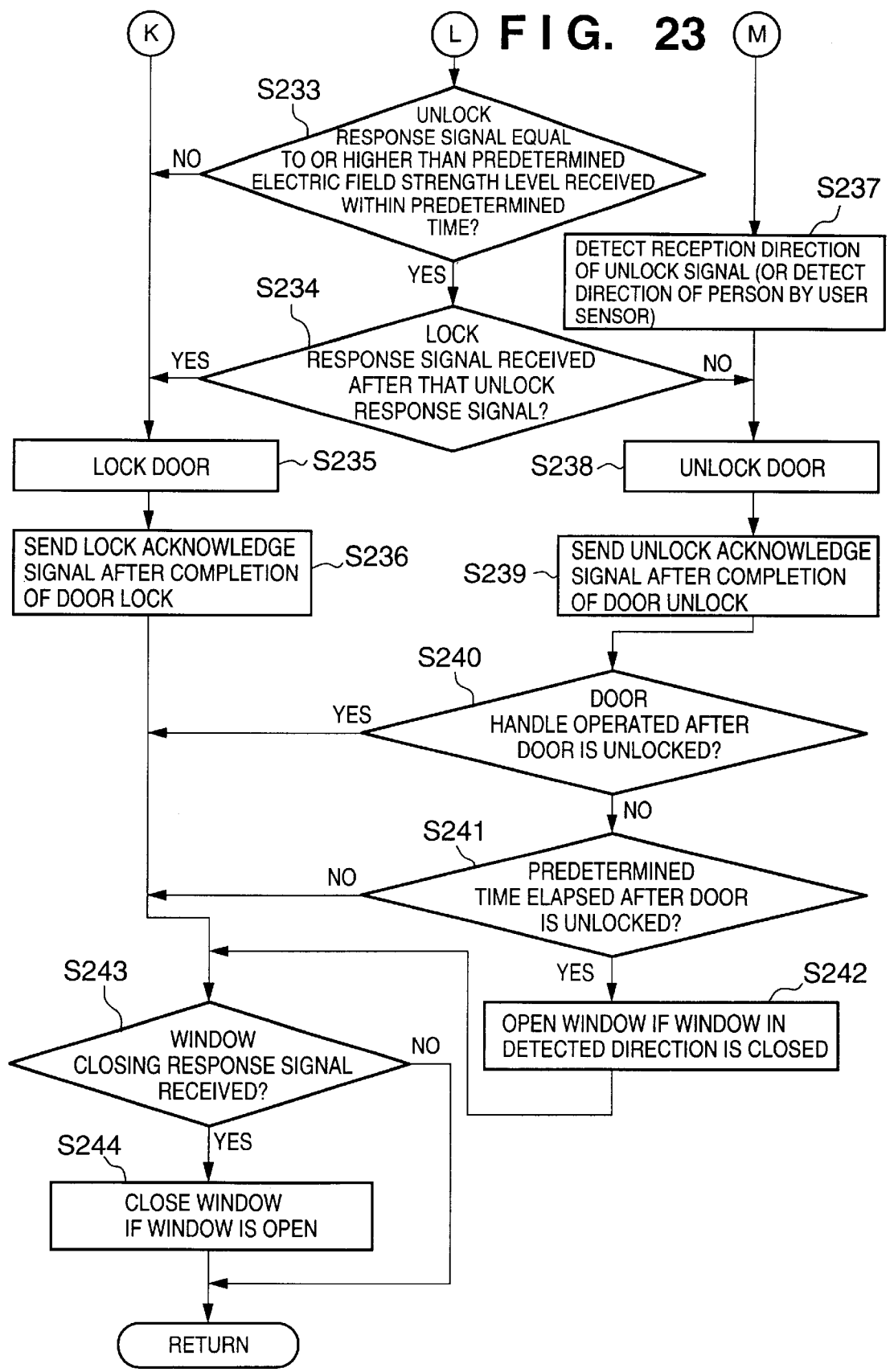
FIG. 23 is a flow chart showing the control process of the onboard unit 2C in the fifth embodiment.

FIGS. 22 and 23 are flow charts showing the control process of the onboard unit 2C in the fifth embodiment.

Steps S221 to S232 and Steps S233 to 236 in FIGS. 22 and 23: The same processes as in steps S141 to S152 in FIG. 16 in the third embodiment, and in steps S153 to S156 in FIG. 17 are done, thus executing an authentication process corresponding to various radio signals sent from the portable unit 1B.

Step S237: The location of the portable unit 1B or the user position outside the automobile is detected on the basis of the detection signal of the reception direction sensor (or user sensor for detecting the user position outside the automobile) 27, and the detection result is temporarily stored.

Steps S238 and S239: The door lock actuators 43 at the five positions are actuated to unlock the doors (step S238), and an unlock acknowledge signal is sent (step S239) as in step S158 in FIG. 17 in the third embodiment.

Steps S240 and S241: It is checked by detecting the states of the front door handle switches 41 and rear door handle switches 42 if one of the door handles has been operated after the doors are unlocked in step S239 (step S240). If YES in step S240 (one of the door handles has been operated), since this means that the user opens the door and the window need not be automatically opened, the flow advances to step S243; if NO in step S240 (no door handle operation is detected), it is checked if a predetermined time (e.g., around 5 sec) has elapsed after the doors were unlocked (step S241). If NO in step S241 (the predetermined time has not elapsed yet), the flow advances to step S243; if YES in step S241 (the predetermined time has elapsed), and if the window of the rear door corresponding to the detection result temporarily stored in step S237 is closed, the rear door power window motor 44 of that window is actuated to open the window (step S242).

Steps S243 and S244: The process for closing the window is done as in steps S163 and S164 in FIG. 17 in the third embodiment.

According to this embodiment mentioned above, when the user who carries the portable unit 1B approaches the onboard unit 2B, the doors are automatically unlocked. In addition, when the user who carries the portable unit stands in front of the rear door without operating any door handle, the window of that rear door is automatically opened. Hence, when, for example, the user holds baggage with both his or her hands, he or she can put baggage in the passenger room before he or she opens the door, thus improving convenience when the user gets into the automobile together with baggage in a narrow parking space. Since this function is disabled when the door handle of the front door is operated before that of the rear door is operated, appropriate operations according to the user's will can be realized.

Sixth Embodiment

Figure 24:
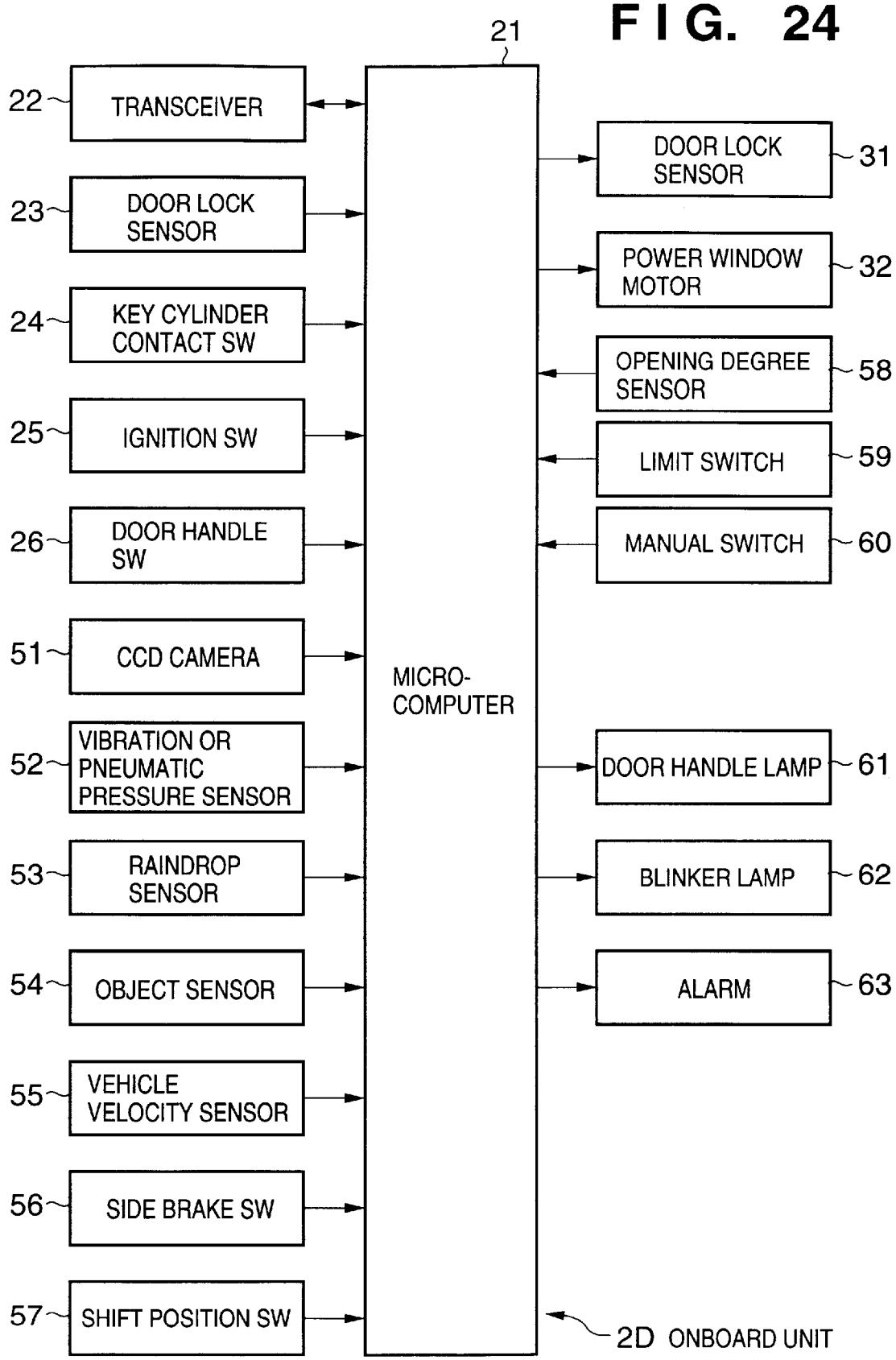
FIG. 24 is a block diagram showing the device arrangement of an onboard unit in the sixth embodiment.

FIG. 24 is a block diagram showing the device arrangement of an onboard unit in the sixth embodiment.

An onboard unit 2D shown in FIG. 24 comprises a CCD camera 51 for detecting by image recognition if the user puts his or her hand or hand or leg over the door, vibration sensors or pneumatic pressure sensors 52 which can detect a shock acting on each tire by some method (e.g., by kicking the tire) in units of tires, a raindrop sensor 53 for detecting based on vibrations of a bonnet, scattering of light due to raindrops attached to a window, or the like if it rains (or snows), an object sensor 54 such as a seat pressure sensor, child seat attachment sensor, or the like for detecting if an object (baggage or child seat) is present on a vehicle seat or if the user sits at the seat, a vehicle velocity sensor 55, a side brake switch 56, a shift position switch 57, an opening degree sensor 58 for detecting the degree of opening of the window based on pulse signals and the like, a limit switch 59 for detecting the upper end (fully closed state) of the window, and a manual switch 60 which allows the user to arbitrarily select an opening-closing member and to open/close it, in addition to the device arrangement of the onboard unit 2A in the first embodiment. An image signal sensed by the CCD sensor, detection signals of the sensors, switch signals, and the like are input to the microcomputer 21. When a given opening-closing member is inhibited from being opened/closed, the microcomputer 21 turns on or actuates door handle lamps 61 such as LEDs which are recognizable from outside the automobile, blinker lamps 62, or an alarm 63 to inform the user that the opening-closing member is inhibited from being opened/closed.

The manual switch 60 is provided inside the passenger room to allow the user to manually set and select one of an FR window, FL window, RR window, RL window, trunk, rear door, right and left slide doors, and bonnet (when a trunk room is provided to the bonnet side) as opening-closing members, and to open/close it.

<When Predetermined Opening-closing Member is Controlled to be Opened Upon Authenticating User by Keyless Entry System>

Figure 25:
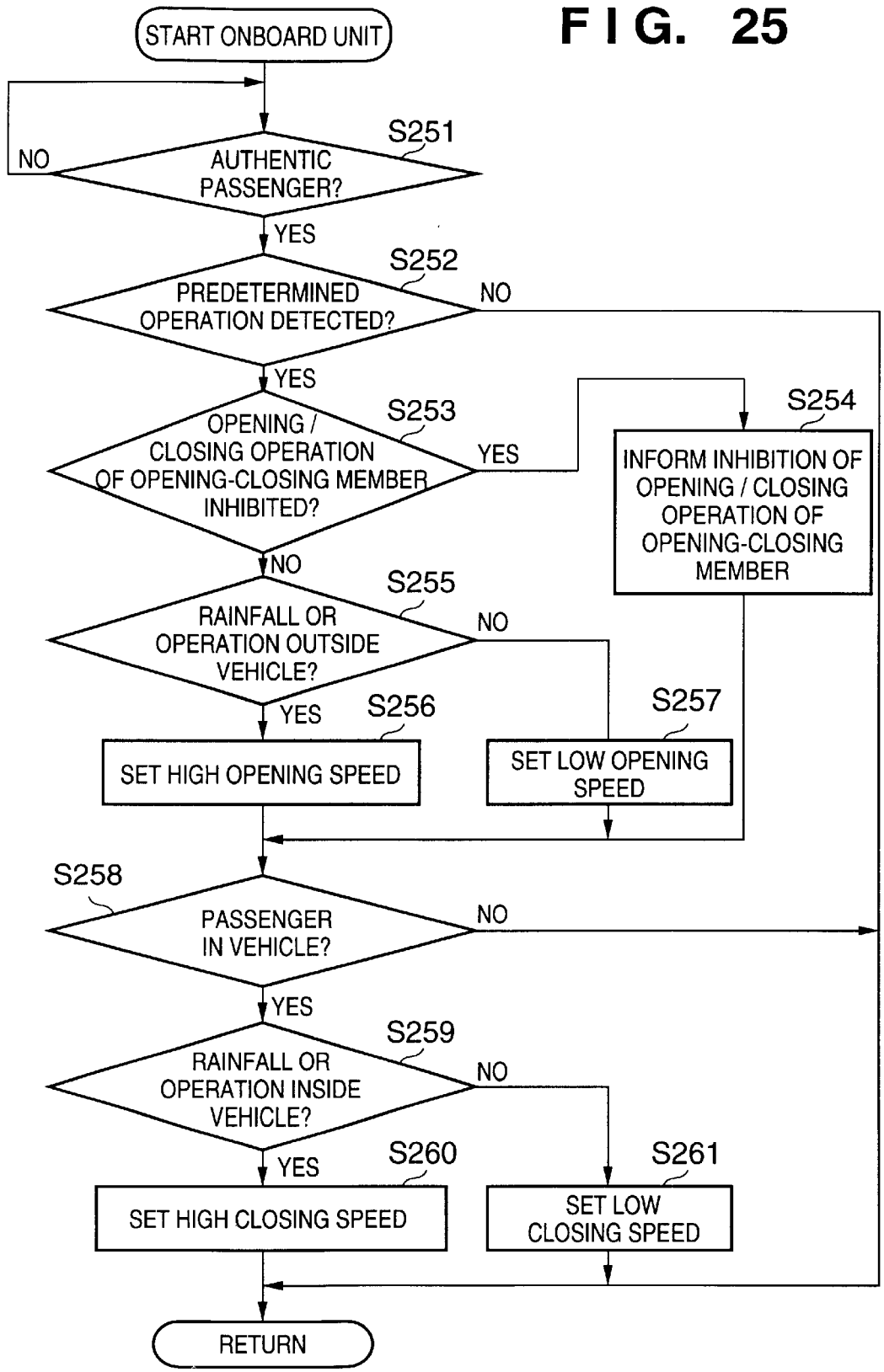
FIG. 25 is a flow chart showing the automatic opening/closing control process of an opening-closing member when the user is authenticated by a keyless entry system of the sixth embodiment.

FIG. 25 is a flow chart showing the automatic opening/closing control process of an opening-closing member when the keyless entry system of the sixth embodiment authenticates the user.

<Opening Operation of Opening-closing Member>

Step S251 in FIG. 25: An authentication process for recognizing if an authentic user is present near the automobile in accordance with the reception results of radio signals automatically sent from the transceiver provided to the portable unit 1A is executed. That is, by executing the same processes as in steps S221 to S232, steps S233 to S236 or steps S141 to S152 in FIG. 16 in the third embodiment and steps S153 to S156 in FIG. 17, the authentication process for various radio signals sent from the portable unit 1A is done.

Step S252: It is detected if the authentic user has made predetermined operation to automatically open the opening-closing member. More specifically, it is detected by image recognition using the CCD camera 51 if the user puts his or her hand or leg over the opening-closing member. If it is detected that the user puts his or her hand or leg over the opening-closing member (YES in step S252), the flow advances to step S253; otherwise (NO in step S252), the flow returns.

Image recognition for the trunk and rear doors may commonly use a camera for detecting an obstacle behind a vehicle in a rear collision prediction system, and image recognition for the front and rear windows may commonly use back cameras or the like built in door mirrors to detect an obstacle rear sideways the vehicle in a lane change support system.

When CCD cameras 51 are provided to two side portions of the vehicle body, and opening-closing members are present on both the right and left sides of the vehicle body (windows, right and left slide doors, or the like), if the opening-closing member in a direction where the CCD camera 51 which detects that the user has put his or her hand or leg over that opening-closing member is present is opened, the convenience can be further improved.

In addition to detection of predetermined operation by the CCD camera 51, the vibration sensor or pneumatic sensor 52 may detect that the user has kicked a tire. When there are a plurality of opening-closing members such as windows or right and left slide doors on the right and left (front and back) sides, if the right or left and front or back position of the kicked tire and the right or left and front or back position of the window, or the position of the right or left slide door and the right or left position of the kicked tire are identified in correspondence with each other so as to identify the opening-closing member to be opened, the convenience can be further improved.

Step S253: The object sensor 54 detects if an object (baggage or child seat) is present on a vehicle seat or the user sits at the seat. If it is detected that an object is present or the user sits at the seat (YES in step S253), the flow advances to step S254; otherwise (NO in step S253), the flow advances to step S255.

Step S254: Since the user outside the automobile cannot put baggage into the passenger room even when the opening-closing member corresponding to the position where the object is present or another user sits at, the opening operation of that opening-closing member is inhibited, the door handle lamp 61, blinker lamp 62, or alarm 63 corresponding to that opening-closing member is turned on or actuated or the window is opened slightly and then closed, thus informing the use that the corresponding opening-closing member is inhibited from being opened/closed.

Step S255: The presence/absence of a rainfall by the raindrop sensor 53 or predetermined user's operation from outside the automobile is checked. If the presence of a rainfall or operation from outside the automobile is detected (YES in step S255), the flow advances to step S256; otherwise (NO in step S255), the flow advances to step S257.

Step S256: The opening speed of the opening-closing member is set to be higher than that when no rainfall is detected or the opening-closing member is operated from inside the passenger room to minimize entrance of rain water, and when the presence of the user is not recognized at a position corresponding to the opening-closing member to be opened, the opening-closing member is minimally opened to assure security.

Step S257: The opening speed of the opening-closing member is set to be lower than that when the presence of a rainfall is detected or the opening-closing member is operated from outside the automobile like in step S252.

<Closing Operation of Opening-closing Member>

Step S258: When the user gets into the automobile, the opening-closing member need not be opened from outside the automobile, it is checked if the user gets into the passenger room so as to determine necessity of the closing operation. It is determined that the user gets into the automobile when the vehicle velocity is equal to or higher than a given velocity (determined using the detection result of the vehicle velocity sensor 55), when the side brake switch 56 is OFF, when it is detected that the user sits at the seat (determined using the detection result of the object sensor 54), when the doors are locked (determined using the detection result of the door lock sensor 23), when the shift position switch 57 indicates a D range, when electric equipment such as a stereophonic system is operated, or when a predetermined time has elapsed after the door was opened.

If it is determined that the user gets into the passenger room (YES in step S258), the flow advances to step S259; otherwise (NO in step S259), the flow returns.

Step S259: Since the user is in the passenger room and the opening-closing member need not be opened from outside the automobile, the same checking process as in step S255 is done, and if the presence of a rainfall or predetermined operation from outside the automobile is detected (YES in step S259), the flow advances to step S260; otherwise (NO in step S259), the flow advances to step S261.

Step S260: The opening speed of the opening-closing member is set to be higher than that when no rainfall is detected or the opening-closing member is operated from inside the passenger room to minimize entrance of rain water, and when the presence of the user is not recognized at a position corresponding to the opening-closing member to be opened, the opening-closing member is minimally opened to assure security.

Step S261: The opening speed of the opening-closing member is set to be lower than that when the presence of a rainfall is detected or the opening-closing member is operated from outside the automobile.

In steps S260 and S261, the closing speed when a signal sent from the portable unit 1A is not normally received may be set to be higher than that when the user in the passenger room is detected, in correspondence with the electric field strength of a radio signal sent from the portable unit 1A at predetermined time intervals.

<When Predetermined Opening-closing Member is Controlled to be Opened When Doors are Unlocked by Keyless Entry System>

Figure 26:
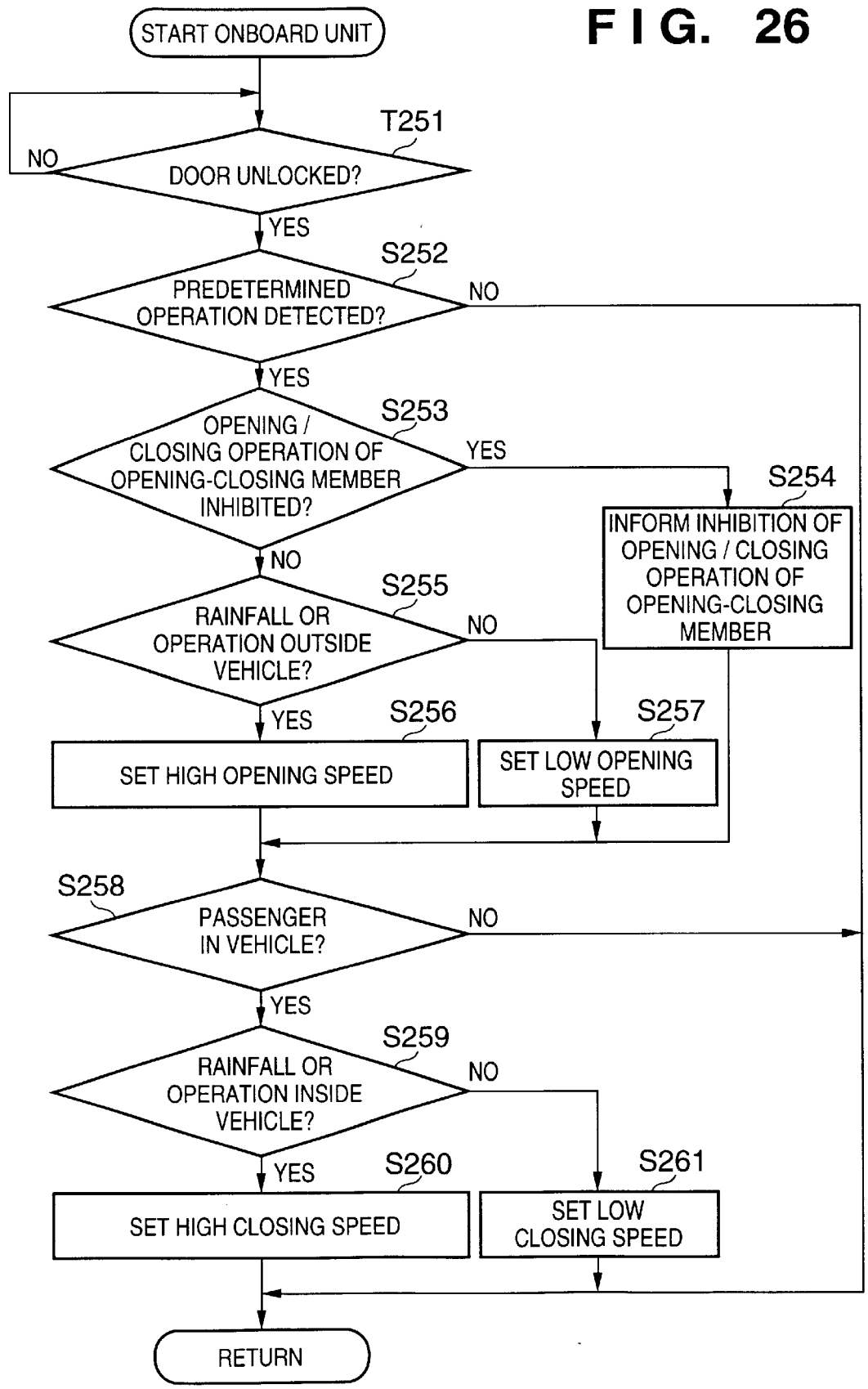
FIG. 26 is a flow chart showing the automatic opening/closing control process of an opening-closing member when doors are unlocked by the keyless entry system of the sixth embodiment.

FIG. 26 is a flow chart showing the automatic opening/closing control process of the opening-closing member when the doors are unlocked by the keyless entry system of the sixth embodiment.

The control process shown in FIG. 26 executes a door unlock process for unlocking the doors in accordance with the reception results of respective radio signals automatically output from the transceiver provided to the portable unit 1B in step T251 in place of the authentication process in step S251. That is, by executing the same processes as in steps S31 to S42 in FIG. 6 in the first embodiment, and steps S43 to S46 in FIG. 7, the door unlock process corresponding to various radio signals sent from the portable unit 1A is done.

In the door unlock process, if the doors are unlocked (YES in step T251), the same processes as in steps S252 to S261 in FIG. 25 are executed.

Note that the same step numbers in FIG. 26 denote the same processes as in FIG. 25, and a detailed description thereof will be omitted.

In steps S260 and S261, the closing speed when a signal sent from the portable unit 1A is not normally received may be set to be higher than that when the user in the passenger room is detected, in correspondence with the electric field strength of a radio signal sent from the portable unit 1A at predetermined time intervals.

According to the aforementioned embodiment, when it is detected by image recognition that the user puts his or her hand or leg over the predetermined opening-closing member (step S252), that predetermined opening-closing member is opened. In this way, since the authentic user can open the opening-closing member by putting his or her hand or leg over that opening-closing member, even when user's hands are occupied by baggage, he or she can open the opening-closing member without touching anything, thus improving the convenience.

As another method, when it is detected that the user kicks a vehicle tire, the window is opened. Since the authentic user can easily open the opening-closing member by kicking a tire, even when user's hands are occupied by baggage, he or she can open the opening-closing member without touching anything, thus improving the convenience.

Since the opening-closing member corresponding to the tire over which the user puts his or her hand or leg or to the vehicle tire kicked by the user is opened, the authentic user can easily open the opening-closing member by kicking the tire at a position corresponding to the window to be opened. Hence, even when user's hands are occupied by baggage, he or she can open the opening-closing member without touching anything, thus improving the convenience.

Furthermore, when the presence of an object on the vehicle seat is detected (step S253), the window of the vehicle corresponding to the vehicle seat where the object is placed is inhibited from being opened. Hence, the opening-closing member corresponding to a space where no more baggage can be placed can be inhibited from being unwantedly opened.

When the opening-closing member is inhibited from being opened, the window position where the opening operation is inhibited is informed (step S254), thus preventing the user from feeling troubled due to the window which remains closed.

Upon detecting a rainfall (step S255), since the opening speed of the predetermined opening-closing member is set to be higher than that when it does not rain (step S256), the opening-closing member can be opened while minimizing entrance of raindrops into the passenger room.

Since the opening speed of the predetermined opening-closing member upon receiving an authentication signal or unlock signal is set to be higher than that of the predetermined opening-closing member in response to switch operation in the passenger room (step S256), the opening-closing member can be opened to meet the needs of the user who wants to quickly place baggage.

When the user in the passenger room is detected (step S258), the predetermined opening-closing member which is opened is closed, thus inhibiting unwanted opening operation.

As another method, since the closing speed by the closing operation means when the authentication signal or unlock signal is not normally received is set to be higher than that upon detecting the user in the passenger room, the time required for closing the opening-closing member when the presence of the authentic user cannot be recognized at the position of the opened opening-closing member (for example, when the user moves always from the vehicle) is shortened, thus assuring security.

When a rainfall is detected (step S259), since the closing speed of the predetermined opening-closing member is set to be higher than that when it does not rain, the opening-closing member can be closed while minimizing entrance of raindrops into the passenger room.

Seventh Embodiment

An onboard unit of the seventh embodiment has the same device arrangement of that of the onboard unit 2D in the sixth embodiment shown in FIG. 25, detects if the user gets into the passenger room by detecting user's outer handle operation of the vehicle door after it is recognized that the authentic user is present near the automobile by the authentication process or after the doors are unlocked by the door unlock process, and opens the opening-closing member when a predetermined time has elapsed without detecting entrance.

<When Predetermined Opening-closing Member is Controlled to be Opened Upon Authenticating User by Keyless Entry System>

Figure 27:
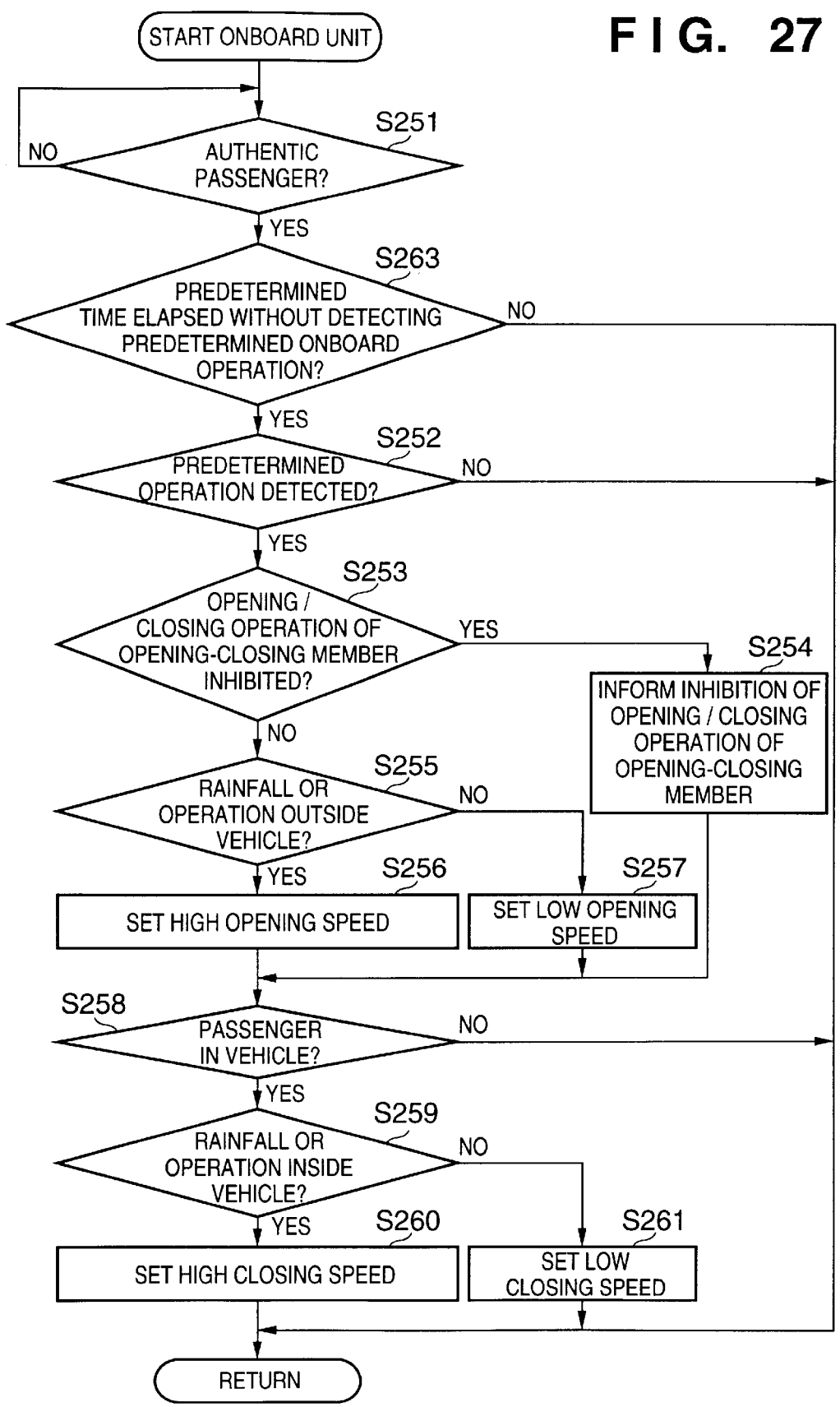
FIG. 27 is a flow chart showing the automatic opening/closing control process of an opening-closing member when the user is authenticated by a keyless entry system of the seventh embodiment.

FIG. 27 is a flow chart showing the automatic opening/closing control process of the opening-closing member when the keyless entry system of the seventh embodiment authenticates the user.

The control process shown in FIG. 27 executes the same processes as in steps S252 to S261 in FIG. 25 when a predetermined time has elapsed (YES in step S263) without detecting predetermined user's boarding operation, e.g., user's outer handle operation of the vehicle door after it is determined in step S251 that the user is authentic.

The predetermined boarding operation is detected when the ignition switch 25 is ON, when the vehicle velocity is equal to or higher than a given velocity (determined using the detection result of the vehicle velocity sensor 55), when the side brake switch 56 is OFF, when it is detected that the user sits at the seat (determined using the detection result of the object sensor 54), when the doors are locked (determined using the detection result of the door lock sensor 23), when the shift position switch 57 indicates a D range, or when a predetermined time has elapsed after the door was opened.

Note that the same step numbers in FIG. 27 denote the same processes as in FIG. 25, and a detailed description thereof will be omitted.

<When Predetermined Opening-closing Member is Controlled to be Opened When Doors are Unlocked by Keyless Entry System>

Figure 28:
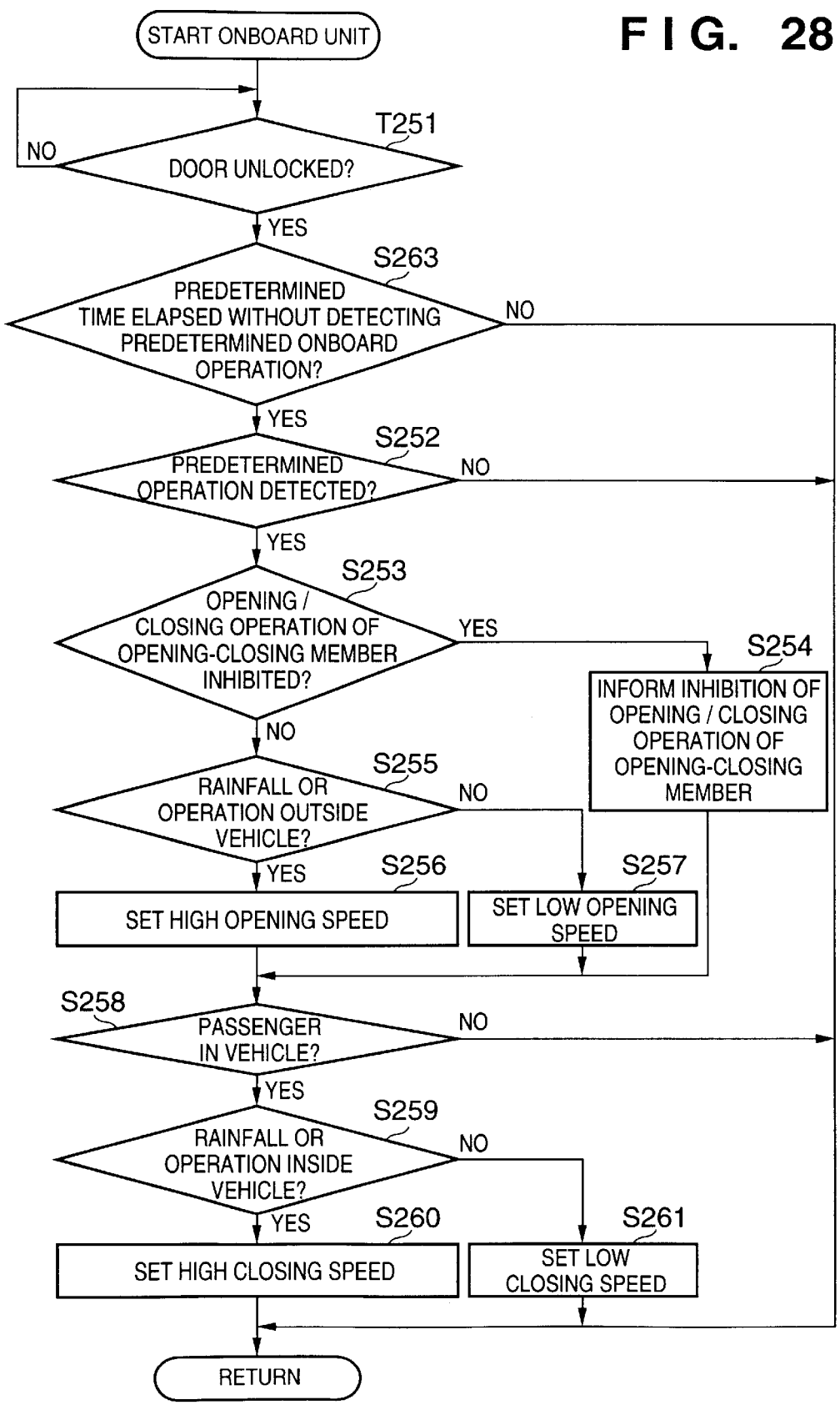
FIG. 28 is a flow chart showing the automatic opening/closing control process of an opening-closing member when doors are unlocked by the keyless entry system of the seventh embodiment.

FIG. 28 is a flow chart showing the automatic opening/closing control process of the opening-closing member when doors are unlocked by the keyless entry system of the seventh embodiment.

The control process shown in FIG. 28 executes a door unlock process for unlocking the doors in accordance with the reception results of respective radio signals automatically output from the transceiver provided to the portable unit 1B in step T251 in place of the authentication process in step S251. That is, by executing the same processes as in steps S31 to S42 in FIG. 6 in the first embodiment, and steps S43 to S46 in FIG. 7, the door unlock process corresponding to various radio signals sent from the portable unit 1A is done.

In the door unlock process, if the doors are unlocked (YES in step T251), the same processes as in steps S263 and S252 to S261 in FIG. 27 are executed.

Note that the same step numbers in FIG. 28 denote the same processes as in FIG. 27, and a detailed description thereof will be omitted.

According to the aforementioned embodiment, when a predetermined time elapsed without detecting entrance of the user into the passenger room after user's outer door handle operation of the vehicle door is detected (step S263), the predetermined opening-closing member is opened. Hence, even when the user's hands are occupied by baggage, the user can open the opening-closing member without touching anything by only carrying the portable unit, thus improving the convenience.

Eighth Embodiment

An onboard unit of the eighth embodiment has the same device arrangement as that of the onboard unit 2D in the sixth embodiment shown in FIG. 25, and opens the opening-closing member when the operation mode switch (manual switch) 60 is ON after it is recognized that the authentic user is present near the automobile by the authentication process.

Figure 29:
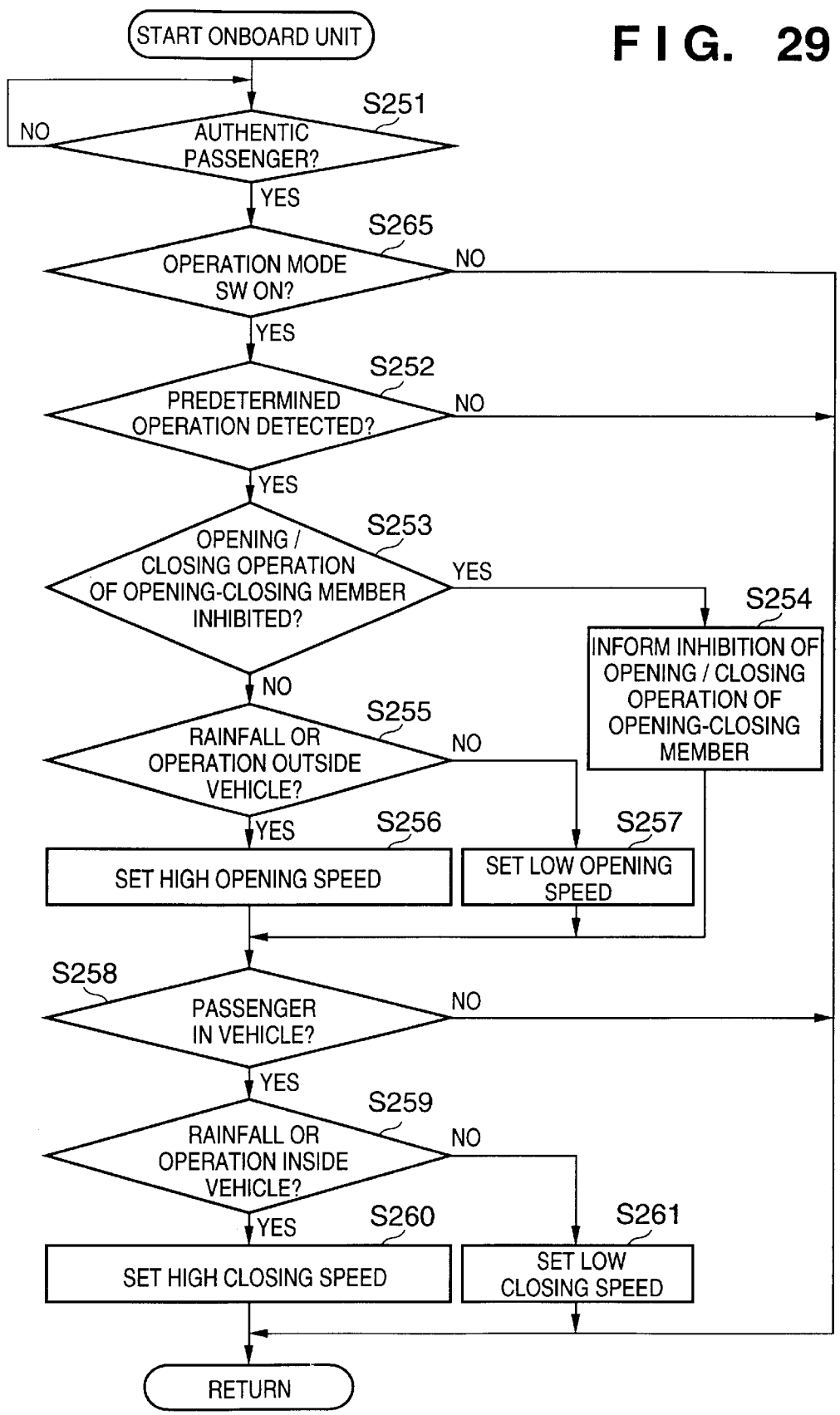
FIG. 29 is a flow chart showing the automatic opening/closing control process of an opening-closing member when the user is authenticated by a keyless entry system of the eighth embodiment.

FIG. 29 is a flow chart showing the automatic opening/closing control process of the opening-closing member when the keyless entry system of the eighth embodiment authenticates the user.

The control process shown in FIG. 29 executes the same processes as in steps S252 to S261 in FIG. 25 if the operation mode switch 60 is ON (YES in step S265), after it is determined in step S251 that the user is authentic.

Note that the same step numbers in FIG. 29 denote the same processes as in FIG. 25, and a detailed description thereof will be omitted. The aforementioned process may be done under the condition that the doors are unlocked by the keyless entry system in place of the authentication process.

Ninth Embodiment

Figure 30:
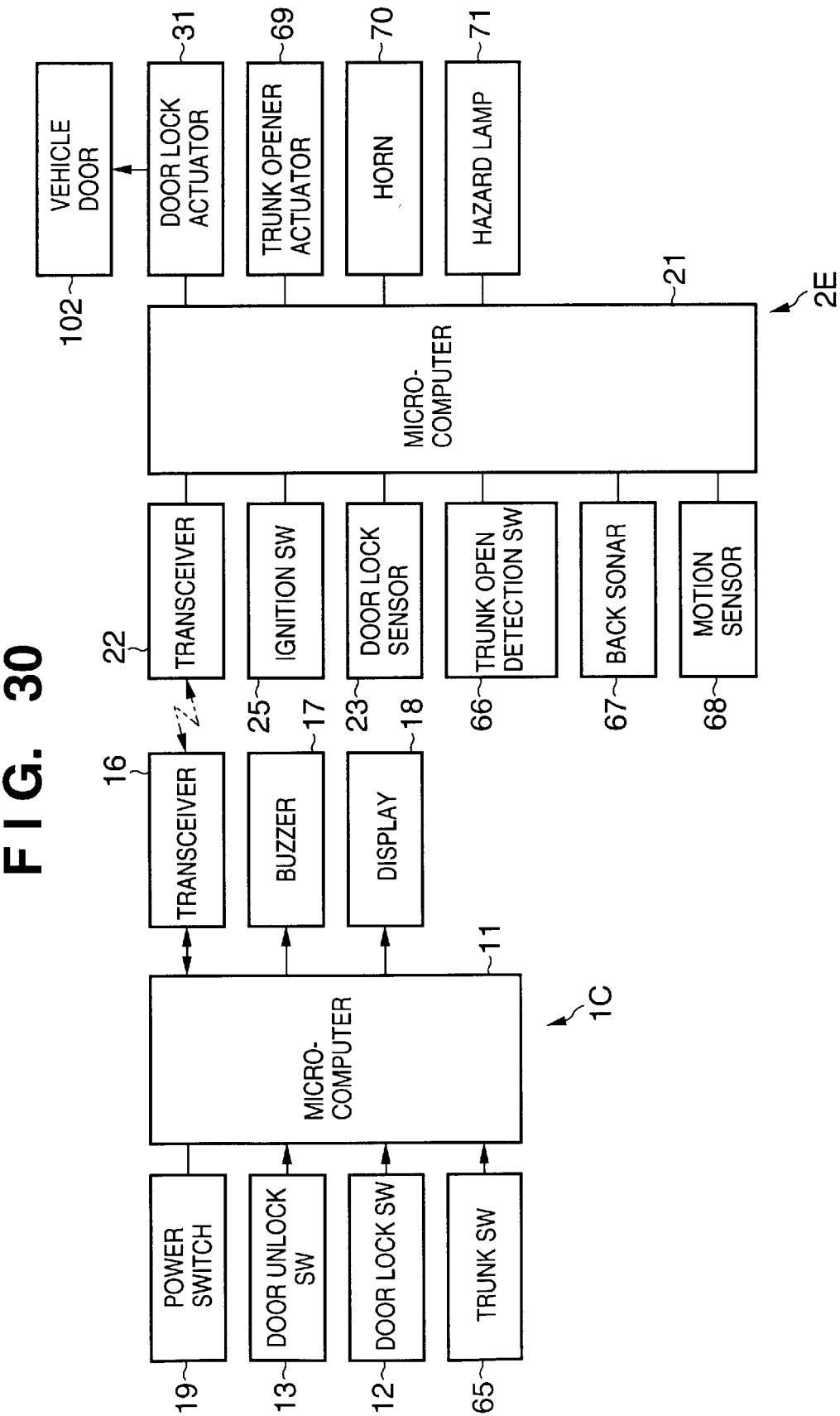
FIG. 30 is a block diagram showing the device arrangement of a portable unit and onboard unit in the ninth embodiment.

FIG. 30 is a block diagram showing the device arrangement of a portable unit and onboard unit in the ninth embodiment.

Figure 31:
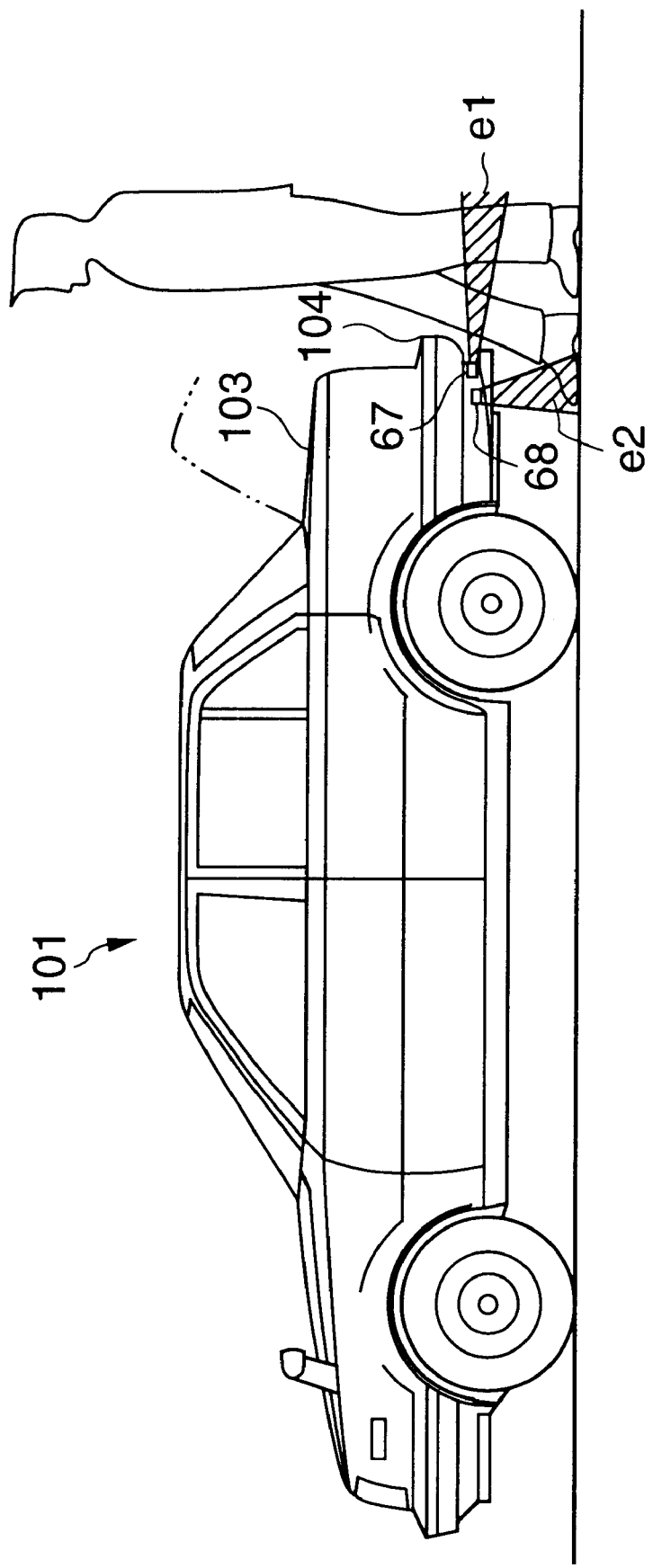
FIG. 31 is a view showing a device for implementing a trunk automatic unlocking process in the ninth embodiment.
Figure 32:
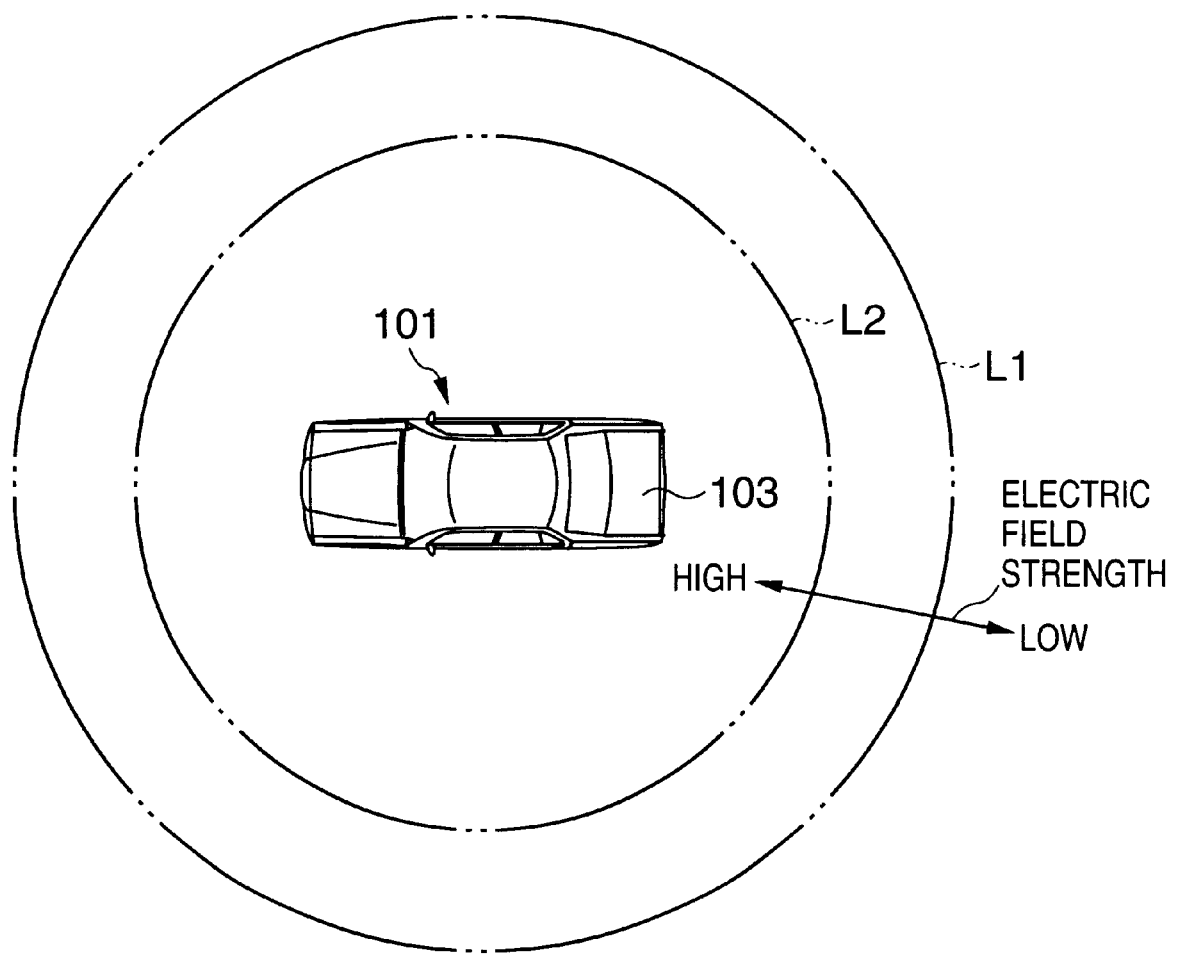
FIG. 32 is a view showing a threshold of a reception strength.

Referring to FIG. 30, the system comprises a portable unit 1C for automatically sending an unlock response signal to an automobile (see FIG. 31), and an onboard unit 2E for receiving the unlock response signal, and unlocking vehicle doors 102 when the reception strength (electric field strength) of that signal is equal to or higher than a second threshold L2 (see FIG. 32).

The portable unit 1C shown in FIG. 30 comprises a power switch 19 and a trunk switch 65 for opening a trunk lid (see FIG. 31), in addition to the device arrangement of the portable unit 1A in the first embodiment.

The onboard unit 2E shown in FIG. 30 comprises a transceiver 22, an ignition switch 25, a door lock sensor 23 for detecting the lock state of the vehicle doors 102, a trunk open detection switch 66 for detecting the unlock or open state of the trunk lid 103 (see FIGS. 31 and 32), a back sonar 67, and a motion sensor 68. The microcomputer 21 controls to drive the door lock actuator 31, a trunk opener actuator 69, a horn 70, a hazard lamp 71, and the transceiver 22 on the basis of the inputs from these components 22, 23, 25, and 66 to 68 in accordance with a pre-stored control program.

Note that the back sonar 67 is a rear obstacle sensor which is provided to the rear portion of the automobile, as shown in FIG. 31, and detects an obstacle behind the automobile, and a detection area e1 of the back sonar 67 is set near the outside of a trunk room, i.e., is set below a rear bumper 104 near the outside of the trunk room.

The motion sensor 68 is an obstacle sensor which has a detection area e2 near the outside of the trunk room in the rear portion of the automobile, as shown in FIG. 31. The detection area e2 of the motion sensor 68 is set below the rear bumper 104 and its entire detection area is set on a portion of the rear bumper 104 on the front side of the rear end of the vehicle body.

The microcomputer 21 of the onboard unit 2E unlocks the vehicle doors 102 when it receives an unlock response signal from the portable unit 1C and the electric field strength of the received signal is equal to or higher than the second threshold L2 (for L2>L1) shown in FIG. 32, and unlocks the trunk lid 103 as an example of a rear lid when one or both of the back sonar 67 and motion sensor 68 detects or detect an obstacle (e.g., a person who is about to put baggage into the trunk room) (see step S334 in FIG. 35) while receiving the unlock response signal.

A trunk unlocking process exemplified as the ninth embodiment will be explained below with reference to the flow charts shown in FIGS. 33 and 35.

<Portable Unit 1C>

The control process of the portable unit 1C will be explained first with reference to the flow chart shown in FIG. 33.

Figure 33:
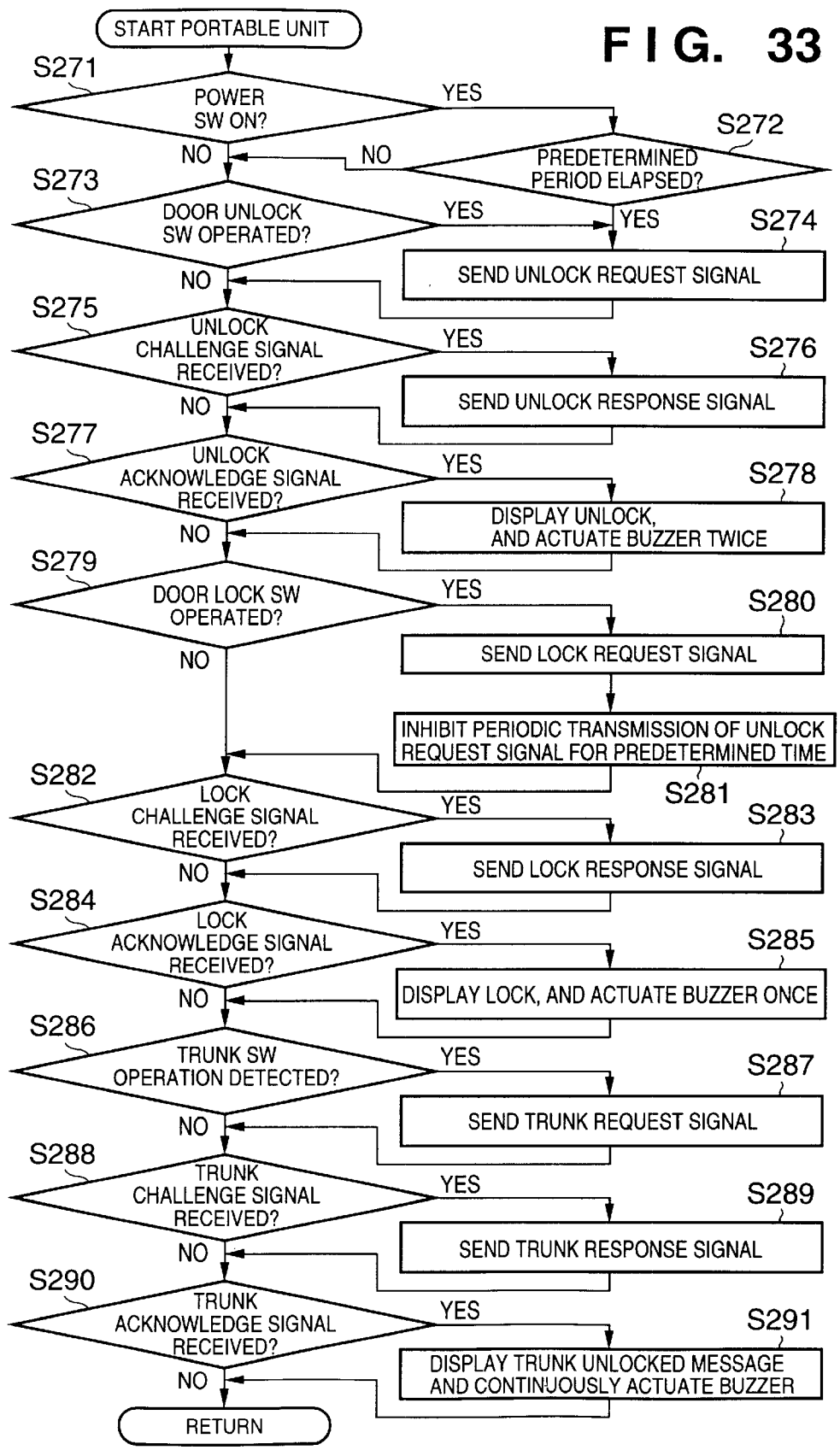
FIG. 33 is a flow chart for explaining the control process of a portable unit 1C in the ninth embodiment.

In FIG. 33, the microcomputer 11 checks in step S271 if the power switch 19 is ON. If YES in step S271, the flow advances to step S272; If NO in step S271, the flow advances to step S273. The determination process in step S271 may hold determination for a predetermined time in place of ON determination of the power switch 19. That is, when the door unlock switch 13 is kept ON for a predetermined time, since a mode for sending an unlock request signal at predetermined time intervals is set, the above process may be used.

The microcomputer 11 checks in step S272 if a predetermined period of time has elapsed. If NO in step S272, the flow advances to step S273; if YES in step S272, the flow advances to step S274.

The microcomputer 11 detects in step S273 if the door unlock switch 13 has been operated. If YES in step S273 (the door unlock switch 13 is ON), the flow advances to step S274; if NO in step S273, the flow advances to step S275.

In step S274, the microcomputer 11 drives the transceiver 16 to send an unlock request signal to the onboard unit 2E.

The microcomputer 11 checks in step S275 if the transceiver 16 receives an unlock challenge signal from the onboard unit 2E. If YES in step S275, the flow advances to step S276; if NO in step S275, the flow advances to step S277.

In step S276, the microcomputer 11 sends an unlock signal to the onboard unit 2E via the transceiver 16.

The microcomputer 11 checks in step S277 if the transceiver 16 receives an unlock acknowledge signal from the onboard unit 2E. If YES in step S277, the flow advances to step S278; if NO in step S277, the flow advances to step S279.

In step S278, the microcomputer 11 executes unlock display using the display 18 in response to the received unlock acknowledge signal, and actuates the buzzer 17 twice to inform the user that the vehicle doors 102 are unlocked.

The microcomputer 11 detects in step S279 if the door lock switch 12 has been operated. If YES in step S279, i.e., if the door lock switch 12 is ON, the flow advances to step S280; if NO in step S279, the flow advances to step S282.

The microcomputer 11 sends a lock request signal to the onboard unit 2E via the transceiver 16 in step S280, and inhibits periodic transmission of an unlock request signal for a predetermined period of time in step S281 to prevent operation errors.

The microcomputer 11 checks in step S282 if the transceiver 16 receives a lock challenge signal from the onboard unit 2E. If YES in step S282, the flow advances to step S283; if NO in step S282, the flow advances to step S284.

In step S283, the microcomputer 11 sends a lock response signal to the onboard unit 2E via the transceiver 16.

The microcomputer 11 checks in step S284 if the transceiver receives a lock acknowledge signal from the onboard unit 2E. If YES in step S284, the flow advances to step S285; if NO in step S284, the flow advances to step S286.

In step S285, the microcomputer 11 executes lock display using the display 18 in response to the received lock acknowledge signal, and actuates the buzzer 17 once to inform the user that the vehicle doors 102 are locked.

The microcomputer 11 detects in step S286 if the trunk switch 65 has been operated. If YES in step S286, i.e., the trunk switch 65 is ON, the flow advances to step S287; if NO in step S286, the flow advances to step S288.

In step S287, the microcomputer 11 sends a trunk request signal to the onboard unit 2E via the transceiver 16.

The microcomputer 11 checks in step S288 if the transceiver 16 receives a trunk challenge signal from the onboard unit 2E. If YES in step S288, the flow advances to step S289; if NO in step S288, the flow advances to step S290.

In step S289, the microcomputer 11 sends a trunk response signal to the onboard unit 2E via the transceiver 16.

The microcomputer 11 checks in step S290 if the transceiver 16 receives a trunk acknowledge signal from the onboard unit 2E. If YES in step S290, the flow advances to step S291; if NO in step S290, the flow returns to step S271.

In step S291, the microcomputer 11 displays a message indicating that the trunk lid 103 is unlocked or opened, as indicated by an imaginary line in FIG. 31, and continuously actuates the buzzer 17 to audibly output that message.

The control process of the portable unit IC has been explained. The control process of the onboard unit 2E will be explained below with reference to FIG. 34.

<Onboard Unit 2E>

Figure 34:
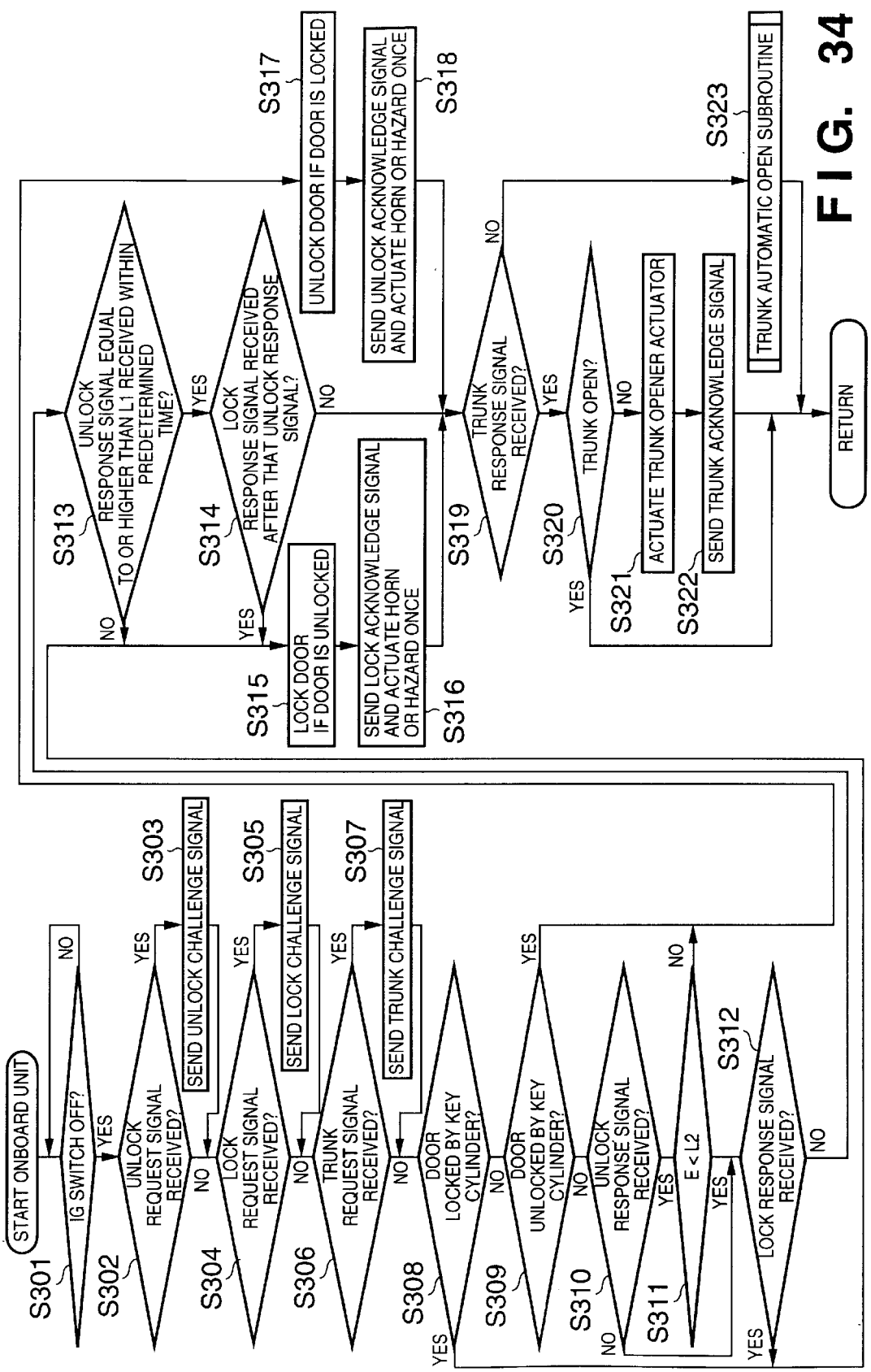
FIG. 34 is a flow chart for explaining the control process of an onboard unit 2E in the ninth embodiment.

Referring to FIG. 34, the microcomputer 21 checks based on the input from the ignition switch 25 in step S301 if that switch 25 is OFF. Only when YES in step S301 (IG switch=OFF), the flow advances to step S302.

The microcomputer 21 checks in step S302 if the transceiver 22 receives an unlock request signal from the portable unit 1C. If YES in step S302, the flow advances to step S303; if NO in step S302, the flow advances to step S304.

In step S303, the microcomputer 21 drives the transceiver 22 to send an unlock challenge signal to the portable unit 1C.

The microcomputer 21 checks in step S304 if the transceiver 22 receives a lock request signal from the portable unit 1C. If YES in step S304, the flow advances to step S305; if NO in step S304, the flow advances to step S306.

In step S305, the microcomputer 21 sends a lock challenge signal to the portable unit 1C via the transceiver 22.

The microcomputer 21 checks in step S306 if the transceiver 22 receives a trunk request signal from the portable unit 1C. If YES in step S306, the flow advances to step S307; if NO in step S306, the flow advances to step S308.

In step S307, the microcomputer 21 sends a trunk challenge signal to the portable unit 1C via the transceiver 22.

The microcomputer 21 checks in step S308 if the doors are locked by a key cylinder, i.e., if the doors are mechanically locked without using the portable unit 1C. If YES in step S308, the flow jumps to step S315; if NO in step S308, the flow advances to step S309.

The microcomputer 21 checks in step S309 if the doors are unlocked by the key cylinder. If YES in step S309, the flow jumps to step S317; if NO in step S309, the flow advances to step S310.

The microcomputer 21 checks in step S310 if the transceiver 22 receives an unlock response signal form the portable unit 1C. If NO in step S310 (no response signal is received), the flow jumps to step S312; if YES in step S310 (the response signal is received), the flow advances to step S311.

The microcomputer 21 checks in step S311 if the current electric field strength E of the received unlock response signal is equal to or lower than the second threshold L2 (see FIG. 32), i.e., E<L2. If NO in step S311 (E>L2), the flow jumps to step S317; if YES in step S311, the flow advances to step S312.

The microcomputer 21 checks in step S312 if the transceiver 22 receives a lock response signal from the portable unit 1C. If YES in step S312, the flow advances to step S315; if NO in step S312, the flow advances to step S313.

The microcomputer 21 checks in step S313 if an unlock response signal equal to or higher than a first threshold L1 (see FIG. 32) is received within a predetermined period of time, for the purpose of preventing chattering. If NO in step S313, the flow advances to step S315; if YES in step S313, the flow advances to step S314.

The microcomputer 21 checks in step S314 if a lock response signal is received after the unlock response signal equal to or higher than the first threshold L1. If YES in step S314, the flow advances to step S315; if NO in step S314, the flow advances to step S319.

In step S315, the microcomputer 21 locks the vehicle doors 102 via the door lock actuator 31 if they are unlocked in response to the door lock operation by means of the key cylinder or the lock response signal from the portable unit 1C (door lock operation).

In step S316, the microcomputer 21 sends a lock acknowledge signal to the portable unit 1C via the transceiver 22 immediately after the door lock operation, and actuates the horn 70 or hazard lamp 71 twice.

In step S317, the microcomputer 21 unlocks the vehicle doors 102 via the door lock actuator 31 if they are locked in response to the door unlock operation by means of the key cylinder or the unlock response signal (if NO in step S311, i.e., if the current electric field strength becomes higher than the second threshold L2, the flow jumps to step S317) from the portable unit 1C (door unlock operation).

In step S318, the microcomputer 21 sends an unlock acknowledge signal to the portable unit 1C via the transceiver 22 immediately after the door unlock operation, and actuates the horn 70 or hazard lamp 71 once.

The microcomputer 21 checks in step S319 if the transceiver 22 receives a trunk response signal from the portable unit 1C. If NO in step S319, the flow advances to step S323; if YES in step S319, the flow advances to step S320.

The microcomputer 21 checks based on the input from the trunk open switch 66 in step S320 if the trunk lid 103 is open. If the trunk lid is open (YES in step S320), the flow returns to step S301; if the trunk lid is closed (NO in step S320), the flow advances to step S321.

In step S321, the microcomputer 21 unlocks and opens the trunk lid 103 by actuating the trunk opener actuator 69 in response to the received trunk response signal and the trunk closed state.

In step S322, the microcomputer 21 sends a trunk acknowledge signal indicating that the trunk lid 103 is unlocked to the portable unit 1C via the transceiver 22, and the flow returns to step S301.

In step S323, the microcomputer 21 executes a trunk automatic open process which does not pertain to the ON operation of the trunk switch 65 at the portable unit 1C. The processing contents in step S323 are as shown in the subroutine in FIG. 35.

Figure 35:
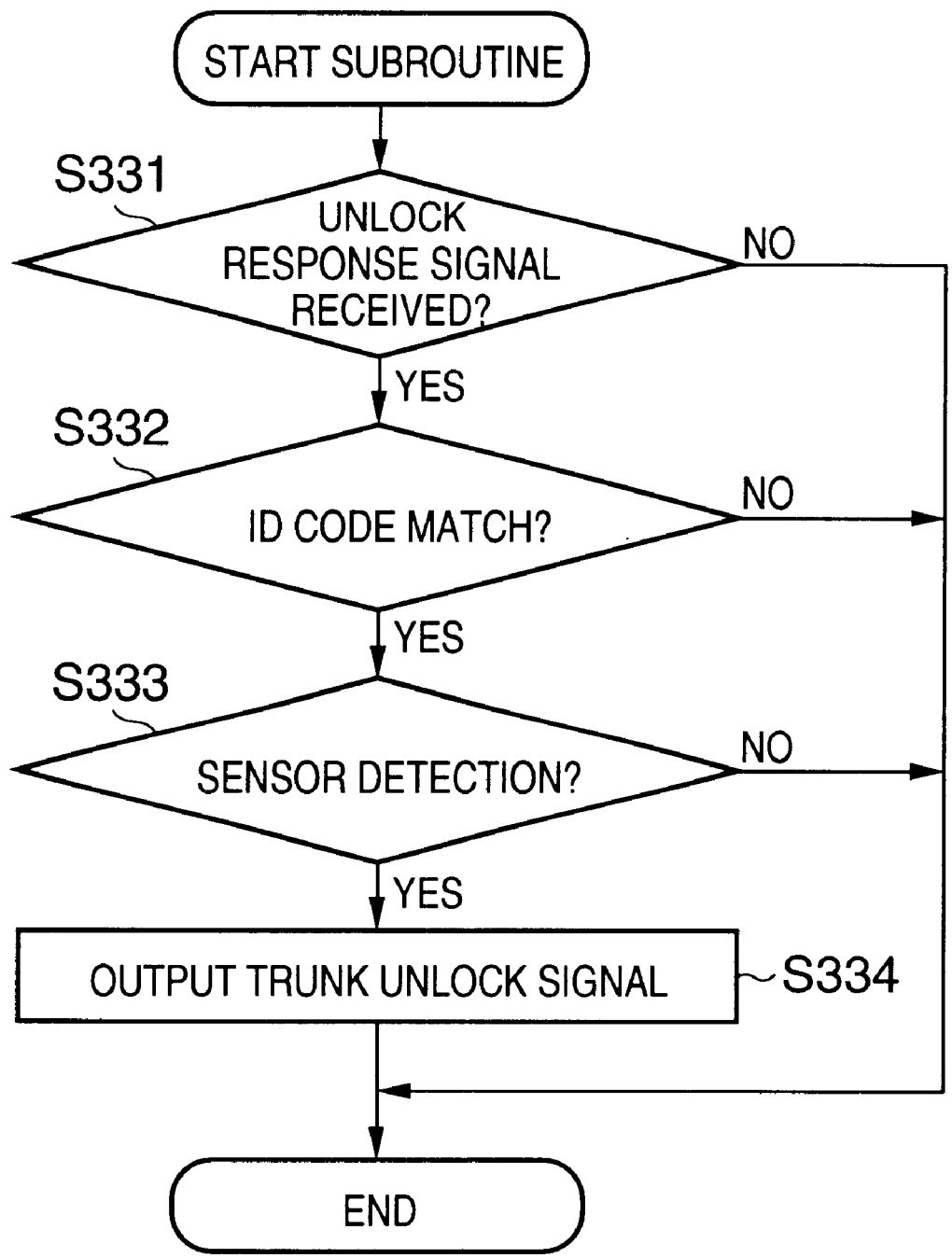
FIG. 35 is a flow chart showing a trunk automatic open subroutine in the main routine shown in FIG. 34.

FIG. 35 shows a trunk automatic open subroutine corresponding to step S323 in the main routine shown in FIG. 34. The microcomputer 21 checks in step S331 if the transceiver 22 receives an unlock response signal from the portable unit 1C. If NO in step S331, the flow returns to the main routine in FIG. 34; if YES in step S331, the flow advances to step S332.

The microcomputer 21 checks in step S332 if the ID code of the received unlock response signal matches a unique identification code pre-stored in a predetermined area. If NO in step S332, the process ends; if YES in step S332, the flow advances to step S333.

The microcomputer 21 checks in step S333 if one of the back sonar 67 and motion sensor 68, e.g., the motion sensor 68 detects an obstacle (e.g., a person who is about to put baggage into the trunk room). If NO in step S333, the process ends; if YES in step S333, the flow advances to step S334.

In step S334, the microcomputer 21 outputs a trunk unlock signal in response to the ON signal from the motion sensor 68. That is, the microcomputer 21 unlocks and opens the trunk lid 103 via the trunk opener actuator 69.

As described above, the portable unit 1C automatically sends an unlock response signal to the automobile 101, and the microcomputer 21 receives the unlock response signal and unlocks the vehicle doors 102 when its reception strength is equal to higher than the second threshold L2 as a predetermined threshold. Also, when the back sonar 67 or motion sensor 68 which has the detection area (e1 to e2) near the outside of the trunk room in the rear portion of the automobile detects an obstacle, the microcomputer 21 unlocks the trunk lid 103.

For this reason, the trunk lid 103 can be automatically unlocked without using any expensive onboard antenna or a plurality of onboard antennas, thus assuring convenience.

Since the detection area e2 of the motion sensor 68 is set below the rear bumper 104, the tiptoe of a person who is about to put baggage into the trunk room can be accurately detected, and the trunk lid 103 can be unlocked.

Furthermore, since the detection area e2 of the motion sensor 68 is set below the rear bumper 104 and on the front side of the vehicle body, any detection errors when a third party passes near the rear bumper 104 can be prevented.

In addition, since the motion sensor 68 (a sensor which incorporates a pyroelectric sensor, and detects a motion of a person by fluctuations of infrared rays emitted by the person who has a temperature difference from the ambient temperature), the motion sensor 68 can detect the motion of the person, and any operation errors due to other obstacles such as ground, glass, a curb, or the like can be prevented.

10th Embodiment

Figure 36:
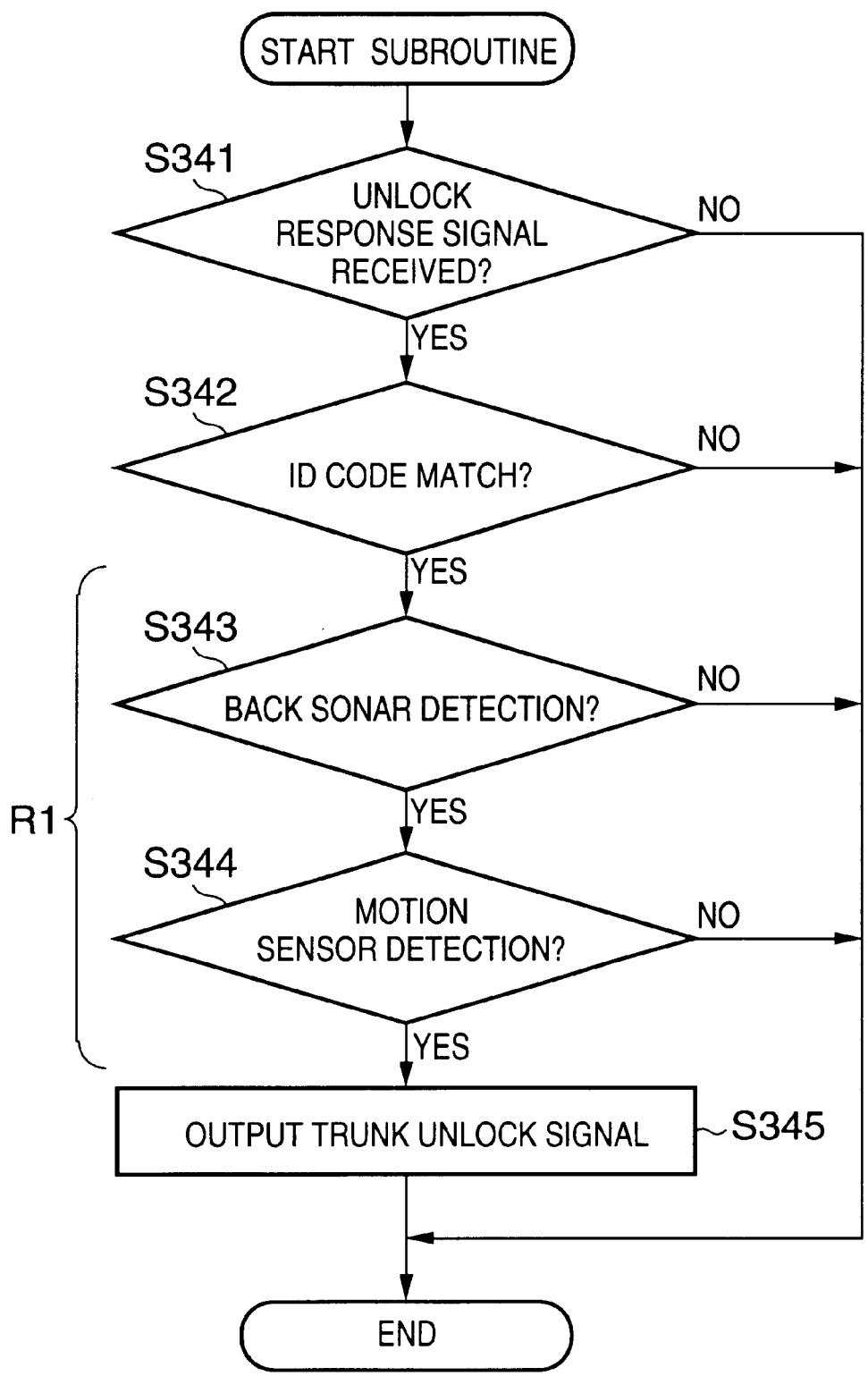
FIG. 36 is a flow chart showing a trunk automatic open subroutine of the 10th embodiment.

FIG. 36 shows the trunk automatic open subroutine according to the 10th embodiment, and this embodiment uses the same devices as in FIGS. 30 to 32. Also, the main routines shown in FIGS. 33 and 34 are the same as those in the above embodiment.

In the process shown in FIG. 36, the microcomputer 21 receives an unlock response signal from the portable unit 1C, and unlocks the vehicle doors 102 when the electric field strength of that received signal is equal to or higher than the second threshold L2 (for L2>L1) shown in FIG. 32. Also, the microcomputer 21 unlocks the trunk lid 103 when the back sonar 67 or motion sensor 68 detects an obstacle while receiving the unlock response signal (see step S345 in FIG. 36).

In addition, in this embodiment, since the trunk lid 103 is unlocked based on the logical product output (AND output) of the back sonar 67 that detects an obstacle behind the automobile and the motion sensor 68 which has the detection area e2 near the outside of the trunk room, the microcomputer 21 checks if an AND condition holds (see routine R1 in FIG. 36).

The trunk unlocking process exemplified as the 10th embodiment will be explained below with reference to the flow chart shown in FIG. 36.

Referring to FIG. 36, the microcomputer 21 checks in step S341 if the transceiver 22 receives an unlock response signal from the portable unit 1C. If NO in step S341, the process ends, and the flow returns to the main routine shown in FIG. 34; if YES in step S341, the flow advances to step S342.

The microcomputer 21 checks in step S342 if the ID code of the received unlock response signal matches a pre-stored unique identification code. If NO in step S342, the process ends; if YES in step S342, the flow advance to step S343.

The microcomputer 21 checks in step S343 if the back sonar 67 detects an obstacle (a person who is about to put baggage into the trunk room). If NO in step S343, the process ends; if YES in step S343, the flow advances to step S344.

The microcomputer 21 checks in step S344 if the motion sensor 68 detects an obstacle (a person who is about to put baggage into the trunk room). If NO in step S344, the process ends; if YES in step S344, the flow advances to step S345. That is, the AND output of the two sensors 67 and 68 can be obtained in steps S343 and S344.

In step S345, the microcomputer 21 outputs a trunk unlock signal since the AND condition holds. That is, the microcomputer 21 unlocks and opens the trunk lid 103 via the trunk opener actuator 69.

Note that the processing contents in the main routine are the same as those in FIGS. 33 and 34.

Since the trunk lid is unlocked based on the logical product output, i.e., AND output of the back sonar 67 that detects an obstacle behind the automobile and the motion sensor 68 which has the detection area e2 near the outside of the trunk room, a person who is about to put baggage into the trunk room can be accurately detected. Even when a small animal such as a cat or the like passes below the rear bumper 104, any detection errors can be prevented, and the reliability can be improved. Note that this embodiment has substantially the same operations and effects as those in the ninth embodiment except for the above feature.

11th Embodiment

Figure 37:
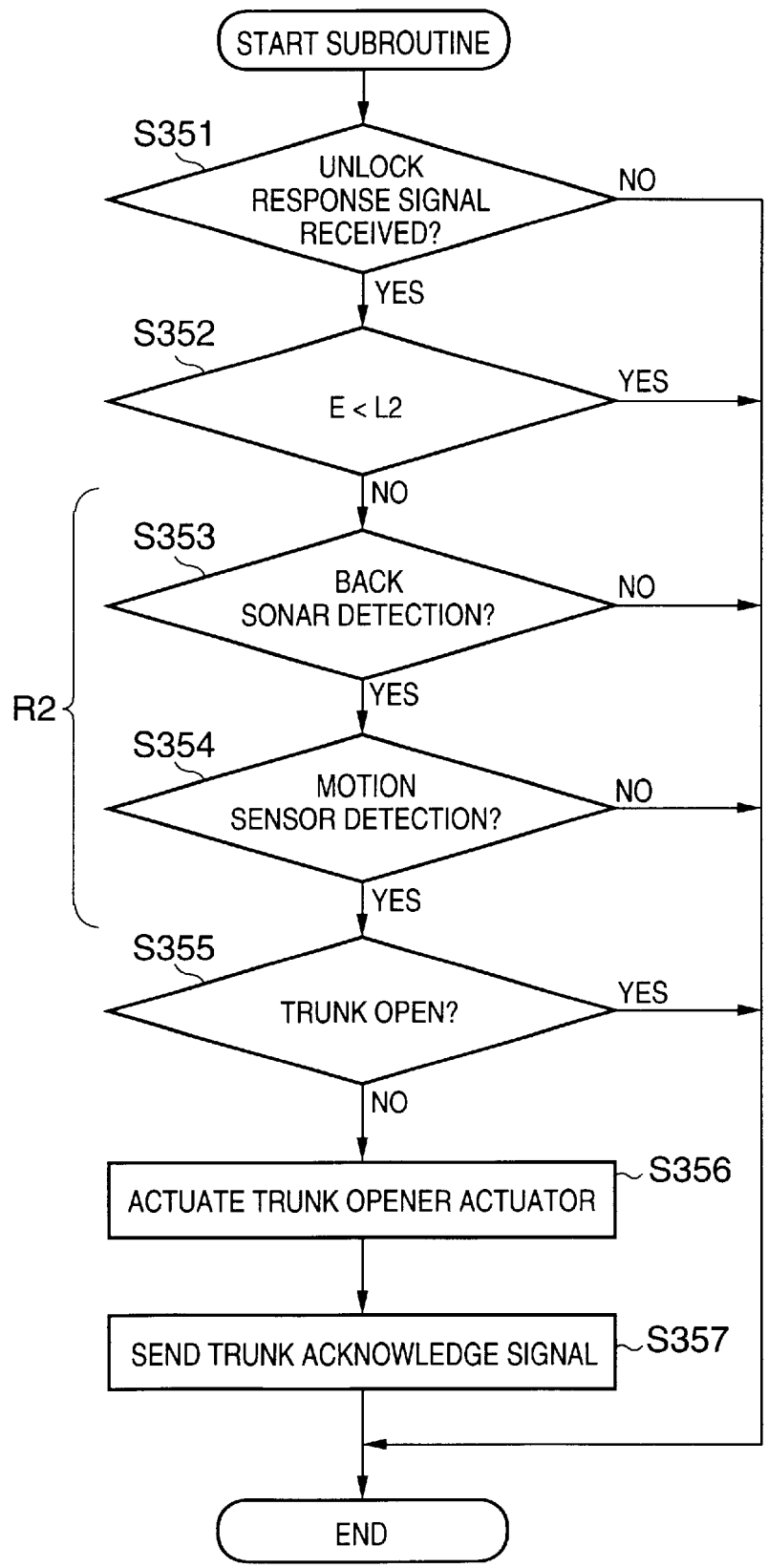
FIG. 37 is a flow chart showing a trunk automatic open subroutine of the 11th embodiment.

FIG. 37 shows the trunk automatic open subroutine according to the 11th embodiment. In this embodiment as well, the devices shown in FIGS. 30 to 32 are used. Also, the main routines shown in FIGS. 33 and 34 are the same as those in the 10th embodiment.

In the process shown in FIG. 37, the microcomputer 21 receives an unlock response signal from the portable unit 1C, and unlocks the vehicle doors 102 when the electric field strength of that received signal is equal to or higher than the second threshold L2 (for L2>L1) shown in FIG. 32. Also, the microcomputer 21 unlocks the trunk lid 103 when the back sonar 67 or motion sensor 68 detects an obstacle while receiving the unlock response signal (see step S356 in FIG. 37).

In addition, in this embodiment as well, since the trunk lid 103 is unlocked based on the logical product output (AND output) of the back sonar 67 that detects an obstacle behind the automobile and the motion sensor 68 which has the detection area e2 near the outside of the trunk room, the microcomputer 21 checks if an AND condition holds (see routine R2 in FIG. 37).

Furthermore, in this embodiment, once the trunk lid 103 is unlocked, the microcomputer 21 restricts the re-unlocking operation of the trunk lid 103 even when the back sonar 67 or motion sensor 68 detects an obstacle again while receiving the unlock response signal (YES in step S355 in FIG. 37).

The trunk automatic unlocking process exemplified as the 11th embodiment will be explained below with reference to the flow chart shown in FIG. 37.

Referring to FIG. 37, the microcomputer 21 checks in step S351 if the transceiver 22 receives an unlock response signal from the portable unit 1C (including match determination of an ID code). If NO in step S351, the process ends, and the flow returns to the main routine in FIG. 34; if YES in step S351, the flow advances to step S352.

The microcomputer 21 checks in step S352 if the electric field strength E of the received unlock response signal is smaller than the second threshold L2 (see FIG. 32). If YES in step S352 (E<L2), the process ends; if NO in step S352 (E>L2), the flow advances to step S353.

The microcomputer 21 checks in step S353 if the back sonar 67 detects an obstacle (obstacle (a person who is about to put baggage into the trunk room). If NO in step S343, the process ends; if YES in step S353, the flow advances to step S354.

The microcomputer 21 checks in step S354 if the motion sensor 68 detects an obstacle (a person who is about to put baggage into the trunk room). If NO in step S354, the process ends; if YES in step S354, the flow advances to step S355. That is, the AND output of the two sensors 67 and 68 can be obtained in steps S353 and S354.

The microcomputer 21 detects based on the input from the trunk open detection switch 66 in step S355 if the trunk lid 103 is open. If the trunk lid 103 is already unlocked and opened (YES in step S355), the process ends; if NO in step S355, the flow advances to step S356.

In step S356, the microcomputer 21 outputs a trunk unlock signal in response to the held AND condition and the trunk non-open state. That is, the microcomputer 21 unlocks and opens the trunk lid 103 via the trunk opener actuator 69.

In step S357, the microcomputer 21 sends a trunk acknowledge signal to the portable unit 1C via the transceiver 22. Then, the process of the subroutine ends, and the flow returns to the main routine shown in FIG. 34.

Note that the processing contents of the main routine are the same as those in FIGS. 33 and 34.

As described above, when the trunk lid 103 is unlocked, and the back sonar 67 or motion sensor 68 detects an obstacle again while receiving the unlock response signal, the microcomputer 21 restricts (inhibits) the re-unlocking operation of the trunk lid 103, thus reliably preventing generation of noise.

Figure 38:
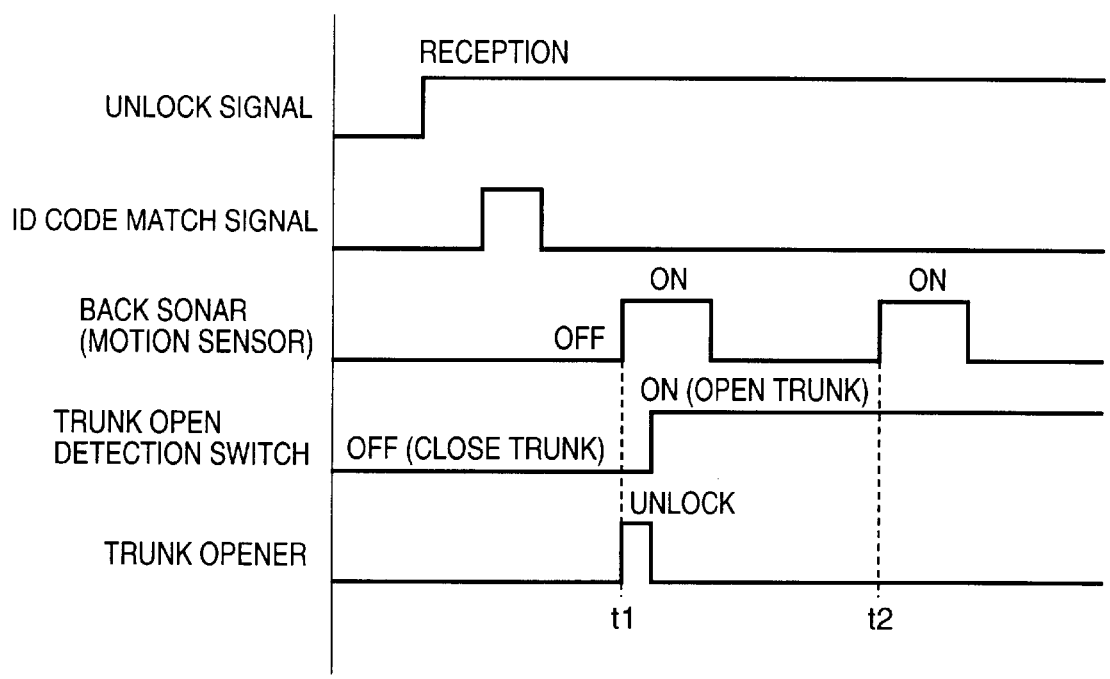
FIG. 38 is a timing chart showing trunk lid re-locking rules.

More specifically, in the embodiment shown in FIG. 37, when the back sonar 67 or motion sensor 68 detects an obstacle while receiving the unlock response signal, as shown in the timing chart in FIG. 38, the trunk lid 103 is unlocked at timing t1, and even when the back sonar 67 or motion sensor 68 detects an obstacle again while receiving the unlock response signal (see timing t2), the trunk opener actuator 69 is inhibited from unlocking the doors, thus preventing generation of noise. Note that this embodiment has substantially the same operations and effects as those in the 10th embodiment except for the above feature.

Figure 39:
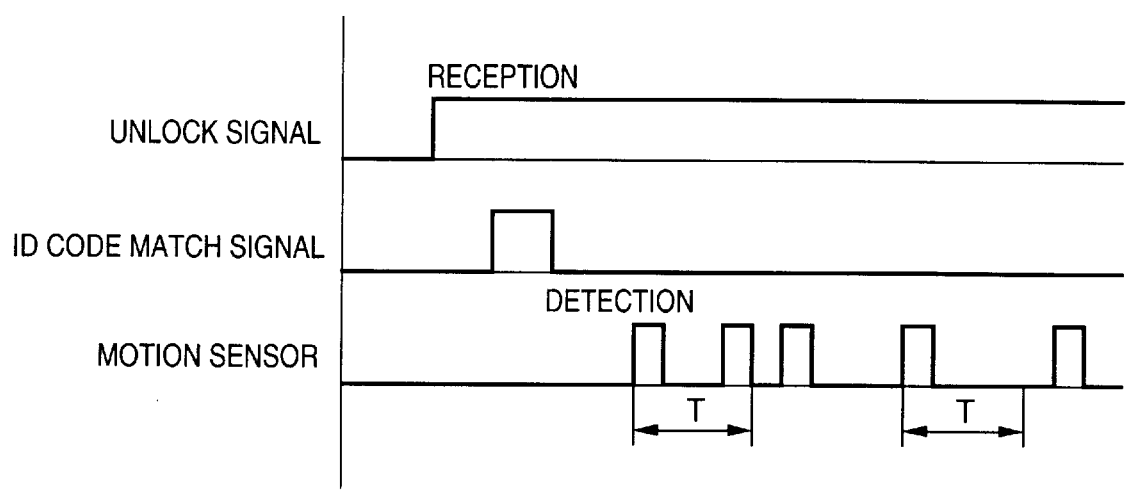
FIG. 39 is a timing chart showing obstacle detection by a motion sensor.

On the other hand, in the ninth to 11th embodiments using the motion sensor 68, the number of pulses to be detected during a predetermined period T (e.g., around 3 sec) is set to be, e.g., 2, as shown in the timing chart in FIG. 39, and if two pulses are detected within this predetermined period T, it is determined that the user wants to unlock the trunk lid 103, and a trunk lid unlocking command is issued, thus executing obstacle detection with higher precision.

That is, when a small animal passes by a space below the rear bumper 104, the motion sensor 68 detects only one pulse during the predetermined period T, thereby preventing any detection errors due to passage of small animals.

In addition, the motion sensor 68 which incorporates a pyroelectric sensor, and detects a motion of a person by fluctuations of infrared rays emitted by the person (or animal) who has a temperature difference from the ambient temperature detects pulses based on a change in infrared ray due to the temperature difference from the ambient temperature. However, since the rate of change in temperature due to a change in weather condition is very low, any detection errors due to an abrupt change in weather condition can be reliably prevented by setting the aforementioned predetermined period T and the number of pulses.

12th Embodiment

Figure 40:
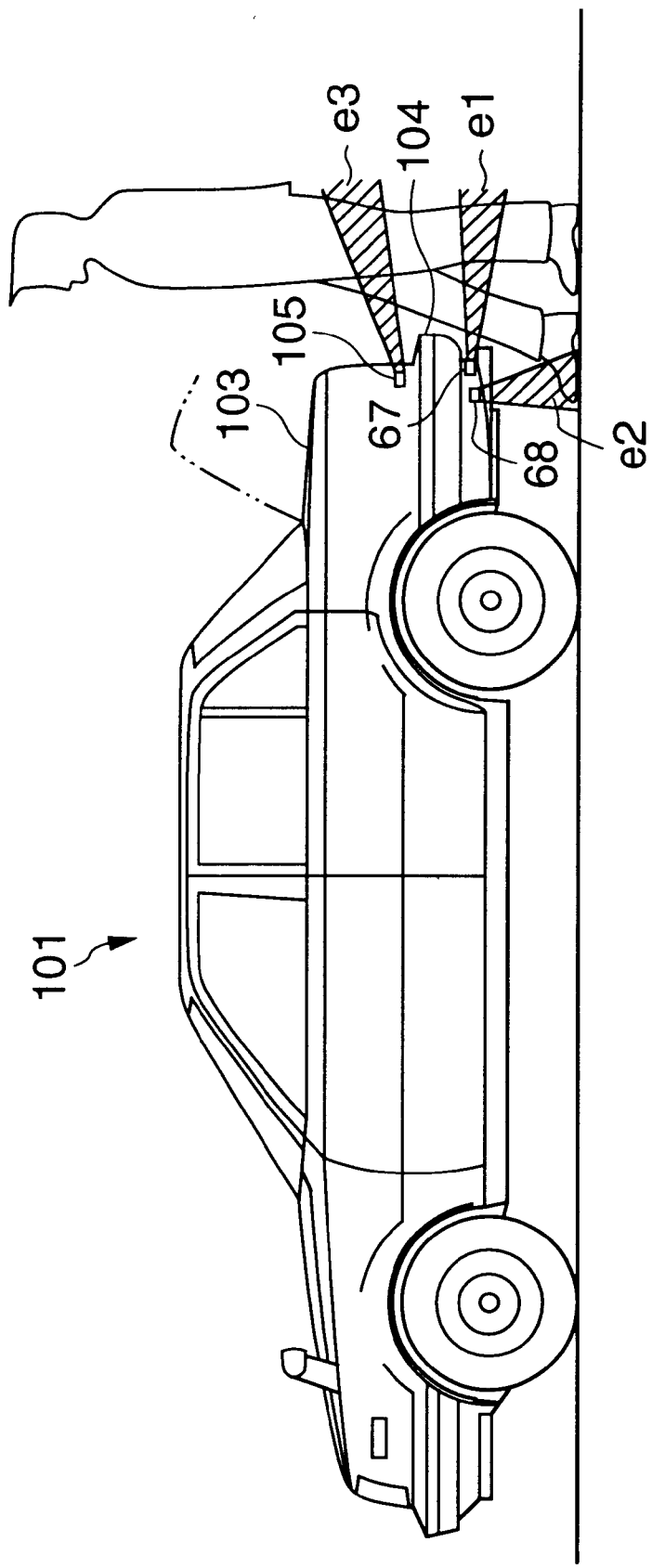
FIG. 40 is a view showing the device arrangement for implementing a trunk automatic unlocking process of the 12th embodiment.

FIG. 40 shows the device arrangement for implementing a trunk automatic unlocking process of the 12th embodiment. This arrangement comprises an obstacle sensor 105 which is provided to the rear portion of the automobile and has a detection area e3 at a given level position of a person (a person who is about to put baggage into the trunk room) with a certain height, in addition to the back sonar 67 which has as the detection area e1 an area below and behind the rear bumper 104, and the motion sensor 68 which has as the detection area e2 an area below and on the front side of the vehicle body of the rear bumper 104. When a person who is about to put baggage into the trunk room is detected based on the AND output of the sensors 67, 68, and 105, obstacle detection with higher precision can be realized. As the obstacle sensor 105, an infrared ray sensor, ultrasonic sensor, motion sensor, or the like can be used.

13th Embodiment

Figure 41:
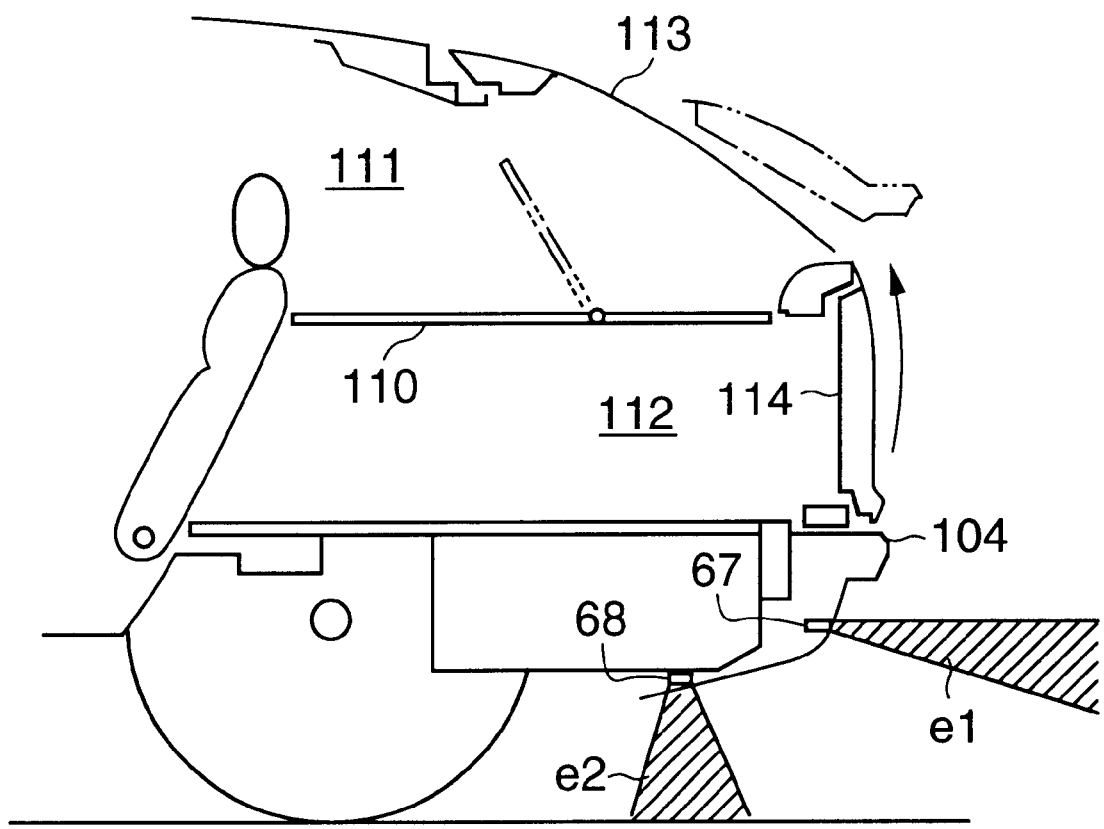
FIG. 41 is a view showing the device arrangement for implementing a trunk automatic unlocking process of the 13th embodiment.

FIG. 41 shows the device arrangement for implementing a trunk automatic unlocking process of the 13th embodiment. In this embodiment, a rear trunk room is divided into upper and lower trunk rooms 111 and 112 by a rear package tray 110, and a trunk room door that opens/closes these trunk rooms 111 and 112 comprises a main door 113 for the upper trunk room 111 and a sub door 114 for the lower trunk room 112. The sub door 114 for the lower trunk room is opened/closed by vertically translating from a closed position indicated by the solid line in FIG. 41 to an open position indicated by the imaginary line in FIG. 41 (see Japanese Patent Application No. 11-233409), and this sub door 114 is unlocked as a rear lid in place of the aforementioned trunk lid 103.

In the 13th embodiment, when the control is made using the device arrangements shown in FIGS. 30 to 32, the main routines shown in FIGS. 33 and 34, and the subroutine shown in FIGS. 35, 36, or 37, substantially the same operations and effects are provided. Hence, the same reference numerals in FIG. 41 denote the same parts as in the aforementioned figures, and a detailed description thereof will be omitted.

The present invention is not limited to only specific arrangements of the aforementioned embodiments. For example, other sensors such as an infrared ray sensor and the like may be used in place of the back sonar 67 and motion sensor 68.

The present invention is not limited to the above embodiments and various changes and modifications can be made within the spirit and scope of the present invention. Therefore, to apprise the public of the scope of the present invention the following claims are made.

What is claimed is:

1. An opening-closing member control apparatus for a vehicle, which comprises a user recognition system which recognizes if an authentic user is present near the vehicle, in accordance with a reception result of an authentication signal automatically sent from a transmitter provided to a portable unit, comprising:

operation detection means for detecting user's predetermined operation for the vehicle; and opening operation means for opening a predetermined opening-closing member of the vehicle that opens or closes an opening formed on a vehicle body so as to allow placement of an object into a vehicle compartment via said opening even if a door is closed when the predetermined operation is detected while the presence of the authentic user is recognized near the vehicle upon receiving the authentication signal.

2. The apparatus according to claim 1, wherein the predetermined opening-closing member is a trunk of the vehicle, said operation detection means detects if the user puts his or her foot below a bumper of the vehicle, and said opening operation means opens the trunk of the vehicle when said operation detection means detects that the user has put his or her foot below the bumper.

3. The apparatus according to claim 1, wherein said operation detection means detects by image recognition if the user puts his or her hand or leg over the predetermined opening-closing member, and said opening operation means opens the predetermined opening-closing member when said operation detection means detects that the user puts his or her hand or leg over the predetermined opening-closing member.

4. The apparatus according to claim 1, wherein the predetermined opening-closing member is a window of a vehicle door, said operation detection means detects if the user kicks a vehicle tire, and said opening operation means opens the window when said operation detection means detects that the vehicle tire is kicked.

5. The apparatus according to claim 1, wherein said opening operation means detects a reception direction of the signal, and opens a predetermined opening-closing member corresponding to the detected reception direction.

6. The apparatus according to claim 4, wherein the predetermined opening-closing member is a window of a vehicle door, said operation detection means detects if the user kicks a vehicle tire, and said opening operation means opens the window corresponding to the vehicle tire kicked by the user when said operation detection means detects that the vehicle tire is kicked.

7. The apparatus according to claim 3, wherein the predetermined opening-closing member is a window of a vehicle door, said operation detection means detects by image recognition using cameras that sense images of right and left side portions of the vehicle if the user puts his or her hand or leg over the predetermined opening-closing member, and said opening operation means opens a window corresponding to a position where the user puts his or her hand or leg when said operation detection means detects that the user puts his or her hand or leg over the predetermined opening-closing member.

8. The apparatus according to claim 1, wherein the predetermined opening-closing member is a window of a vehicle door, said apparatus further comprises object detection means for detecting if an object is present on a vehicle seat, and said opening operation means inhibits the window of the vehicle corresponding to the vehicle seat where the object is present from being opened when said object detection means detects that the object is present on that vehicle seat.

9. The apparatus according to claim 8, further comprising informing means for informing the position of the window which is inhibited from being opened, when said opening operation means inhibits the window from being opened.

10. The apparatus according to claim 1, further comprising rain detection means for detecting if it rains, and in that said opening operation means sets an opening operation speed of the predetermined opening-closing member when a rainfall is detected to be higher than an opening operation speed set when no rainfall is detected.

11. The apparatus according to claim 1, wherein said opening operation means opens the predetermined opening-closing member by switch means provided inside the vehicle, and sets an opening operation speed of the predetermined opening-closing member in response to the received signal to be higher than an opening operation speed of the predetermined opening-closing member by the switch means.

12. The apparatus according to claim 1, further comprising closing operation means for closing the predetermined opening-closing member opened by said opening operation means when the signal is not normally received.

13. The apparatus according to claim 1, further comprising:
   onboard detection means for detecting if the user enters a passenger room; and
   closing operation means for closing the predetermined opening-closing member opened by said opening operation means when it is detected that the user has entered the passenger room.

14. The apparatus according to claim 13, wherein a closing operation speed by said closing operation means when the signal is not normally received is set to be higher than a closing operation speed by said closing operation means when said onboard detection means detects that the user has entered the passenger room.

15. An opening-closing member control apparatus for a vehicle, which comprises a keyless entry system in which an onboard unit of the vehicle controls to lock/unlock a door lock mechanism in accordance with a reception result of an unlock signal automatically sent from a transmitter provided to a portable unit, comprising:
   entrance detection means for detecting if the user enters the vehicle; and
   opening operation means for opening a predetermined opening-closing member of the vehicle that opens or closes an opening formed on a vehicle body so as to allow placement of an object into a vehicle compartment via said opening even if a door is closed when a predetermined time has elapsed without detecting entrance of the user after the door lock mechanism was unlocked while the door mechanism is unlocked upon receiving the unlock signal.

16. The apparatus according to claim 15, wherein said entrance detection means detects user's outer handle operation of a vehicle door, and said opening operation means opens the predetermined opening-closing member when a predetermined time has elapsed without detecting entrance.

17. The apparatus according to claim 15, wherein said entrance detection means detects operation of an operation member to be operated by the user inside the vehicle, and said opening operation means opens the predetermined opening-closing member when a predetermined time has elapsed without detecting any operation.

18. An opening-closing member control apparatus for a vehicle, which comprises a user recognition system which recognizes if an authentic user is present near the vehicle, in accordance with a reception result of an authentication signal automatically sent from a transmitter provided to a portable unit,
   wherein the portable unit includes an operation mode setting switch which can turn on or off a function of automatically opening a predetermined opening-closing member of the vehicle that opens or closes an opening formed on a vehicle body so as to allow placement of an object into a vehicle compartment via said opening even if a door is closed, and comprising
   opening operation means for opening the predetermined opening-closing member when an onboard unit receives the authentication signal while the function is turned on by said operation mode setting switch.

19. The apparatus according to claim 18, wherein the operation mode setting switch is provided to the portable unit.

20. An opening-closing member control apparatus for a vehicle, which comprises a keyless entry system in which an onboard unit of the vehicle controls to lock/unlock a door lock mechanism in accordance with a reception result of an unlock signal automatically sent from a transmitter provided to a portable unit, comprising:
   operation detection means for detecting user's predetermined operation for the vehicle; and
   opening operation means for opening a predetermined opening-closing member of the vehicle that opens or closes an opening formed on a vehicle body so as to allow placement of an object into a vehicle compartment via said opening even if a door is closed when the predetermined operation is detected while the door lock mechanism is unlocked upon receiving the unlock signal.

21. An opening-closing member control apparatus for a vehicle, which comprises a user recognition system which recognizes if an authentic user is present near the vehicle, in accordance with a reception result of an authentication signal automatically sent from a transmitter provided to a portable unit, comprising:
   entrance detection means for detecting if the user enters the vehicle; and
   opening operation means for opening a predetermined opening-closing member of the vehicle that opens or closes an opening formed on a vehicle body so as to allow placement of an object into a vehicle compartment via said opening even if a door is closed when a predetermined time has elapsed without detecting entrance of the user after the door lock mechanism was unlocked while the presence of the authentic user is recognized near the vehicle upon receiving the authentication signal.

* * * * *